United States Patent
Kurata

(10) Patent No.: US 8,085,848 B2
(45) Date of Patent: Dec. 27, 2011

(54) IMAGE PROCESSING APPARATUS AND IMAGE PROCESSING METHOD

(75) Inventor: Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 1428 days.

(21) Appl. No.: 11/564,557

(22) Filed: Nov. 29, 2006

(65) Prior Publication Data

US 2007/0140591 A1   Jun. 21, 2007

(30) Foreign Application Priority Data

Dec. 1, 2005 (JP) ................................. 2005-347437
Jul. 18, 2006 (JP) ................................. 2006-195047

(51) Int. Cl.
H04N 7/12 (2006.01)
G06K 9/36 (2006.01)

(52) U.S. Cl. .................................. 375/240.16; 382/236

(58) Field of Classification Search ............. 375/240.16, 375/240.17; 382/236; 349/699
See application file for complete search history.

(56) References Cited

U.S. PATENT DOCUMENTS

| | | | | |
|---|---|---|---|---|
| 5,398,078 A | * | 3/1995 | Masuda et al. | 348/699 |
| 6,289,050 B1 | * | 9/2001 | Ohtani et al. | 375/240.16 |
| 6,594,314 B1 | * | 7/2003 | Ando | 375/240.16 |
| 7,206,346 B2 | * | 4/2007 | Shimizu et al. | 375/240.17 |
| 2005/0163221 A1 | * | 7/2005 | Oka et al. | 375/240.16 |

FOREIGN PATENT DOCUMENTS

| | | |
|---|---|---|
| JP | 06-086149 | 3/1994 |
| JP | 07-283999 | 10/1995 |
| JP | 3303312 | 5/2002 |
| JP | 2004-343483 | 12/2004 |
| JP | 2005-038396 | 2/2005 |

* cited by examiner

*Primary Examiner* — Gims Philippe
(74) *Attorney, Agent, or Firm* — K&L Gates LLP

(57) ABSTRACT

An image processing apparatus for identifying a motion vector by executing the steps of setting a plurality of reference blocks, searching a specific reference block, and detecting the motion vector is provided. The image processing apparatus includes correlation-value computation means, table generation means, and motion-vector computation means.

34 Claims, 40 Drawing Sheets

VECTOR CONTRACTION  1/n=1/4

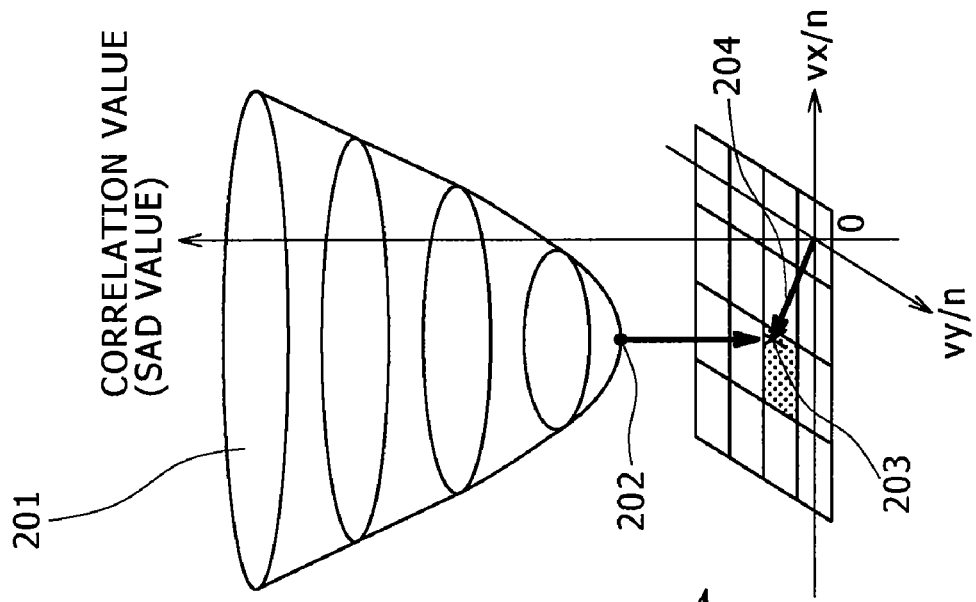
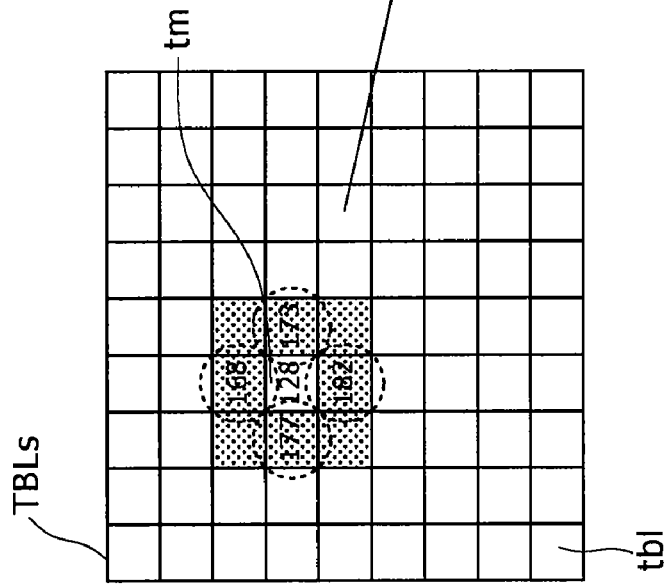

$$dx = \frac{\Sigma(Sxy \cdot Kx)}{4\Sigma Sxy - 6\Sigma(Sxy \cdot Kx^2)} \quad \cdots (EQ,A)$$

$$dy = \frac{\Sigma(Sxy \cdot Ky)}{4\Sigma Sxy - 6\Sigma(Sxy \cdot Ky^2)} \quad \cdots (EQ,B)$$

WHERE

FOR x=-1, Kx=-1.   FOR y=-1, Ky=-1.
FOR x=0, Kx=0.     FOR y=0, Ky=0.
FOR x=1, Kx=1.     FOR y=0, Ky=1.

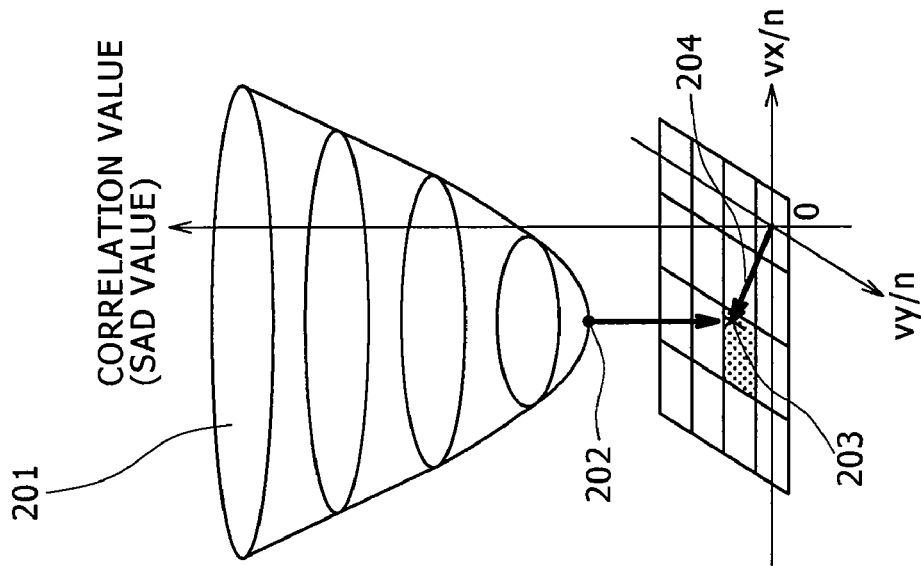
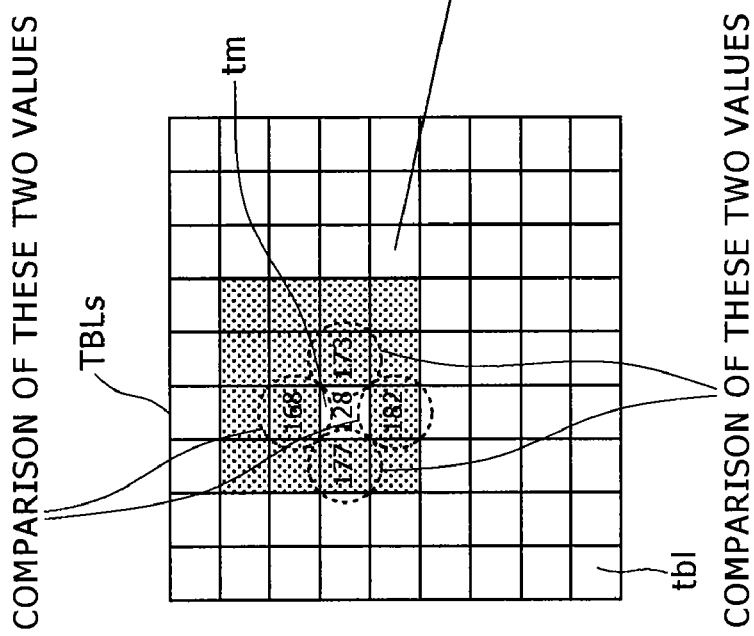
FIG. 11A
FIG. 11B $$dx = \frac{8\Sigma(Sxy \cdot Kx)}{25\Sigma Sxy - 20\Sigma(Sxy \cdot Kx^2)} + \Delta x \quad \cdots (EQ.C)$$

$$dy = \frac{8\Sigma(Sxy \cdot Ky)}{25\Sigma Sxy - 20\Sigma(Sxy \cdot Ky^2)} + \Delta y \quad \cdots (EQ.D)$$

SEGMENT Ra $$u = \frac{2S_3 - 11S_2 + 16S_1 - 7S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)}$$

···(EQ. E)

SEGMENT Rb $$u = \frac{S_3 - 4S_2 + 5S_1 - 2S_0 + \sqrt{(S_3 - 5S_2 + 5S_1 - S_0)^2 + (S_2 - S_0)(S_1 - S_3)}}{3(S_3 - 3S_2 + 3S_1 - S_0)}$$

···(EQ. F)

SEGMENT Rc $$u = \frac{-4S_3 + 7S_2 - 2S_1 - S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)}$$

···(EQ. G)

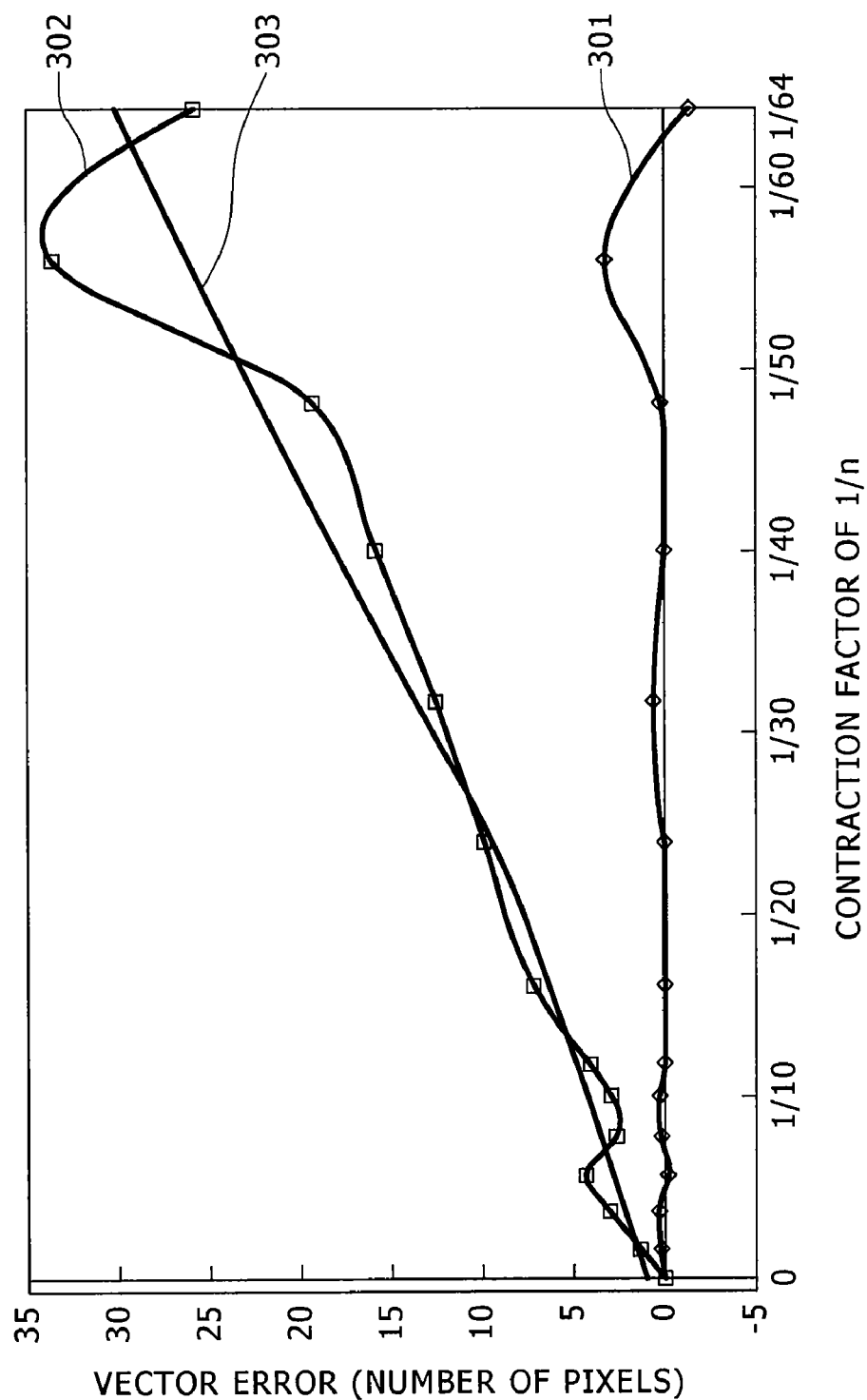

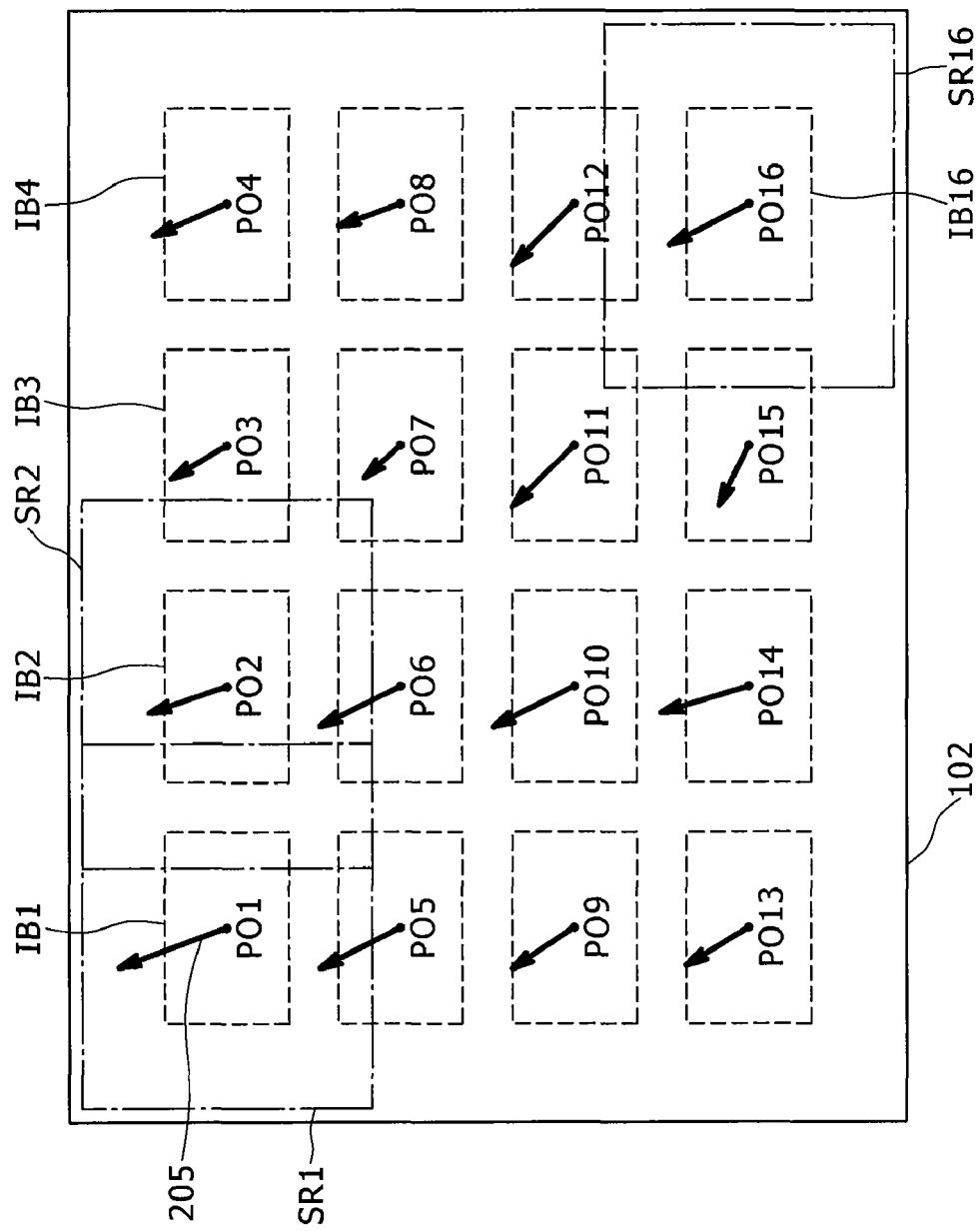

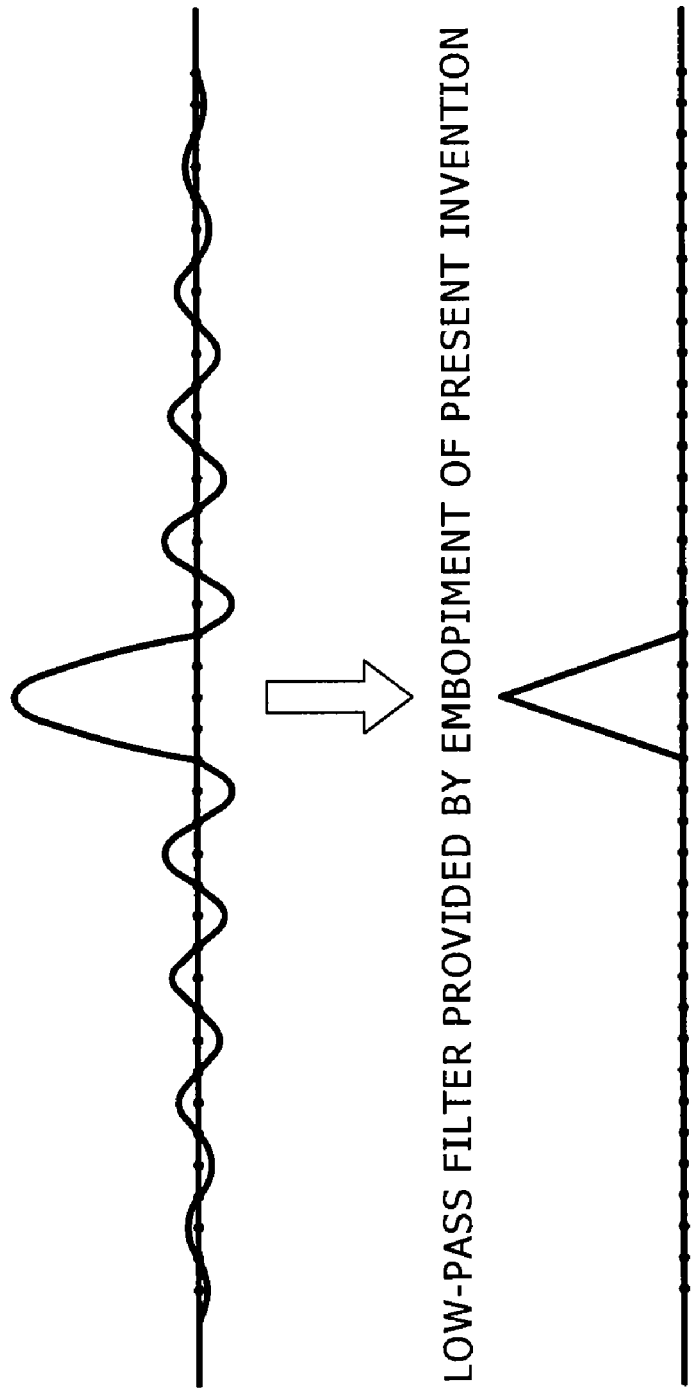

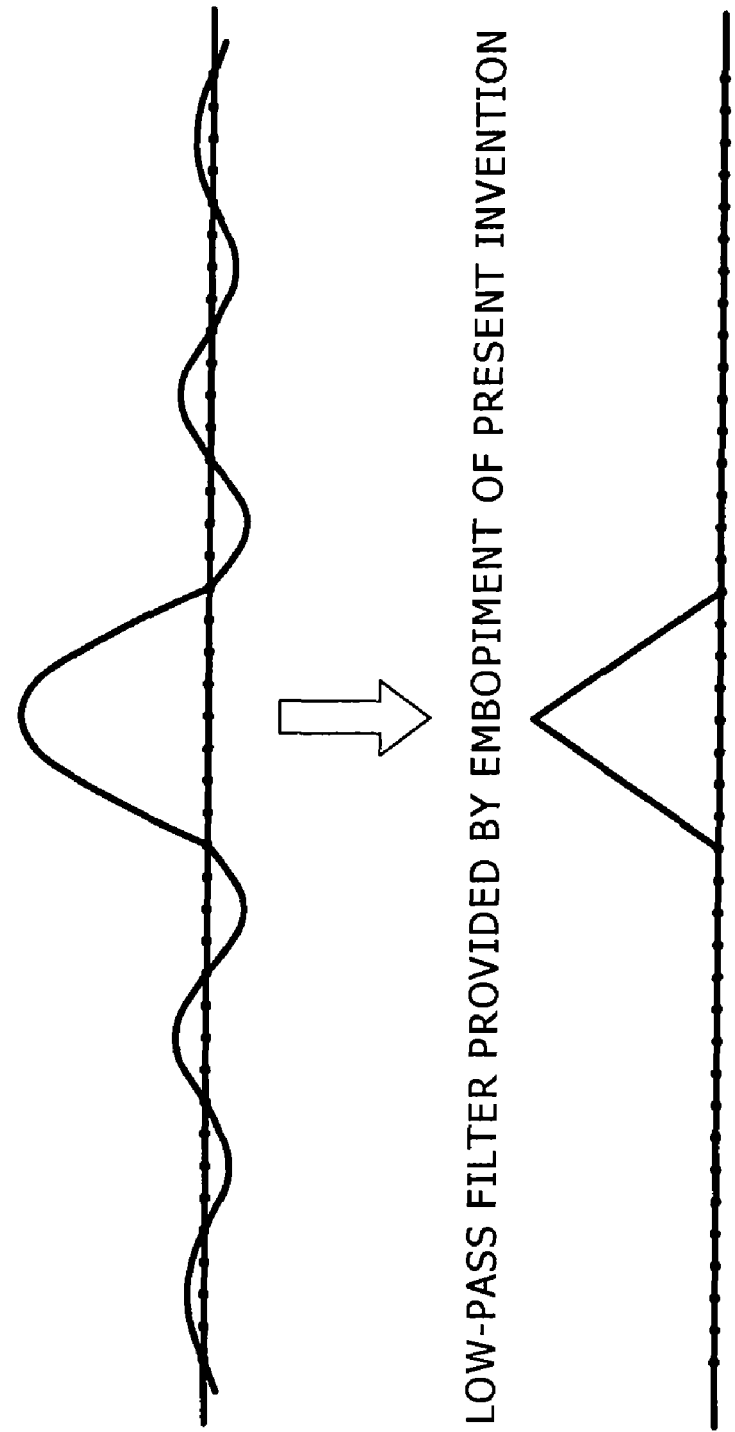

IMAGE PROCESSING APPARATUS AND IMAGE PROCESSING METHOD

CROSS REFERENCES TO RELATED APPLICATIONS

The present application claims priority to Japanese Patent Application JP 2005-347437 and JP 2006-195047 filed in the Japanese Patent Office on Dec. 1, 2005 and Jul. 18, 2006 respectively, the entire contents of which being incorporated herein by reference.

BACKGROUND

The present application relates to an image processing apparatus and an image processing method for detecting a motion vector between two different screens. More particularly, the present invention is suitable for a case of detecting a motion vector between screens having the so-called hand-trembling components included in image information obtained in an image pickup process carried out by using an image pickup apparatus such as a digital still camera or a video camera.

In general, when an image pickup operation is carried out by using an image pickup device such as a digital still camera (or a video camera) held by hands, the image pickup device vibrates due to the hands trembling during the image pickup operation, causing vibration of each screen of the taken image. As one of methods to compensate the taken image for vibration caused by trembling of the hands as vibration of the taken image, there is known a method whereby the motion vector of each screen of the taken image is detected and, on the basis of the detected motion vector, a location existing in an image memory as the read location of image pickup data is shifted in order to compensate the image for the vibration caused by the trembling of the hands.

In addition, as a method to detect the motion vector of every screen of a taken image, there is known a block-matching technique for finding a correlation between taken images of two screens. Since the block-matching technique does not necessary a mechanical component such a gyro sensor serving as an angular-velocity sensor, the technique offers a merit in that an image pickup device having a small size and a small weight can be implemented.

FIGS. 42 and 43 are diagrams referred to in description of the outline of the block-matching technique. FIG. 44 shows a flowchart representing typical processing adopting the block-matching technique.

The block-matching technique is a method whereby a motion vector between a unitary block on an original screen of a taken image output by an image pickup unit and the same unitary block on a reference screen of the taken image is associated with a correlation between the block on the original screen and the same block on the reference screen. The reference screen of a taken image output by the image pickup unit is defined as a screen currently being processed whereas the original screen, which is also referred to as a target screen, is defined as a screen immediately preceding the reference screen or preceding the reference screen by one screen interval.

It is to be noted that, in this case, a screen is an image composed of image data of one frame or one field. In this patent specification, however, a screen is defined as an image composed of image data of one frame in order to make the explanation easy to understand. Thus, the screen is also referred to as a frame. That is to say, the reference and original screens are also referred to as reference and original frames respectively.

For example, the image data of the reference frame is image data, which has been output by the image pickup unit and stored in a frame memory for the lapse of a delay time corresponding to occurrence of one frame since the appearance of the current frame, as the image data of the current frame. On the other hand, the image data of the original frame is image data and stored in a frame memory for the lapse of a delay time corresponding to occurrence of two frames since the appearance of the current frame, as the image of an immediately preceding frame.

As described above, FIGS. 42 and 43 are diagrams referred to in description of the outline of the block-matching technique. FIG. 44 shows a flowchart representing typical processing adopting the block-matching technique.

In accordance with the block-matching technique, as shown in FIG. 42, at any arbitrary predetermined position on the original frame 101 also referred to as a target frame 101, a target block 103 is set. The target block 103 is a rectangular area having a predetermined size. The target block 103 has a plurality of pixels arranged in the horizontal direction to form a line and a plurality of such lines arranged in the vertical direction.

On the other hand, at the same position (or the same coordinates) on a reference frame 102 as the position (or the same coordinates) of the target block 103, a target-block projected image block 104 will serve as the target block 103 if the hands do not tremble. In FIG. 42, the target-block projected image block 104 is drawn as a block enclosed by a dashed line. Then, a search range 105 is set with its center coinciding with the target-block projected image block 104. In FIG. 42, the search range 105 is drawn as a block enclosed by a dotted line. In addition, a reference block 106 is assumed to be a block to be moved from position to position over the search range 105 as will be described below. The correlation between the moving reference block 106 and the target block 103 becomes strongest when the reference block 106 is located at a position existing on the reference frame 102 as a position not shifted by hand trembling from the position of the target block 103 on the original frame 101 as shown in the figure.

Then, the position of the reference block 106 on the reference frame 102 is changed over the search range 105 in an endeavor to search the search range 105 for a position showing a strongest correlation between the image data included in the reference block 106 at the position and the image data included in the target block 103, that is, for a position at which the correlation between the moving reference block 106 and the target block 103 becomes strongest. A position showing the strongest correlation is detected as the strongest-correlation position of the reference block 106 or the actual position of the target block 103 on the reference frame 102. The magnitude of the shift of the detected strongest-correlation position of the reference block 106 or the actual position of the target block 103 on the reference frame 102 from the position of the target-block projected image block 104 is detected as a motion vector 110, which includes a movement direction.

In the process to search the search range 105 for a position showing the strongest correlation, the position of the reference block 106 on the reference frame 102 is changed over the search range 105 typically in the vertical and horizontal directions by a distance corresponding to one pixel or a plurality of pixels at one time. Thus, a plurality of reference block positions are each set in the search range 105 in advance as a position to which the reference block 106 is to be moved during the search process.

The strongest correlation between the reference block 106 moving from position to position over the search range 105 and the target block 103 is basically computed on the basis of pixels of the reference block 106 at every present position thereof and corresponding pixels of the target block 103. As a method for computing the strongest correlation between the moving reference block 106 and the target block 103, a variety of techniques including a mean-square method have been proposed. The motion vector 110 cited above is detected as a reference vector representing the magnitude and direction of a distance from the position of the target-block projected image block 104 to the strongest-correlation position of the reference block 106 by using a table to be described later as a table for storing results of the process to find the strongest correlation by adoption of a typical method whereby the correlation is expressed as a SAD (Sum of Absolute Differences). The SAD is a sum of the absolute values of differences in luminance value between all pixels in the reference block 106 and all corresponding pixels in the target block 103. The strongest correlation is represented by a minimum SAD for the strongest correlation position indicated by the motion vector 110 from the position of the target-block projected image block 104.

If a SAD value is used to represent a correlation value, the smaller the SAD value, the stronger the correlation. Thus, in the process to move the reference block 106 from position to position over the search range 105, a position in the search range 105 is detected as the strongest-correlation position of the reference block 106, that is, as a position showing the strongest correlation between the reference block 106 and the target block 103 or a position having a minimum SAD value between the reference block 106 and the target block 103. The motion vector 110 is a vector representing a shift from the position of the target block 103 on the original frame 101 or the position of the target-block projected image block 104 on the reference frame 102 to the detected position showing the strongest correlation or the detected position having the minimum SAD value.

In accordance with the block-matching technique, a plurality of positions to which the reference block 106 is to be moved over the search range 105 are set in advance, the positions are searched for a specific one showing the strongest correlation between the reference block 106 and the target block 103 or a specific one having the minimum SAD value between the reference block 106 and the target block 103, and a reference vector 107 including a shift direction is used as a vector representing a shift from the position of the target block 103 on the original frame 101 or the position of the target-block projected image block 104 on the reference frame 102 to the specific position showing the strongest correlation between the reference block 106 and the target block 103 or the specific position having the minimum SAD value between the reference block 106 and the target block 103 as shown in FIG. 42. The reference vector 107 pointing to the reference block 106 thus has a value determined by the strongest-correlation position of the reference block 106 on the reference frame 102 and, in the case of the block-matching technique, the strongest-correlation position of the reference block 106 is a position showing a minimum SAD value.

In accordance with the block-matching technique, for each of a plurality of positions to which the reference block 106 is to be moved over the search range 105, a computed SAD value between the reference block 106 and the target block 103 is recorded as a table element in a correlation-value table 108 stored in a memory by being associated with a reference vector 107 pointing to the position of the reference block 106 as shown in FIG. 43. In order to make the explanation simple, in the following description, a SAD value between the reference block 106 and the target block 103 is also referred to as a reference block SAD value whereas the reference vector 107 pointing to the position of the reference block 106 is also referred to as a motion vector 110. Thus, a motion vector 110 associated with a minimum reference block SAD value can be found from the correlation-value table 108 by searching all the reference block SAD values stored in the memory for the minimum reference block SAD value.

As described above, for each of a plurality of positions to which the reference block 106 is to be moved over the search range 105, a reference block SAD value between the reference block 106 and the target block 103 is recorded as a table element in a correlation-value table 108 also referred to hereafter as a SAD table 108 by being associated with a reference vector 107. The reference-block SAD value represents a correlation between the reference block 106 and the target block 103. Since the reference-block SAD value is the sum of the absolute values of differences in luminance value between all pixels in the reference block 106 and all corresponding pixels in the target block 103, the correlation-value table 108 used for recording every sum of the absolute values of such differences is also referred to as a SAD table 108.

As shown in FIG. 43, each element of the correlation-value table 108 is a correlation value, which is a correlation value of the reference block 106 at a position corresponding to the address of the element, or a reference-block SAD value for the position.

It is to be noted that, in the above description, the position of the target block 103 or the reference block 106 is the position of a specific portion of the target block 103 or the reference block 106 respectively. An example of the specific portion is the center of the target block 103 or the reference block 106. Also as described above, the reference vector 107 including a shift direction is a vector representing the quantity of a shift from the position of the target block 103 on the original frame 101 or the position of the target-block projected image block 104 on the reference frame 102 to the position showing the strongest correlation or the position having the minimum SAD value. In the examples shown in FIGS. 42 and 43, the target block 103 and the target-block projected image block 104 are each located at the center of the frame.

The reference vector 107 pointing to the reference block 106 and including a shift direction is a vector representing the quantity of a shift from the position of the target block 103 or the position of the target-block projected image block 104 to the position showing the strongest correlation or the position having the minimum SAD value. Thus, if the position showing the strongest correlation between the reference block 106 and the target block 103 or the position having the minimum SAD value between the reference block 106 and the target block 103 is identified, the value of the reference vector 107 is also identified. That is to say, if the address of the element of the correlation-value table 108 in the memory is identified, the value of the reference vector 107 is also identified.

The block-matching processing in related art described above is explained in more detail by referring to a flowchart shown in FIG. 44 as follows.

The flowchart begins with a step S1 at which a reference block Ii denoted by reference numeral 106 in FIG. 42 is specified at a position having coordinates of (vx, vy) in the search range 105. An operation to specify a reference block Ii in the search range 105 is equivalent to an operation to specify a reference vector 107 corresponding to the reference block Ii. In the typical processing represented by the flowchart shown in FIG. 44, the coordinates of (vx, vy) are the coordinates of the position pointed to by the specified reference vector 107 with coordinates of (0, 0) taken as the coordinates of an origin position. The coordinates of (0, 0) are the coordinates of the position of the target block 103 on the original frame 101 or the coordinates of the position of the target-block projected image block 104 on the reference frame 102. The coordinate vx represents the horizontal-direction shift of the position pointed to by the specified reference vector 107 from the origin position whereas the coordinate vy represents the vertical-direction shift of the position pointed to by the specified reference vector 107 from the origin position having the coordinates of (0, 0).

The shift quantities (vx, vy) are each a quantity expressed in terms of pixel units. For example, an expression vx=+1 expresses a position shifted in the horizontal direction to the right from the origin position (0, 0) by a distance equivalent to one pixel. On the other hand, an expression vx=−1 expresses a position shifted in the horizontal direction to the left from the origin position (0, 0) by a distance equivalent to one pixel. In addition, an expression vy=+1 expresses a position shifted in the vertical downward direction from the origin position (0, 0) by a distance equivalent to one pixel. On the other hand, an expression vy=−1 expresses a position shifted in the vertical upward direction from the origin position (0, 0) by a distance equivalent to one pixel.

As described above, the coordinates (vx, vy) are the coordinates of a position pointed to by a reference vector 107 as a position relative to the origin position (0, 0). In the following description, the position pointed to by the reference vector 107 as a position relative to the origin position (0, 0) is referred to simply as a position pointed to by the reference vector 107 in order to make the explanation easy to understand. Each position pointed to by a reference vector 107 is said to be a position corresponding to the reference vector 107. That is to say, quantities (vx, vy), where notations vx and vy are each an integer, represent the reference vector 107 itself. Thus, in the following description, a reference vector 107 pointing to a position (vx, vy), which is a position having the coordinates of (vx, vy), is expressed as a reference vector (vx, vy).

As described earlier, the center position of the search range 105 is taken as the center position of the target-block projected image block 104 or the origin position (0, 0). The reference block 106 is moved from position to position over the search range 105 in the horizontal directions by distances in the range ±Rx defining the horizontal limits of the search range 105 and the vertical directions by distances in the range ±Ry defining the vertical limits of the search range 105. In this case, the quantities (vx, vy) satisfy the following relation:

$$-Rx \leq vx \leq +Rx \text{ and } -Ry \leq vy \leq +Ry$$

At the next step S2, a point (or a pixel) with coordinates (x, y) is specified as a point in the target block Io denoted by reference numeral 103 in FIG. 42. Let us have notation Io (x, y) denote a pixel value at the specified point (x, y) and notation Ii (x+vx, y+vy) denotes a pixel value at a point (x+vx, y+vy) in the reference block Ii set at the block position (vx, vy) at the step S1. In the following description, the point (x+vx, y+vy) in the reference block Ii is said to be a point corresponding the point (x, y) in the target block Io. Then, at the next step S3, the absolute value α of the difference between the pixel value Io (x, y) and the pixel value Ii (x+vx, y+vy) is computed in accordance with Eq. (1) as follows:

$$\alpha = |Io(x,y) - Ii(x+vx, y+vy)| \quad (1)$$

The above difference absolute value α is to be computed for all points (x, y) in the target block Io and all their corresponding points (x+vx, y+vy) in the reference block Ii, and a SAD value representing the sum of the difference absolute values α computed for the target block Io and the reference block Ii is stored at the address of a table element associated with the reference vector (vx, vy) pointing to the current location of the reference block Ii. That is to say, the SAD value is stored as a reference-value table element 109 associated with the reference block Ii as an element of the correlation-value table 108. In order to compute such a SAD value, at the next step S4, the difference absolute value α found at the step S3 is cumulatively added to a temporary SAD value already stored as a reference-value table element 109 associated with the reference block Ii pointed to by the reference vector (vx, vy) as a SAD value computed so far. The final SAD value SAD (vx, vy) is obtained as a result of a process to cumulatively sum up all difference absolute values α, which are computed for all points (x, y) in the target block Io and all their corresponding points (x+vx, y+vy) in the reference block Ii as described above. Thus, the final SAD value SAD (vx, vy) can be expressed by Eq. (2) as follows:

$$SAD(vx,vy) = \Sigma \alpha = \Sigma |Io(x,y) - Ii(x+vx, y+vy)| \quad (2)$$

Then, the flow of the block-matching processing in related art goes on to the next step S5 to produce a result of determination as to whether or not the processes of the steps S3 and S4 have been carried out for all points (x, y) in the target block Io and all their corresponding points (x+vx, y+vy) in the reference block Io. If the result of the determination indicates that the processes of the steps S3 and S4 have not been carried out yet for all points (x, y) in the target block Io and all their corresponding points (x+vx, y+vy) in the reference block Io, the flow of the block-matching processing in related art goes back to the step S2 at which another point with coordinates (x, y) is specified as another point in the target block Io. Then, the processes of the steps S3 and S4 following the step S2 are repeated.

If the determination result produced at the step S5 indicates that the processes of the steps S3 and S4 have been carried out for all points (x, y) in the target block Io and all their corresponding points (x+vx, y+vy) in the reference block Io, the final SAD value SAD (vx, vy) for the reference vector (vx, vy) has been found. The flow of the block-matching processing in related art goes on to a step S6 to produce a result of determination as to whether or not the processes of the steps S2 to S5 have been carried out for all reference-block locations in the search range 105, that is, for all reference vectors (vx, vy).

If the determination result produced at the step S6 indicates that the processes of the steps S2 to S5 have not been carried out yet for all reference vectors (vx, vy), the flow of the block-matching processing in related art goes back to the step S1 at which another reference block Ii pointed to by another reference vector (vx, vy) is set at another block position (vx, vy) in the search range 105. Then, the processes of the step S1 and the subsequent steps are repeated.

If the determination result produced at the step S6 indicates that the processes of the steps S2 to S5 have been carried out for all reference-block positions in the search range 105 or for all reference vectors (vx, vy), all elements of the correlation-value table 108 have been filled with final SAD values (vx, vy). The flow of the block-matching processing in related art goes on to a step S7. The smallest value among all the final SAD values (vx, vy) stored in all the elements of the correlation-value table 108 is detected as a minimum value representing the strongest correlation between the target block 103 and the reference block 106. Then, at the next step S8, a reference vector (vx, vy) pointing to the address of an element included in the correlation-value table 108 as the element used for storing the smallest final SAD value (vx, vy) is recognized as the motion vector 110 described earlier. Let us have notation SAD (mx, my) denote the smallest final SAD value (vx, vy) whereas notation vector (mx, my) denote the reference vector (vx, vy) pointing to the address of an element included in the correlation-value table 108 as the element used for storing the SAD (mx, my) or denote the motion vector 110.

As described above, the block-matching processing in related art for a target block 103 is carried out to determine a vector (mx, my) for the target block 103.

The technology of the block-matching processing in related art is a technology of a very long history. This technology was introduced for the first time as a sensorless technology for compensating image pickup apparatus for effects of hand trembling at the end of the nineteen eighties. Thus, the technology itself has been adopted for a long period since a time prior to the invention of the digital consumer apparatus.

Thereafter, while there were being proposed innovations including inventions described in documents such as U.S. Pat. No. 3,303,312 used as patent document 1 and Japanese Patent Laid-open No. Hei 6-86149 used as patent document 2, the sensorless technology for compensating image pickup apparatus for effects of hand trembling was developed to provide successful results to video cameras to a certain degree. Since a low-cost gyro sensor having a better performance and a small size was introduced to the market, however, the market position of the sensorless technology for compensating image pickup apparatus for effects of hand trembling was taken almost completely at the present time by a technology adopted for compensating image pickup apparatus for the effects as a technology utilizing a gyro sensor.

The biggest reasons why the market position of the sensorless technology for compensating image pickup apparatus for effects of hand trembling has been declining are difficulties to enhance the precision of a process to detect errors from a motion vector identified by adoption of the block-matching technique and remarkable enhancement of convenience obtained by utilization of a gyro sensor.

Another reason is the fact that fair detection precision regarded as a shortcoming of the technology adopted for compensating image pickup apparatus for effects of hand trembling as a technology utilizing a gyro sensor does not raise a problem in the moving-picture taking field, which is a principal application of this technology. That is to say, even though a sensor such as the gyro sensor does not offer a characteristic demonstrating a high degree of precision such as pixel precision, however, the process to detect a motion vector does not have to be carried out with a high degree of precision, which is provided by pixel precision. In a process of compensating an image pickup apparatus for effects of hand trembling without a sensor during an operation to take a moving picture, on the other hand, a big error caused by a motion vector sometimes identified mistakenly does raise a problem.

In some recent years, on the other hand, the very fast popularization of digital cameras and the very fast progress in the trend to increase the number of pixels composing a picture have started raising a new problem caused by a demand for compensation of a still picture taken in an environment having a low illumination, hence, needing a long exposure time for effects of hand trembling in spite of the fact that an image pickup apparatus employing a sensor such as a gyro sensor is available. That is to say, the new problem being gradually exposed to the industry in recent years is a problem caused the shortcoming explained earlier as the shortcoming of the gyro sensor, or the shortcoming of the gyro sensor eventually becomes a problem.

In a process to compensate a consumer apparatus available in the market at the present time for effects of hand trembling, the amount of hand trembling is measured by using an inclined gyro sensor or an acceleration sensor and fed back to a mechanism system in execution of high-speed control to prevent an image projected on an imager such as a CCD (Charge Coupled Device) imager or a CMOS (Complementary Metal Oxide Semiconductor) imager from trembling.

As the mechanism system, there has been proposed a system including a lens, a prism, and the imager (or a module including the imager integrated therein). The lens, the prism, and the imager are referred to as a lens shift, a prism shift, and an imager shift respectively.

If an image pickup apparatus is compensated for effects of hand trembling by adoption of the method described above, the process will generate an error of a delay of the feedback to the mechanism system or an error of estimation for avoiding the delay of the feedback as well a control error. The feedback-delay error as well as the control error are superposed on the precision error described earlier as the error of the gyro sensor itself. Thus, in a process to compensate an image pickup apparatus for effects of hand trembling, compensation based on pixel precision is completely difficult.

In spite of a serious problem that, as a rule, the pursuit of precision is difficult by merely carrying out a process to compensate an image pickup apparatus for effects of hand trembling through utilization of the contemporary sensor as described earlier, the market appreciates the compensated image pickup apparatus for its capability of reducing the effects of hand trembling if not a capability of getting rids of the effects of hand trembling.

It is merely a matter of time, however, that the market gets aware of the fact that, as the pixel size decreases to accompany expected more and more pixel-count increases in the future, the gap between the limit of the process to compensate an image pickup apparatus for effects of hand trembling by utilizing the contemporary sensor and the pixel precision rising due to the decreasing pixel size and the increasing pixel count increase more and more.

In the case of a sensorless hand-trembling compensation technique suffering a bitter failure in an attempt to compensate a video camera for effects of hand trembling by using no sensors, on the other hand, as a rule, it is possible to implement detection of a hand-trembling vector with a high degree of pixel precision including a rotational component in the roll-axis direction and possible to eliminate the sensor and mechanisms such as the lens shift. Thus, the sensorless hand-trembling compensation technique is excellent from the cost point of view.

In an extension of a technology depending of the block-matching technique in related art, nevertheless, the number of elements composing the correlation-value table 108 (or the SAD table 108) described earlier increases in proportion to the number of pixels on one screen. It is thus very difficult to implement a process to detect a motion vector for a still picture appearing on the contemporary display screen with a size of more than five million pixels by using a circuit having a realistic scale.

On a background of suffering a bitter failure in an attempt made to eliminate a circuit for detecting a hand-trembling vector for an NTSC (National Television System Committee) moving picture appearing on a display screen with a size not exceeding 170,000 pixels while trying a variety of efforts in manufacturers of image pickup apparatus in the past, a narrow hand-trembling search range can be used in a process to detect a hand-trembling vector for an NTSC moving picture produced at a rate of 60 fps (frames per second), but in the case of a still picture, a rate of three fps is taken as a prerequisite so that the hand-trembling search range becoming an extremely large serves as one of causes, which make the existing problem even more difficult to solve. This is because the number of elements composing the correlation-value table 108 increases in proportion to the number of pixels on one screen as well as the size of the hand-trembling search range.

A method of implementing the sensorless hand-trembling compensation technique for still pictures has been disclosed in some documents and, in particular, in Japanese Patent Laid-open No. Hei 7-283999 taken as patent document 3. In accordance with the technique disclosed in patent document 3, there is disclosed an algorithm whereby some consecutive still pictures are taken during such a short exposure time that no hand trembling occurs. Hand-trembling vectors between the static pictures are found and a plurality of still pictures taken consecutively during the exposure time are superposed on each other (or on an average of the still pictures taken consecutively during the exposure time) while being moved in parallel in accordance with their hand-trembling vectors in order to produce an eventual high-quality still image with no effects of hand trembling and no low-illumination noises.

Japanese Patent Laid-open No. 2005-38396 taken as patent document 4 proposes a realistic technology at a level that can be implemented. The technology disclosed in patent document 4 includes means to find a motion vector for a picture size obtained as a result of a conversion process to contract an original picture and means to allow a common SAD table to be shared by a plurality of blocks. The technique to contract an original picture and allow a common SAD table to be shared by a plurality of blocks is a very good method to implement reduction of the size of the SAD table 108 and also used in other fields such as detection of a motion vector in an MPEG (Moving Picture Expert Group) picture compression system and detection of a scene change.

However, the algorithm disclosed in patent document 4 has a problem that it takes time to carry out the conversion process to contract an original picture and make an access to a memory used in the process as a memory having a large size. An example of the memory is a DRAM (Dynamic RAM [Random Access Memory]). The time to make an access to the memory particularly becomes very long due to the fact that the algorithm uses means configured to make accesses to the correlation-value table 108 (or the SAD table 108), which is shared by a plurality of blocks, on a time-sharing basis. The very long time to make an access to the memory also unavoidably increases the time to carry out the processing based on the algorithm. Since the process to compensate an image pickup apparatus for effects of hand trembling is carried out in a real-time manner in order to shorten a system delay time, the long time it takes to carry out the processing based on the algorithm particularly raises a problem.

In addition, in order to carry out the conversion process to contract an original picture, it is necessary to carry out preprocessing prior to the conversion process by using a low-pass filter for getting rids of aliasing and low-illumination noises. Since the characteristic of the low-pass filter changes in accordance with the contraction factor of the conversion process and, in particular, in the case of a vertical-direction low-pass filter, a multi-tap digital filter is used, however, a number of line memories and processing logic circuits are necessary, raising a problem of an increasing circuit size.

On the other hand, algorithms each using no block-matching technique have also been proposed in documents such as Japanese Patent Laid-open No. Hei 6-86149 used as patent document 5 and Japanese Patent Laid-open No. 2004-343483 used as patent document 6. The proposed algorithms each employ means configured to detect a plurality of points each considered to be a characteristic point for some reasons on two frame images and associate the two frame images with each other on the basis of the detected characteristic points in order to find a global vector, which is a hand-trembling vector for the whole face of each of the frame images. As an alternative, characteristic points of one of the two frame images are detected and a block-matching process is carried out with respect to the other frame image for areas each surrounding one of the detected characteristic point.

The algorithms disclosed in patent documents 5 and 6 each reduce the size of the processing circuit and are each a very effective, hence, being ideal. However, the effectiveness of the algorithms much depends on how much the number of identified characteristic points truly serving as characteristics of the entire faces of both the frame images and characteristics common to the two frame images can be reduced with a high degree of efficiency. The block-matching technique is considered to be a little ahead of the algorithms disclosed in patent documents 5 and 6 in robustness as long as all things in the universe are each taken as the image pickup object of a consumer image pickup apparatus.

As described earlier, in the image pickup apparatus such as a digital camera, efforts are made to increase the pixel density of an imager more and more in the future in anticipation of a demand for better performance. In such a condition, implementation of a process to compensate the image pickup apparatus for effects of hand trembling occurring in an operation to take a still picture by adoption of a sensorless technique using no gyro (or acceleration) sensor is very meaningful.

In order to implement such a process, as described before, a promising method is taken as a method to identify a hand-trembling motion vector in a sensorless way by adoption of the block-matching technique and compensate the image pickup apparatus for effects of hand trembling by using the identified vector. In the present state, however, the solution of adopting the block-matching technique has a problem that a proposal meeting all demands for a small processing-circuit size, a high processing speed, and excellent robustness has not been made.

The block-matching technique has the biggest problem caused by the increased size of the correlation-value table. In the example described above, the correlation-value table is a SAD table. As already described earlier, at the present time where the image generated in a digital camera is necessary to have a size of at least five million pixels as a precondition, the size of the correlation-value table unavoidably increases in proportion to the number of pixels composing the image and, on the top of that, a rate of about three fps is taken in the case of a still picture. Thus, a hand-trembling search range with a size of about 10 times the size of the hand-trembling search range for a moving picture generated at a rate of 60 fps is necessary for a still picture. The increased size of the hand-trembling search range is equivalent to the increased size of the correlation-value table, and the increased size of the correlation-value table is regarded as the biggest problem raised by the block-matching technique.

A result of evaluation given by a number of users obviously indicates that, on the assumption that the entire area of a frame is 100, the size of the hand-trembling search area is about ±10%. In the case of a high-performance image pickup apparatus, the number of pixels composing the image is already assumed to be 12,000,000 and, with the technology in related art adopted as it is, the size of the necessary correlation-value table is estimated to be about 80 megabits. In addition, if an attempt is made to satisfy a realistic processing speed, an SRAM (Static RAM (Random Access Memory)) is necessary as a memory used for storing the correlation-value table. In spite of the fact that the semiconductor process rule is said to be making progress, this size of about 80 megabits is far away from a realistic level, being greater than a realistic value by about three digits.

SUMMARY

Addressing the problems described above, inventors of the present application have provided an image-processing method and apparatus allowing the size of a correlation-value table used in a process to identify a motion vector between two frames by adoption of the block-matching technique to be substantially reduced.

In addition, among the proposed methods in related art in the field of block matching, with regard to a technique disclosed in patent document 4 as a technique to reduce the size of the correlation-value table by carrying out an image conversion process to contract the image, the inventors pointed out the following two problems. One of the problems is an increased processing time and a raised memory size, which are caused by the image conversion process to contract the image. The other problem is an increased processing-circuit size caused by implementation of a proper robustness filter for avoiding aliasing in execution of the image conversion process to contract the image. It is thus desirable to solve these problems.

In order to solve the problems described above, as an invention according to an embodiment, an image processing apparatus for identifying a motion vector executes the steps of:

setting a plurality of reference blocks in a search range set on a reference screen as reference blocks each having a size equal to a target block set at a predetermined position on a target screen as a target block having a predetermined size covering a plurality of pixels;

searching the search area for a specific reference block having a strongest correlation among correlations between the reference blocks and the target block; and detecting the motion vector on the basis of a shift of the specific reference block over the search range on the reference screen from a position corresponding to the predetermined position of the target block on the target screen. The image processing apparatus has:

correlation-value computation means configured to compute correlation values each representing a correlation between one of the reference blocks and the target block on the basis of pixel values of a plurality of pixels located at points on each of the reference blocks and pixel values of a plurality of pixels located at corresponding points on the target block;

table generation means configured to generate a contracted correlation-value table by:

storing a correlation value computed by the correlation-value computation means for a reference vector as it is in a table element included in the contracted correlation-value table as a table element associated with a contracted reference vector obtained as a result of contracting the reference vector, which represents a shift of a reference block over the reference screen from a position corresponding to the predetermined position of the target block on the target screen, at a predetermined contraction factor; or finding a plurality of component correlation values each associated with a specific one of a plurality of close contracted reference vectors located close to the contracted reference vector by splitting a correlation value computed by the correlation-value computation means for the reference vector contracted to produce the contracted reference vector and storing each of the component correlation values in a table element included in the contracted correlation-value table as a table element associated with the specific close contracted reference vector; and motion-vector computation means configured to find a motion vector between the target screen and the reference screen on the basis of the component correlation values stored in the contracted correlation-value table.

Another embodiment is provided, where the table generation means further has:

component correlation value computation means configured to find a plurality of component correlation values each associated with a specific one of a plurality of close contracted reference vectors located close to a contracted reference vector by splitting a correlation value computed by the correlation-value computation means for an aforementioned reference vector contracted to produce the contracted reference vector and store each of the component correlation values in a table element included in the contracted correlation-value table as a table element associated with the specific close contracted reference vector if there are a plurality of aforementioned close contracted reference vectors; and a final component correlation value computation means configured to find a final component correlation value representing a cumulative sum obtained by cumulatively adding a new component correlation value newly computed by the component correlation value computation means to a previous component correlation value already stored in a table element of the contracted correlation-value table as a component correlation value computed previously by the component correlation value computation means.

The correlation-value computation means employed in the image processing apparatus with a configuration according to the present invention as described above computes a correlation value representing a correlation between the target block on a target frame and each reference block in the search range on a reference frame in the same way as the image processing apparatus in related art.

However, the image processing apparatus with a configuration according to an embodiment includes the table generation means for computing a component correlation value associated with a contracted reference vector obtained as a result of a process to contract a pre-contraction original reference vector and storing the computed component correlation value obtained as a result of a process to contract the pre-contraction original correlation-value table instead of storing a correlation value representing a correlation between the target block and a reference block as a table element associated with a pre-contraction original reference vector corresponding to the reference block.

The process to contract the pre-contraction original correlation-value table is a process to reduce the size of the table, resulting in fewer table elements. On the other hand, the process to contract a pre-contraction original reference vector is a process to reduce the pre-contraction original reference vector, resulting in as many contracted reference vectors as original reference vectors prior to the process. Thus, each table element of the contracted correlation-value table is associated with a contracted reference vector or one of a plurality of close contracted reference vectors located close to the contracted reference vector. The number of table elements in the contracted correlation-value table is determined by a contraction factor used in the process to contract the correlation-value table.

In other words, a contracted correlation-value table is a table for a contracted frame image that would be obtained as a result of a hypothetical process of contracting an original frame image at a contraction factor of the contracted reference vector. In actuality, however, the sizes of the target frame image, the reference frame image, the target block, and each reference block do not change. The size of the correlation-value table and the length of each reference vector are reduced.

The contracted correlation-value table is searched for a specific table element used for storing a final component correlation value representing the strongest correlation between the target block and a reference block. Typically, the final component correlation value representing the strongest correlation between the target block and a reference block is a smallest value among all final component correlation values stored in the contracted correlation-value table. As described above, each table element of the contracted correlation-value table is associated with a contracted reference vector or one of a plurality of contracted reference vectors located close to the contracted reference vector. Thus, a desired contracted reference vector is selected from the contracted reference vector associated with the specific table element or one of the close contracted reference vectors, which is associated with the specific table element, and the original motion vector is found by multiplying the desired contracted reference vector by the contraction factor.

In an embodiment, a process to contract an image is not necessary. Thus, there is neither a processing-time increase caused by the process to contract an image and nor a memory-capacitance increase necessary by the process.

As described above, each table element of the contracted correlation-value table is associated with a contracted reference vector or one of a plurality of contracted reference vectors located close to the contracted reference vector. Thus, a contracted reference vector does not correspond to a table element of the contracted correlation-value table on a one-to-one basis. If a table element does not correspond to a contracted reference vector, that is, if a table element corresponds to a specific one of a plurality of contracted reference vectors located close to the contracted reference vector, the table generation means employed in the invention according to the other embodiment computes a component correlation value for the specific close contracted reference vector. Then, the table generation means stores the computed component correlation value in the table element associated with the specific close contracted reference vector.

A correlation value for any contracted reference vector is found by the correlation-value computation means by carrying out a cumulative addition process to cumulatively add a computed value to a temporary sum repeatedly till all pixels in a reference block associated with the contracted reference vector are taken into account in the same way as the block-matching technique in related art.

As described above, a correlation value representing a correlation between the target block in the original frame and a reference block in the reference frame is computed for any specific contracted reference vector associated with the reference block by carrying out a cumulative addition process to cumulatively add a computed value a temporary sum. Instead of storing the correlation value computed for the specific contracted reference vector in a table element of the contracted correlation-value table as it is, a plurality of component correlation values may have to be found for contracted reference vectors located close to the specific contracted reference vector by splitting the correlation value computed for the specific contracted reference vector. The process to find component correlation values for contracted reference vectors located close to a specific contracted reference vector by splitting a correlation value computed for the specific contracted reference vector is by itself equivalent to a suitable filter process adapted to the contraction factor. Thus, implementation of a low-pass filter like one necessary for contracting an image is not necessary.

In an embodiment, in a process to detect a motion vector representing a shift of a reference frame from a target frame by adoption of a block-matching technique, the size of a correlation-value table used in the process can be reduced considerably. In addition, since a process to contract an image is not necessary, there is neither a processing-time increase caused by the process to contract an image and nor a memory-capacitance increase due to the contracting process. On the top of that, since a correlation value can be found on the basis of all pixels in a target block on a target frame, implementation of a low-pass filter like one necessary for contracting an image is unnecessary so that the problem of an increase in processing-circuit size is not raised.

Additional features and advantages are described herein, and will be apparent from, the following Detailed Description and the figures.

BRIEF DESCRIPTION OF THE FIGURES

FIGS. 8A and 8B are each an explanatory diagram to be referred to in describing a process to detect an accurate motion vector in accordance with the first typical implementation of the image processing method according to an embodiment;

FIGS. 11A and 11B are each an explanatory diagram to be referred to in describing a process to detect an accurate motion vector in accordance with the first typical implementation of the image processing method according to an embodiment;

FIG. 19 is an explanatory diagram to be referred to in describing the performance of the image processing method according to an embodiment;

FIG. 20 is an explanatory diagram to be referred to in describing an outline of the image processing method according to another embodiment;

FIG. 21 is an explanatory diagram comparing the characteristic of the image processing method according to an embodiment with that of the method in related art;

FIG. 22 is an explanatory diagram comparing the characteristic of the image processing method according to an embodiment with that of the method in related art;

DETAILED DESCRIPTION

Embodiments implementing the image processing method and image processing apparatus are described below with reference to the drawings as follows.

Also in an embodiment implementing the image processing method provided by the invention, a motion vector between two frames is identified by adoption of the block-matching technique described above. Instead of storing a correlation value representing a correlation between the target block and a reference block as a table element associated with a reference vector corresponding to the reference block, the correlation-value table is contracted with fewer table elements and each reference vector is contracted into a contracted reference vector. The process to contract the correlation-value table and each reference vector result in fewer table elements and as many contracted reference vectors as vectors prior to the process. Thus, instead of storing the correlation value computed for a specific contracted reference vector in a table element as it is, a plurality of component correlation values may have to be found for contracted reference vectors located close to the specific contracted reference vector by splitting a correlation value, and stored in different table elements as elements associated with the close contracted reference vectors.

The size of the correlation-value table according to the embodiments is considerably small in comparison with the size of the correlation-value table used in the image processing apparatus in related art. It is to be noted that, in the embodiments explained in following description, a correlation value is a SAD value and, hence, a SAD table is generated as the correlation-value table. Thus, in the embodiments, a correlation value representing a strongest correlation between the target block and a reference block is a minimum SAD value.

Figure 1:
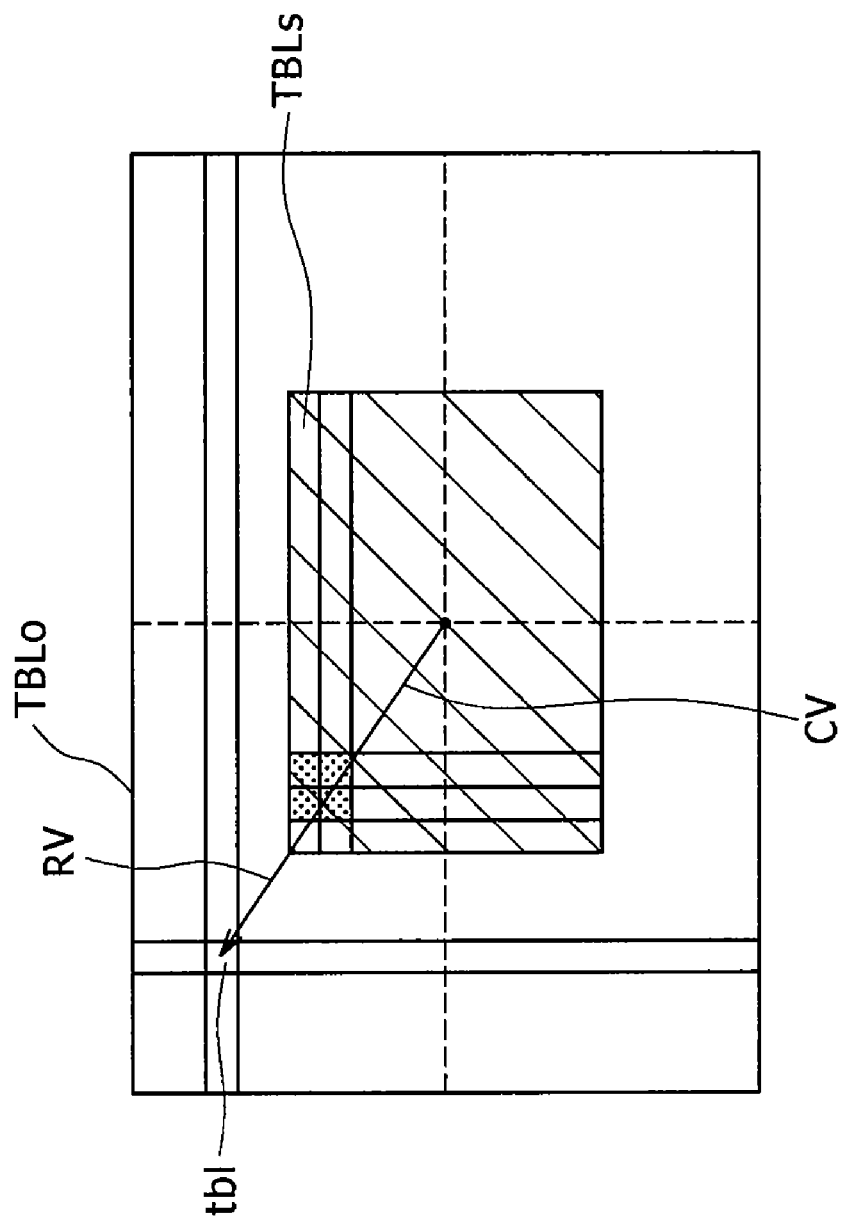
FIG. 1 is an explanatory diagram to be referred to in describing an outline of an image processing method according to an embodiment.
Figure 2A:
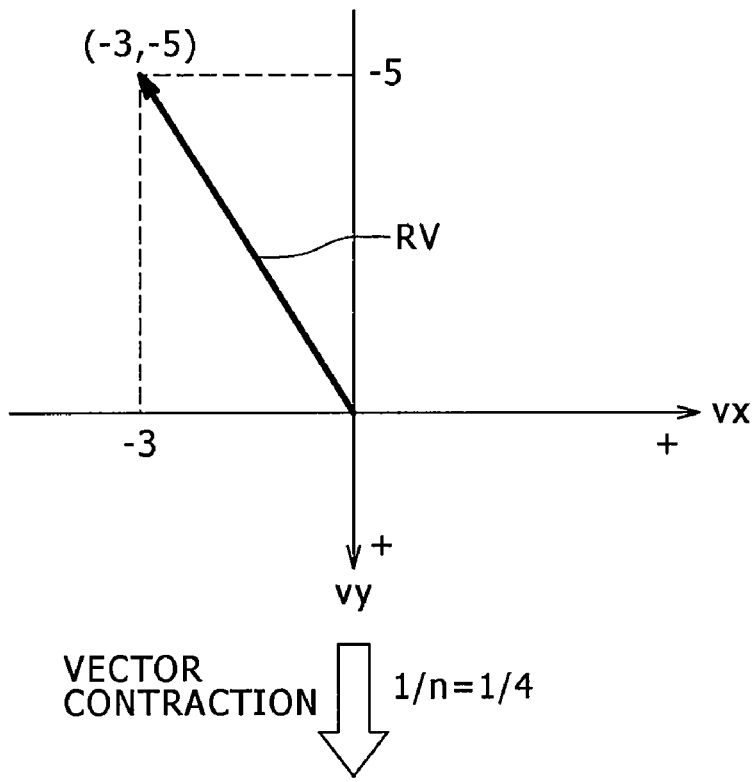
FIGS. 2A and 2B are each an explanatory diagram to be referred to in describing an outline of the image processing method according to an embodiment.
Figure 2B:
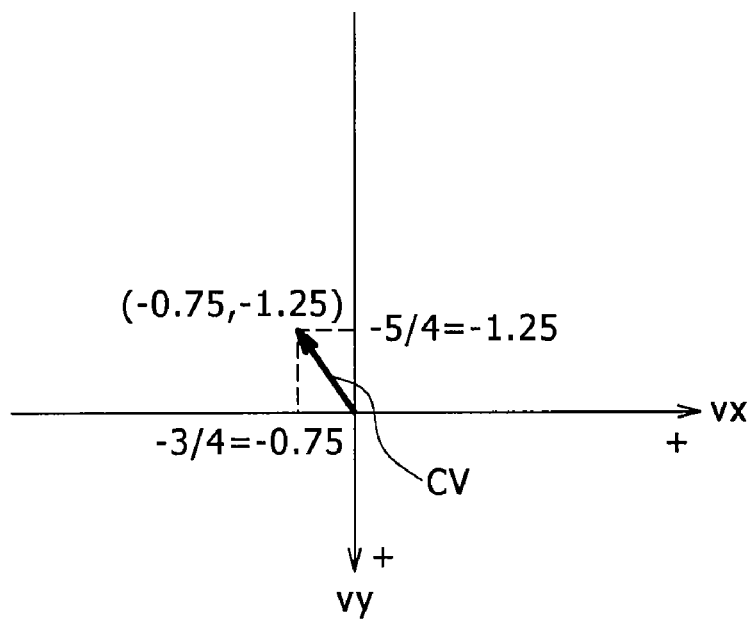
Figure 3:
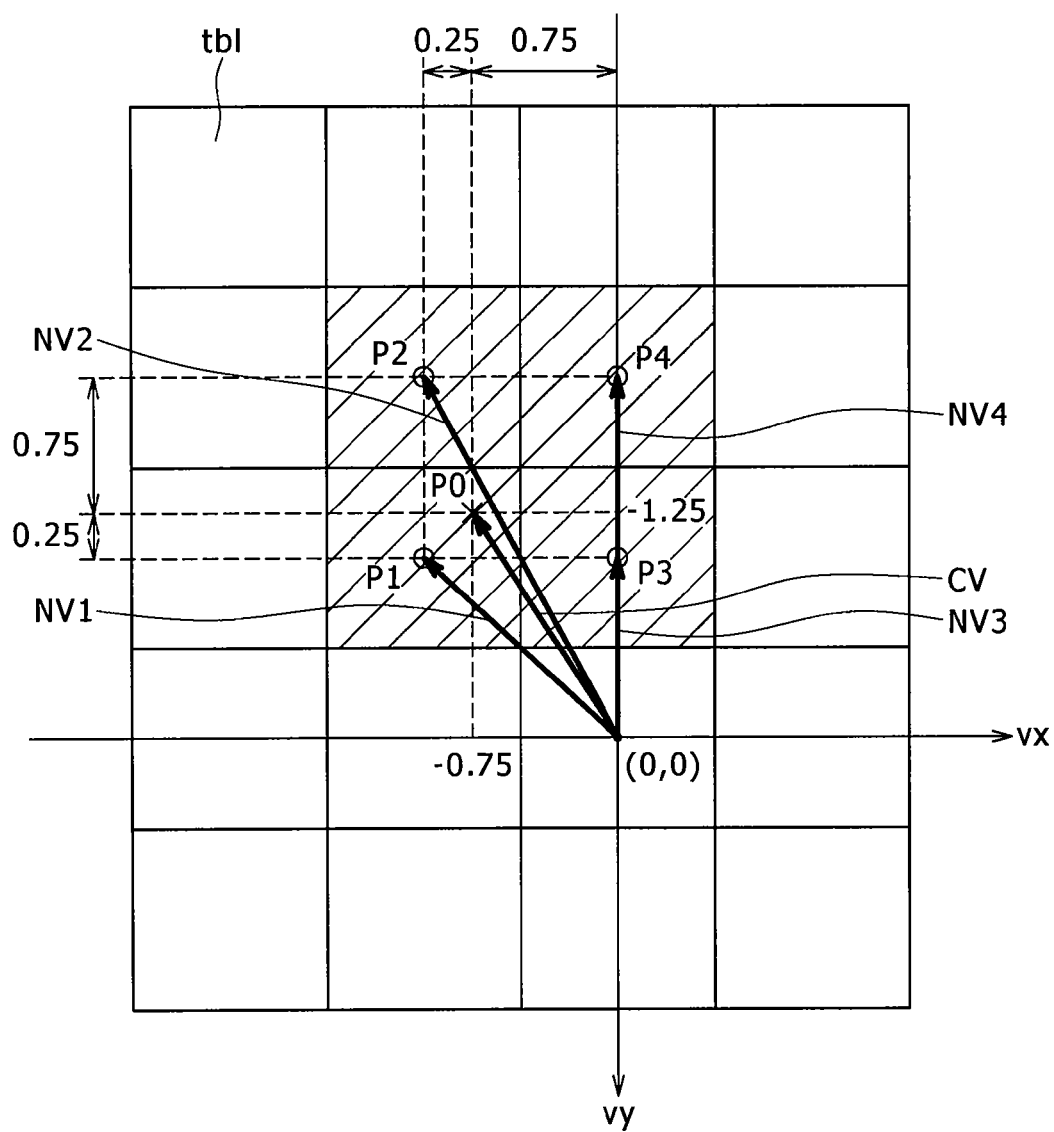
FIG. 3 is an explanatory diagram to be referred to in describing an outline of the image processing method according to an embodiment.

FIGS. 1 to 3 are each a diagram referred to in explaining an outline of an image processing method according to an embodiment. To be more specific, FIG. 1 is a diagram showing a relation of the correlation-value table TBLo in related art, which is a SAD table in the case of the embodiment, and a contracted SAD table generated by the image processing method according to an embodiment as a contracted correlation-value table TBLs.

As described earlier by referring to FIG. 42, also in the case of this embodiment, a search range is set with the center of the range coinciding with the center of a reference frame and the center of the reference frame corresponds to the center of a target frame to be compared with the reference frame. The center of the target frame also coincides with the center of a target block included in the target frame as a block to be compared with the reference block moved from position to position over the search range. A SAD value for the reference block positioned at one of the locations is the sum of the absolute value of the difference between the pixel value of each pixel on the target block and the pixel value of the counterpart pixel on the reference block.

In the image processing apparatus in related art, a computed correlation value is stored in a SAD table TBLo as a table element tbl located at an address corresponding to a reference vector RV of a reference block being processed as shown in FIG. 1.

Thus, in the case of the block-matching technique, a reference vector RV representing the magnitude of a shift from a target block to a reference block over a frame image is associated with a correlation value stored as a table element for the reference block in the correlation-value table TBLo on a one-with-one basis. That is to say, the number of table elements composing the correlation-value table TBLo in related art is equal to the number of reference vectors RV that can be set in the search range.

In the case of the block-matching technique according to this embodiment, on the other hand, as shown in FIGS. 1, 2A and 2B, each reference vector RV pointing to a reference block being processed is contracted at a contraction factor of 1/n, where notation n denotes an integer, into a contracted reference vector CV.

In the following description, in order to make the explanation easy to understand, the horizontal-direction contraction factor is assumed to be equal to the vertical-direction contraction factor. However, the horizontal-direction contraction factor and the vertical-direction contraction factor can also be set independently of each other at values different from each other. In addition, as will be described later, the horizontal-direction contraction factor and the vertical-direction contraction factor are rather set independently of each other at any arbitrary fractions (such as 1/m and 1/n, where notations m and n each denote an integer) in order to provide a higher degree of flexibility as well as a higher degree of convenience.

Also in the case of this embodiment, much like the image-processing method in related art, the position of the target block is taken as the origin position (0, 0) at the center of the search range. The horizontal-direction and vertical-direction components (vx, vy) of a reference vector RV are each an integer representing horizontal-direction and vertical-direction magnitudes measured from the origin position (0, 0). In the following description, a reference vector RV having horizontal-direction and vertical-direction components (vx, vy) is referred to as a reference vector RV (vx, vy).

A reference vector RV (vx, vy) is contracted at a contraction factor of 1/n into a contracted reference vector CV (vx/n, vy/n). Thus, the horizontal-direction and vertical-direction components (vx/n, vy/n) of the contracted reference vector CV (vx/n, vy/n) are not necessarily integers. That is to say, they may each be a value including a fraction part in some cases. Thus, if a correlation value computed for a pre-contraction original reference vector RV is merely stored as an element included in the contracted correlation-value table as an element associated with a contracted reference vector closest to the non-integer vx/n and vy/n values of the contracted reference vector CV in this embodiment, an error will be generated. In addition, while the number of elements in the contracted correlation-value table is smaller than the number of elements in the original correlation-value table, the number of contracted reference vectors CVs is equal to the number of pre-contraction original reference vectors RVs. Thus, contracted reference vectors CVs are not associated with elements in the contracted correlation-value table on a one-with-one basis.

A close reference vector NV (vx/n, vy/n) is defined as a contracted reference vector having an integer vx/n value closest to the non-integer vx/n value of the contracted reference vector RV (vx/n, vy/n) or an integer vy/n value closest to the non-integer vy/n value of the contracted reference vector RV (vx/n, vy/n). A plurality of close reference vectors NVs exist close to every contracted reference vector RV. Since contracted reference vectors CVs are not associated with elements on a one-with-one basis as described above, in this embodiment, a SAD value computed for the pre-contraction original reference vector of a contracted reference vector CV is not stored in an element of the contracted correlation-value table as it is. Instead, the SAD value computed for the pre-contraction original reference vector of a contracted reference vector CV is split by adoption of a linear weighted distribution technique into as many component SAD values as close reference vectors NVs located close to the contracted reference vector CV.

A contracted reference vector CV (vx/n, vy/n) having non-integer vx/n and vy/n values is not associated with a table element tbl of the contracted table element. However, close reference vectors NV (vx/n, vy/n) each having integer vx/n and vy/n values are associated with table elements tbl of the contracted table element on a one-with-one basis. Thus, in this embodiment, a component SAD value computed by adoption of the linear weighted distribution technique is stored in the table element tbl associated with the close reference vector NV in a cumulative addition process carried out in the same way as the process to store a SAD value as an element associated with the pre-contraction original reference vector in accordance with the block-matching technique in related art. The linear weighted distribution technique is a method based on the distances between a position pointed to by a contracted reference vector CV and positions pointed to by close reference vectors NV located close to the contracted reference vector CV.

To be more specific, weights used in the process to find component correlation values for close reference vectors NV by adoption of the linear weighted distribution technique are determined on the basis of the distances between a position pointed to by a contracted reference vector CV and positions pointed to by close reference vectors NV located close to the contracted reference vector CV as described above. Then, a final component correlation value for each of the close reference vectors NV is found in the same way as the block-matching technique in related art of cumulatively adding a currently calculated value to a temporary sum as described earlier.

It is to be noted that, if the values (vx/n, vy/n) of a contracted reference vector CV (vx/n, vy/n) are each an integer, the contracted reference vector CV (vx/n, vy/n) itself is associated with an element of the contracted correlation-value table on a one-with-one basis. Thus, in the table element associated with the contracted reference vector CV (vx/n, vy/n), the SAD value corresponding to the reference vector RV (vx, vy) itself can be stored. In addition, in the case of such a contracted reference vector CV (vx/n, vy/n), it is not necessary to determine a plurality of close reference vectors NVs for the contracted reference vector CV (vx/n, vy/n).

Next, the processing described above is explained by giving an example as follows. As described before, the target block is placed at the origin position (0, 0). In this case, let us assume that a reference vector RV (−3, −5) shown in FIG. 2A is contracted in both the horizontal and vertical directions at a contraction factor of 1/n (=¼) to result in a contracted reference vector CV (−0.75, −1.25) shown in FIG. 2B.

As described above, the values of the resulting contracted reference vector CV each include a fraction part, indicating that it is necessary to determine a plurality of close reference vectors NVs for the contracted reference vector CV.

In an example shown in FIG. 3, four close reference vectors NV1 (−1, −1), NV2 (−1, −2), NV3 (0, −1), and NV4 (0, −2) are determined for the contracted reference vector CV (−0.75, −1.25). As is evident from the example shown in FIG. 3, a plurality of such close reference vectors are selected that the values of each of the close reference vectors are integers closest to the values of the contracted reference vector.

In the example shown in FIG. 3, the four close reference vectors NV1, NV2, NV3, and NV4 are vectors pointing from the origin point (0, 0) to positions P1, P2, P3, and P4 respectively, which are each shown as a circle. On the other hand, the contracted reference vector CV is a vector pointing from the origin point (0, 0) to a point P0 shown as notation X.

Then, in the case of this embodiment, a component correlation value for each of the four close reference vectors NV1, NV2, NV3, and NV4 is computed by adoption of the linear weighted distribution technique as described above, and a final component correlation value for each close reference vectors NV is found in the same way as the block-matching technique in related art of cumulatively adding a currently calculated value to a temporary sum.

Next, weights to be used in a process to find the component correlation values for the close reference vectors NV1, NV2, NV3, and NV4 are determined as follows. As described above, the contracted reference vector CV points to the point P0 (−0.75, −1.25) whereas the close reference vectors NV1, NV2, NV3, and NV4 point to the positions P1 (−1, −1), P2 (−1, −2), P3 (0, −1), and P4 (0, −2) respectively. Thus, (the distance between the positions P0 and P1):(the distance between the positions P0 and P2):(the distance between the positions P0 and P3):(the distance between the positions P0 and P4)=1:3:3:9. Since weights are inversely proportional to distances, typical weights of $9/16$, $3/16$, $3/16$ and $1/16$ are assigned to the four close reference vectors NV1, NV2, NV3, and NV4 respectively.

Let us assume that the correlation value computed for the pre-contraction original reference vector RV serving as the origin of the contracted reference vector CV is Sα. In this case, component correlation values SADp1, SADp2, SADp3, SADp4 for the close reference vectors NV1, NV2, NV3, and NV4 pointing to the positions P1, P3, P3, and P4 respectively are found as follows:

$$SADp1 = S\alpha \times 9/16$$

$$SADp2 = S\alpha \times 3/16$$

$$SADp3 = S\alpha \times 3/16$$

$$SADp4 = S\alpha \times 1/16$$

Final component correlation values of the component correlation values SADp1, SADp2, SADp3, and SADp4 for the four close reference vectors NV1, NV2, NV3, and NV4 are computed in the same way as the block-matching technique in related art of cumulatively adding currently calculated values to temporary sums and stored in table elements included in the contracted correlation-value table as elements provided for the four close reference vectors NV1, NV2, NV3, and NV4 pointing to the positions P0, P1, P2, P3, and P4 respectively.

In this embodiment, the process to contract a reference vector into a contracted reference vector and the process to compute a component SAD for an element included the contracted correlation-value table as an element associated with a close reference vector are carried out for all reference vectors each pointing to a reference block set in the search range.

As is evident from the descriptions given so far, in this embodiment, the process to contract each reference vector RV into a contracted reference vector CV is carried out at a contraction factor of 1/n to accompany a process of contracting the correlation-value table TBLo at the same contraction factor of 1/n in both the horizontal and vertical directions in order to generate a contracted correlation-value table TBLs with a contracted size. The correlation-value table TBLo has the original size and includes elements associated with reference vectors RVs on a one-with-one basis. Then, a component SAD value is computed for each element of the contracted correlation-value table TBLs by splitting a SAD value computed for a reference block pointed to by a reference vector RV serving as the origin of a contracted reference vector CV associated with the element. For more information, the reader is suggested to refer to FIG. 1.

Thus, in the case of this embodiment, the number of elements composing the contracted correlation-value table TBLs is $(1/n^2)$ times the number of elements composing the original correlation-value table TBLo. That is to say, the size of the correlation-value table can be reduced substantially.

In accordance with the above description of the embodiment, for each element of the contracted correlation-value table TBLs, four close reference vectors NVs in the close contracted reference vector CV are selected and, then, component correlation values for the selected close reference vectors NVs are found from a correlation value computed for a processed reference block pointed to by a reference vector RV serving as the origin of the contracted reference vector CV. A component correlation value for a close reference vector NV located in the close contracted reference vector CV is found in a process based on the so-called linear weighted distribution technique to split a correlation value computed for the a reference block pointed to by the reference vector RV serving as the origin of the contracted reference vector CV. It is to be noted, however, that the method of selecting close reference vectors NV close to a contracted reference vector CV and the linear weighted distribution technique of finding a component correlation value for every element of the contracted correlation-value table TBLs are by no means limited to those adopted by the embodiment.

For example, as an alternative, for each element of the contracted correlation-value table TBLs, nine or 16 close reference vectors NVs close to a contracted reference vector CV are selected, then, then, component correlation values for the selected close reference vectors NVs are found from a correlation value computed for a processed reference block pointed to by a reference vector RV serving as the origin of the contracted reference vector CV. In this case, however, a component correlation value for a close reference vector NV located close to a contracted reference vector CV is found in a process based on the so-called cubic interpolation technique to split a correlation value computed for the a reference block pointed to by the reference vector RV serving as the origin of the contracted reference vector CV. By carrying out these processes, the precision of the component correlation value is improved. If a stronger emphasis is to be laid upon a real-time necessity and reduction of the processing-circuit count, the process of finding component correlation values of four close reference vectors NV is more effective.

Also in the case of this embodiment, a component correlation value is stored as an element of the contracted correlation-value table, which is a contracted SAD table, in a cumulative addition process carried out in the same way in related art whereby a correlation value is stored as an element of the original correlation-value table for each of locations included in the search range as locations to which the reference block is to be moved.

However, in the case of the block-matching technique in related art, reference vectors are associated with the addresses of the elements composing the correlation-value table on a one-with-one basis so that a correlation value is computed for each reference block corresponding to a reference vector and merely stored in the correlation-value table as an element associated with the reference vector. In the case of the technique according to this embodiment, on the other hand, reference vectors are associated with the addresses of the elements composing the contracted correlation-value table (or the contracted SAD table) not on a one-with-one basis. Thus, a correlation value computed for a reference block is spilt into a plurality of component reference values, which are each then stored in the contracted correlation-value table as an element corresponding to one of close reference vectors associated with the component reference values. Much like every element of the correlation-value table, the memory locations each used for storing a computed component reference value are each also initialized to 0 at an initial time.

As described before, a correlation value stored in the correlation-value table according to the block-matching technique in related art as an element of the correlation-value table is a SAD value. Then, in the case of the block-matching technique in related art, the correlation-value table is searched for a table element used for storing a minimum SAD value indicating a strongest correlation between the target block on the target frame and a reference block on the reference frame. Then, a reference vector pointing to address of the table element used for storing the minimum SAD value is taken as a motion vector representing a movement from the position of the target frame to the position of the reference frame.

In the case of the embodiments, on the other hand, a correlation value stored in the contracted correlation-value table according to the embodiment as an element of the contracted correlation-value table is a component correlation value, which is also a SAD value. Then, the contracted correlation-value table is searched for a table element used for storing a minimum SAD value and a plurality of reference blocks included in the reference frame as blocks pointed to by their respective close reference vectors, from which a motion vector is identified because each of the close reference vectors may not necessarily be an accurate motion vector.

As a most reasonable technique to identify a motion vector from close reference vectors associated with such a table element of the contracted correlation-value table, the contracted correlation-value table is restored to the original correlation-value table by multiplying the size of the contracted correlation-value table by an integer n (which is the reciprocal of the contraction factor of 1/n). Then, an element included in the original correlation-value table as an element corresponding to the detected element of the contracted correlation-value table is identified. Finally, a motion vector pointing to the selected element of the original correlation-value table is determined. However, this technique can be adopted for an image processing apparatus tolerating errors to a certain degree.

In order to detect a motion vector with a higher degree of accuracy, it is necessary to carry out one of typical interpolation processes described below on element values stored in the contracted correlation-value table. By carrying out one of the typical interpolation processes, an accurate motion vector can be detected with the original degree of precision.

[First Typical Interpolation Process to Detect a Motion Vector with a Higher Degree of Accuracy]

A first typical interpolation process to detect a motion vector with a higher degree of accuracy adopts a technique whereby a plurality of correlation values stored in elements of the contracted correlation-value table are approximated by using a quadratic surface. This technique is a technique obtained by applying the method described in patent document 1 cited before to a contracted correlation-value table.

In this embodiment, since a SAD value is used as a correlation value, the smaller the correlation value, the stronger the correlation indicated by the correlation value. Thus, in this embodiment, the contracted correlation-value table is searched for a specific table element used for storing a minimum correlation value indicating a strongest correlation and a plurality of reference blocks included in the reference frame as blocks pointed to by their respective close reference vectors. A table element of the contracted correlation-value table can be searched for at table-address precision, which is the precision of the integer level. In addition, a plurality of close table elements in a table area centered at the specific table element already detected at the precision of the integer level as an area in the contracted correlation-value table are also each identified also at the precision of the integer level. Then, by adoption of the method of least squares, a quadratic surface is found as a surface representing the correlation values stored in the contracted correlation-value table as the specific table element and the close table elements detected in the table area. Subsequently, the minimum value of the quadratic surface representing the correlation values is determined and the position of the correlation value determined as the minimum value is identified as a position shifted from the origin position (0, 0). The identified position of a correlation value determined as the minimum value corresponds to a location included in the search area on the reference frame as the location of a reference block exhibiting the strongest correlation with the target block. The identified position is a position included in the contracted correlation-value table (or the contracted SAD table) as a position at an address having precision of the fraction level. Finally, a contracted reference vector pointing to the identified position is detected as a vector pointing to the position identified at the precision of the fraction level.

Figure 4A:
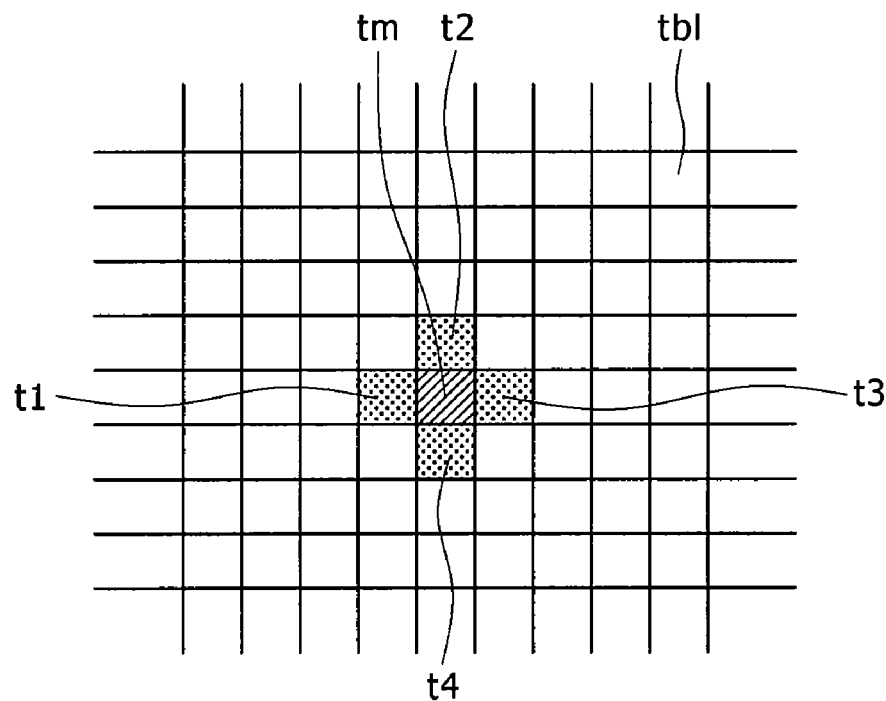
FIGS. 4A and 4B are each an explanatory diagram to be referred to in describing a process to detect an accurate motion vector in accordance with a first typical implementation of the image processing method according to an embodiment.
Figure 4B:
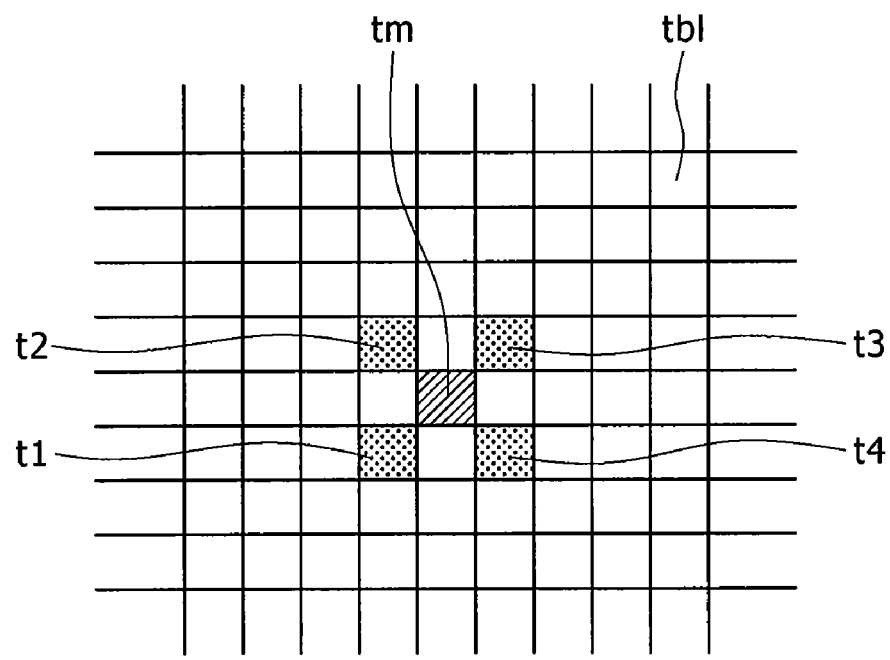

An example of the process to set a quadratic surface is shown in FIG. 4A or 4B. In either of the examples, notation tm denotes the specific table element identified at the precision of the integer level as a table element representing the minimum correlation value. On the other hand, notations t1, t2, t3, and t4 each denote a table element also identified at the precision of the integer level in the table area centered at the specific table element tm. At least four table elements sandwiching the specific table element tm in two directions are necessary.

Figure 5:
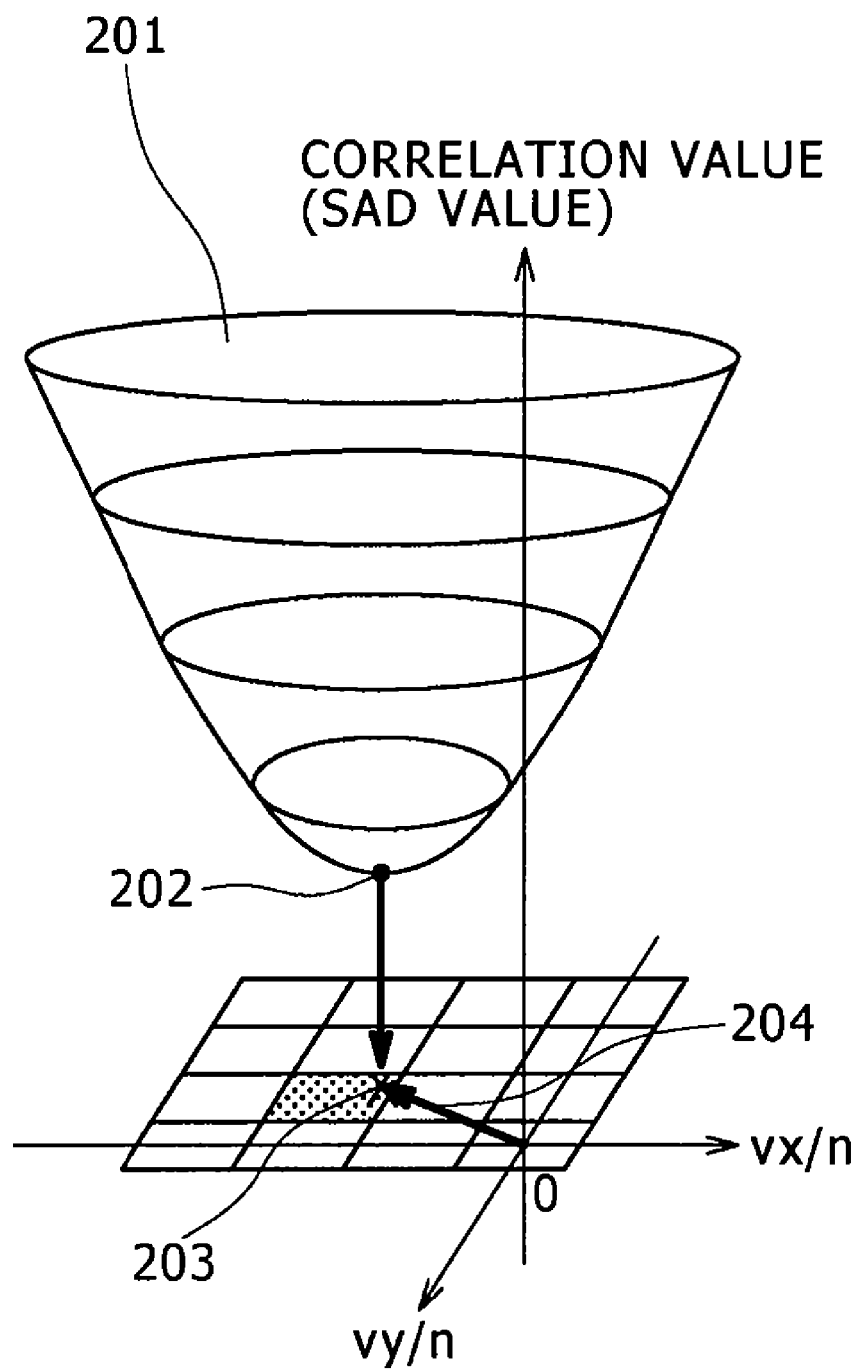
FIG. 5 is an explanatory diagram to be referred to in describing a process to detect an accurate motion vector in accordance with the first typical implementation of the image processing method according to an embodiment.

Then, as shown in FIG. 5, a coordinate space is assumed in the range of contracted reference vectors (or the range of the contracted correlation-value table). The range of contracted reference vectors corresponds to the search range of the reference frame. The position of the target frame (or, strictly speaking, the position of the target-block projected image block 104 shown in FIG. 42) is taken as the origin position (0, 0) of the coordinate space. The vertical Z axis (or the correlation-value axis) is taken as an axis representing the correlation value, which decreases inversely proportional to the correlation between the reference and target blocks. The horizontal x axis (or a vx/n axis) is taken as an axis representing the shift of the reference block from the target block in the x direction or an axis representing the value vx/n of the contracted reference vector. By the same token, the horizontal y axis (or a vy/n axis) is taken as an axis representing the shift of the reference block from the target block in the y direction perpendicular to the x direction or an axis representing the value vy/n of the contracted reference vector.

Then, from the correlation value of the minimum-value table element tm identified at the precision of the integer level as well as the correlation values of the two table elements t1 and t3 identified also at the precision of the integer level as table elements sandwiching the minimum-value table element tm in a specific direction, a quadratic curve is created in the coordinate space shown in FIG. 5. By the same token, from the correlation value of the minimum-value table element tm as well as the correlation values of the two table elements t2 and t4 identified also at the precision of the integer level as table elements sandwiching the minimum-value table element tm in another direction perpendicular to the specific direction, another quadratic curve is created in the coordinate space. Then, an approximation quadratic surface 201 including these two quadratic curves is found in the coordinate space shown in FIG. 5 by adopting the method of least squares.

Figure 6:
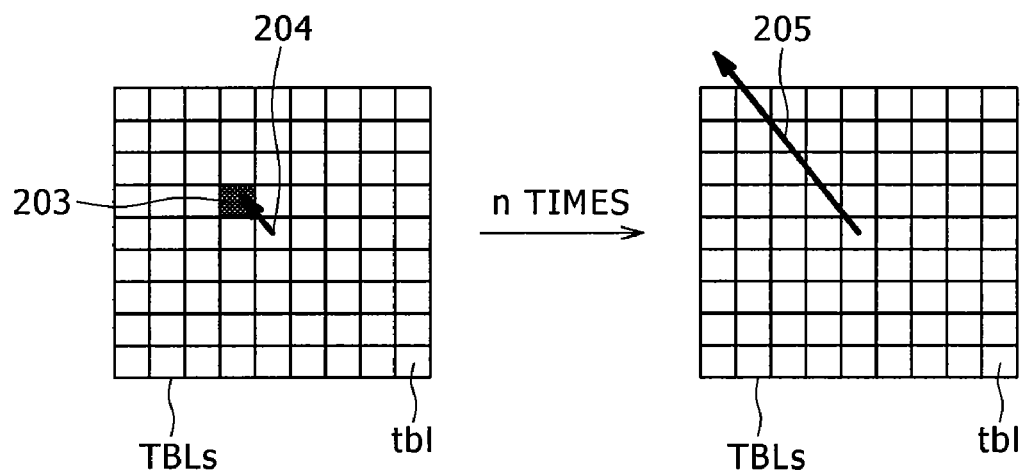
FIG. 6 is an explanatory diagram to be referred to in describing an outline of the image processing method according to an embodiment.

Subsequently, a minimum-value point 202 of the approximation quadratic surface 201 is detected at a position 203 existing on the X-Y plane as a position with coordinates of (vx/n, vy/n) as shown in FIG. 5. The position (vx/n, vy/n) is a position identified at the precision of the fraction level as the position of a table element (or a table-element address) with the smallest correlation value in the contracted correlation-value table. Finally, a minimum-value vector 204 pointing to the position (vx/n, vy/n) identified at the precision of the fraction level is determined, and the motion vector 205 with the original magnitude and the original direction is computed by multiplying the minimum-value vector 204 by the reciprocal value n of the contraction factor as shown in FIG. 6.

Figure 7:
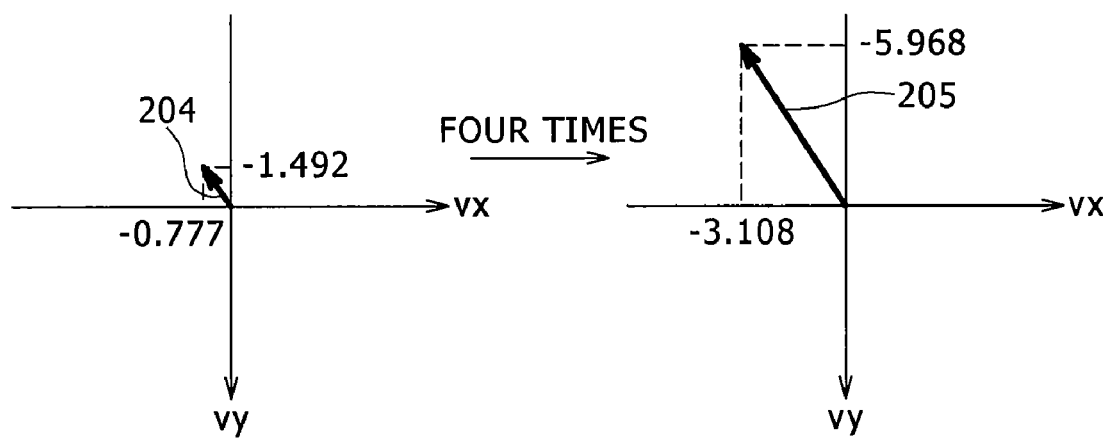
FIG. 7 is an explanatory diagram to be referred to in describing an outline of the image processing method according to an embodiment.

For example, a contracted correlation-value table TBLs shown in FIG. 7 is obtained by contracting the original correlation-value table to accompany a process of contracting reference vectors at a contraction factor of ¼, and a motion vector 204 (−0.777, −1.492) is found from the address of the minimum-value table element identified at the precision of the fraction level. In this case, the minimum-value vector 204 is multiplied by four to obtain the original motion vector 205 (−3.108, −5.968). The motion vector 205 is a motion vector at the original scale of the image.

In accordance with an embodiment described above, the contracted correlation-value table is searched for a specific table element tm used for storing a minimum correlation value indicating a strongest correlation and four close table elements in a table area centered at the specific table element tm. In order to set an approximation quadratic surface of correlation values, however, it is better to find a larger number of close table elements in such a table area. For this reason, in general, close table elements in a rectangular table area centered at the specific table element tm detected at the precision of the integer level as an area including m×m table elements (where notation m denotes an integer at least equal to three) in the horizontal and vertical directions are found.

However, a larger number of close table elements is not necessarily better. This is because close table elements in such a large table area leads to an increased amount of processing. In addition, if the number of close table elements is increased, it will be more likely within the bounds of possibility that a false local minimum value dependent on the image pattern is inevitably detected. Thus, table elements in a rectangular table area including a proper number of close table elements are selected.

The following description explains two examples of the rectangular table area included in the contracted correlation-value table as an area containing a proper number of close table elements. One of the examples according to this embodiment is a rectangular table area centered at the minimum-value table element tm found at the precision of the integer level as an area containing 3×3 close table elements surrounding the minimum-value table element tm in the horizontal and vertical directions. The other example according to this embodiment is a rectangular table area centered at the minimum-value table element tm found at the precision of the integer level as an area containing 4×4 close table elements surrounding the minimum-value table element tm in the horizontal and vertical directions.

[Rectangular Table Area Including 3×3 Table Elements]

FIGS. 8A and 8B are diagrams showing a technique to find a motion vector by using a rectangular table area centered at the minimum-value table element tm found at the precision of the integer level as an area including 3×3 close table elements surrounding the minimum-value table element tm in the horizontal and vertical directions. In FIG. 8A, the table area is shown as a gray block.

In accordance with the technique shown in FIGS. 8A and 8B, an approximation quadratic surface 201 shown in FIG. 8B is set by adopting the method of least squares on the basis of correlation values of the minimum-value table element tm found at the precision of the integer level and 8 close table elements surrounding the minimum-value table element tm as shown in FIG. 8A. Subsequently, a minimum-value point 202 of the approximation quadratic surface 201 is detected at a position 203 existing on the X-Y plane as a position with coordinates of (vx/n, vy/n) as shown in FIG. 8B. The position (vx/n, vy/n) is a position identified at the precision of the fraction level as the position corresponding to a table element (or a table-element address) with the smallest correlation value in the contracted correlation-value table.

Finally, a minimum-value vector 204 pointing to the position 203 identified at the precision of the fraction level as a position of the table element is determined, and the motion vector 205 (or the minimum-value vector) with the original magnitude and the original direction is computed by multiplying the minimum-value vector 204 by the reciprocal value n of the contraction factor as shown in FIG. 6.

Figures 9, 10:
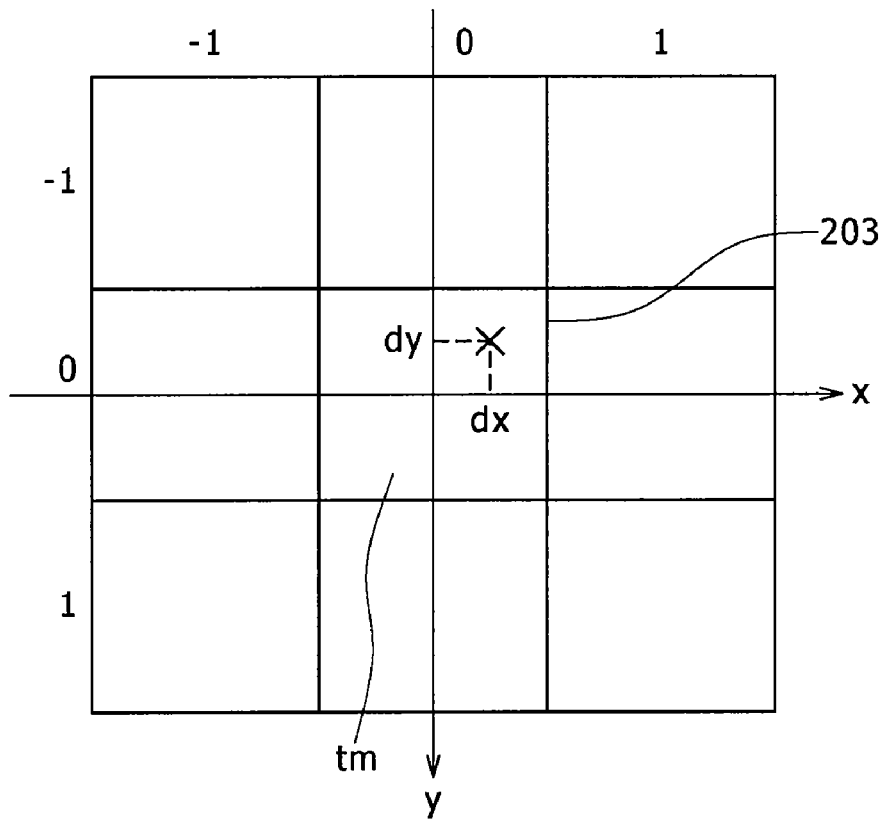
FIG. 9 is an explanatory diagram to be referred to in describing a process to detect an accurate motion vector in accordance with the first typical implementation of the image processing method according to an embodiment.
FIG. 10 is an explanatory diagram to be referred to in describing a process to detect an accurate motion vector in accordance with the first typical implementation of the image processing method according to an embodiment.

A process to find the position 203 corresponding to the minimum-value point 202 on the approximation quadratic surface 201 is carried out by adoption of a method described as follows. As shown in FIG. 9, a coordinate (x, y) system is devised as a system in which the position of the center of the minimum-value table element tm found at the precision of the integer level is taken as the origin point (0, 0). In this case, eight close table elements surrounding the minimum-value table element tm found at the precision of the integer level are located at positions with x-axis coordinates represented by x=−1, x=0, and x=+1 in the horizontal direction and y-axis coordinates represented by y=−1, y=0, and y=+1 in the vertical direction except the position at a coordinate of (x=0 and y=0). That is to say, the eight close table elements surrounding the minimum-value table element tm found at the precision of the integer level are located at coordinates of (−1, −1), (0, −1), (1, −1), (−1, 0), (0, 1), (−1, 1), (0, 1), and (1, 1).

Let us have notation Sxy denote the correlation value of a table element in the coordinate system shown in FIG. 9. For example, the correlation value of the minimum-value table element tm found at the origin position (0, 0) at the precision of the integer level is denoted by symbol $S_{00}$ whereas the correlation value of the close table element at the position (1, 1) on the right side of the minimum-value table element tm and below the minimum-value table element tm is denoted by symbol $S_{11}$.

Thus, the coordinates (dx, dy) of a position observed in the (x, y) coordinate system at the precision of the fraction level with the minimum-value table element tm found at the origin position (0, 0) of the (x, y) coordinate system at the precision of the integer level can be found in accordance with Eqs. (A) and (B) shown in FIG. 10.

In Eqs. (A) and (B) shown in FIG. 10, the values of Kx and Ky are given as follows:

For x=−1, Kx=−1;
for x=0, Kx=0;
for x=1, Kx=1;
for y=−1, Ky=−1;
for y=0, Ky=0; and
for y=1, Ky=1.

The coordinates of (dx, dy) are the coordinates of a position observed in the (x, y) coordinate system at the precision of the fraction level with the minimum-value table element tm found at the origin position (0, 0) at the precision of the integer level, from the position (dx, dy) at the precision of the fraction level and the position of the minimum-value table element tm found at the origin position (0, 0) at the precision of the integer level. The position 203 can be detected as a position separated away from the center of the identified minimum-value table element tm.

[Rectangular Table Area Including 4×4 Table Elements]

FIGS. 11A and 11B are diagrams showing a technique to find a motion vector by using a rectangular table area centered at the minimum-value table element tm found at the precision of the integer level as an area including 4×4 close table elements surrounding the minimum-value table element tm in the horizontal and vertical directions. In FIG. 11A, the table area is shown as a gray block.

In the case of an m×m table area (including m×m close table elements where m is an odd integer) such as a table area including nine (=3×3) close table elements described above and a table area including 25=(5×5) close table elements, the minimum-value table element tm found at the precision of the integer level is located as the center table element of the close table elements. Thus, the rectangular table area used for determining a motion vector can be set with ease.

In the case of an m×m table area (including m×m close table elements where m is an even integer) such as a table area including table elements 4×4 table elements including the minimum-value table element tm found at the precision of the integer level and the 15 close table elements, on the other hand, the minimum-value table element tm is located not as the center table element of the close table elements. Thus, the rectangular table area used for determining a motion vector is difficult to set with ease so that some devised endeavors described below may be made.

In this case, the correlation values (which are each a final component SAD value in this embodiment) of close table elements including the minimum-value table element tm found at the precision of the integer level on the same row of the contracted correlation-value table as the minimum-value table element tm are compared with each other. As a result of the comparison, such a rectangular table area is set that the minimum-value table element tm serves as the second table element of the row. The table element having the smallest correlation value among four adjacent close table elements including the minimum-value table element tm serves as the fourth close table element of the row. By the same token, the correlation values of close table elements including the minimum-value table element tm found at the precision of the integer level on the same column of the contracted correlation-value table as the minimum-value table element tm are compared with each other. As a result of the comparison, such a rectangular table area is set that the minimum-value table element tm serves as the second table element of the column. The table element having the smallest correlation value among four adjacent close table elements including the minimum-value table element tm serves as the fourth close table element of the column.

In the example shown in FIGS. 11A and 11B, the minimum-value table element tm found at the precision of the integer level is sandwiched by two adjacent close table elements having correlation values of 177 and 173 respectively on the same row. In this case, the minimum-value table element tm is taken as the second table element of the row while a close table element on the right side of the close table element having the smaller correlation value of 173 is taken as the fourth close table element of the row. By the same token, the minimum-value table element tm found at the precision of the integer level is sandwiched by the two adjacent close table elements having SAD values of 168 and 182 respectively on the same column. In this case, the minimum-value table element tm is taken as the second table element of the column while a close table element above the close table element having the smaller correlation value of 168 is taken as the fourth close table element of the column.

Then, in the example shown in FIGS. 11A and 11B, an approximation quadratic surface 201 shown in FIG. 11B is set by adopting the method of least squares on the basis of correlation values of the minimum-value table element tm found at the precision of the integer level and 15 close table elements surrounding the minimum-value table element tm as shown in FIG. 11A. Subsequently, a minimum-value point 202 of the approximation quadratic surface 201 is detected at a position 203 existing on the X-Y plane as a position with coordinates of (vx/n, vy/n) as shown in FIG. 11B. The position (vx/n, vy/n) is a position identified at the precision of the fraction level as the position corresponding to a table element (or a table-element address) with the smallest correlation value in the contracted correlation-value table.

Finally, a minimum-value vector 204 pointing to the position 203 identified at the precision of the fraction level as a position of the table element is determined, and the motion vector 205 (or the minimum-value vector) with the original magnitude and the original direction is computed by multiplying the minimum-value vector 204 by the reciprocal value n of the contraction factor as shown in FIG. 6.

A process to find the position 203 corresponding to the minimum-value point 202 on the approximation quadratic surface 201 is carried out by adoption of a method described as follows. As shown in FIG. 9, a coordinate (x, y) system is devised as a system in which the position of the center of the minimum-value table element tm found at the precision of the integer level is taken as the origin point (0, 0).

In the case of the example shown in FIGS. 11A and 11B, as shown in FIGS. 12A, 12B, 12C, and 12D, there are four rectangular table areas including the 16 table elements laid out in different ways resulting in different positions of the minimum-value table element tm found at the precision of the integer level. The position of the minimum-value table element tm found at the precision of the integer level in the rectangular table area depends on whether the aforementioned fourth table element of the row including the minimum-value table element tm is a close table element on the right side or the left side of the minimum-value table element tm and whether the aforementioned fourth table element of the column including the minimum-value table element tm is a close table element above or below the minimum-value table element tm.

In this case, as is evident from FIGS. 12A, 12B, 12C, and 12D, the position the minimum-value table element tm found at the precision of the integer level is fixed at the position (0, 0) in the coordinate system. The positions of the 15 close table elements located close to the minimum-value table element tm have x-axis coordinates represented by x=−2 or x=−1, x=0, and x=+1 or x=+2 in the horizontal direction and y-axis coordinates represented by y=−2 or y=−1, y=0 and y=+1 or y=+2 in the vertical direction.

Let us have notation Sxy denote the correlation value of a table element in the coordinate system shown in FIGS. 12A to 12D. For example, the correlation value of the minimum-value table element tm found at the origin position (0, 0) at the precision of the integer level is denoted by symbol $S_{00}$ whereas the correlation value of the table element at the position (1, 1) on the right side of the minimum-value table element tm and below the minimum-value table element tm is denoted by symbol $S_{11}$.

Thus, the coordinates (dx, dy) of a position observed in the (x, y) coordinate system at the precision of the fraction level with the minimum-value table element tm found at the origin position (0, 0) of the (x, y) coordinate system at the precision of the integer level can be found in accordance with Eqs. (C) and (D) shown in FIG. 13. The origin position (0, 0) of the (x, y) coordinate system coincides with the center of a rectangular area covering 16 table elements including the minimum-value table element tm found at the origin position (0, 0) of the (x, y) coordinate system at the precision of the integer level.

In Eqs. (C) and (D) shown in FIG. 13, the values of Kx and Ky are the values represented by respectively the horizontal and vertical axes of a (Kx, Ky) coordinate system shown in FIG. 14 as a coordinate system placed over a rectangular table area, which includes the minimum-value table element tm found at the precision of the integer level and the 15 close table elements located close to the minimum-value table element tm. The center of the rectangular area coincides with the origin point (0, 0) of the (Kx, Ky) coordinate system. The values of Kx and Ky are values dependent on four different layouts shown in FIGS. 12A to 12D as layouts of the table elements.

Figure 12A:
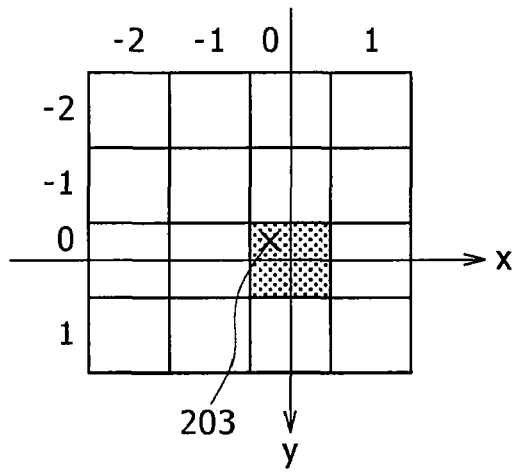
FIGS. 12A, 12B, 12C, and 12D are each an explanatory diagram to be referred to in describing a process to detect an accurate motion vector in accordance with the first typical implementation of the image processing method according to an embodiment.
Figures 13, 14:
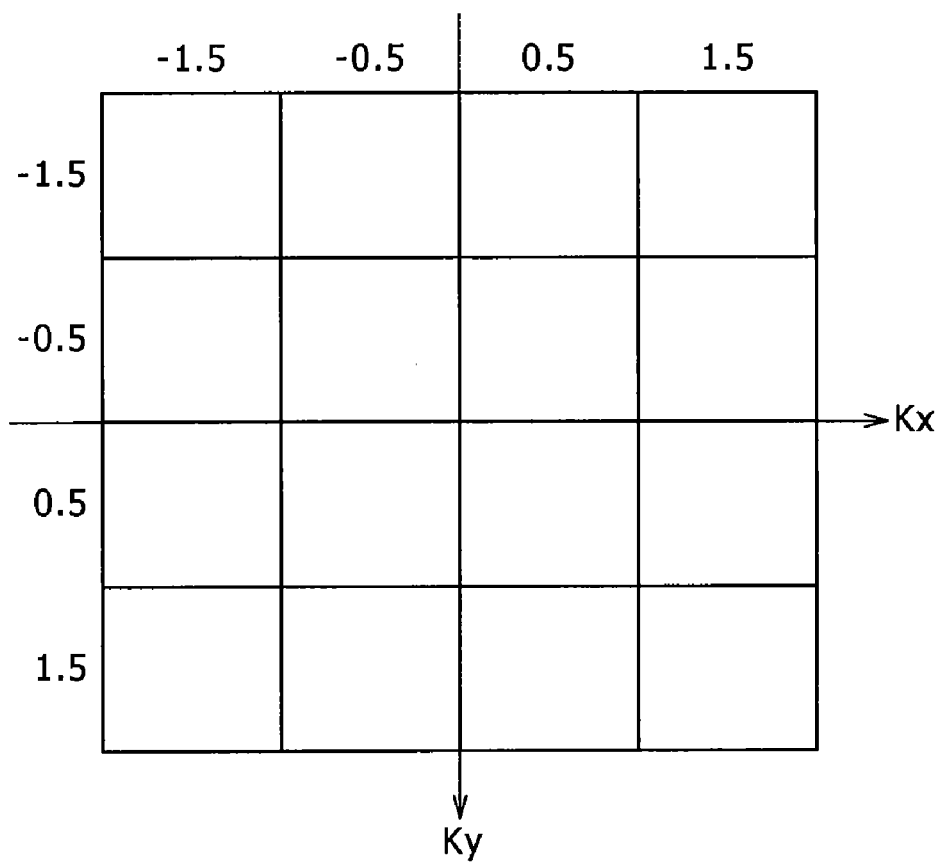
FIG. 13 is an explanatory diagram to be referred to in describing a process to detect an accurate motion vector in accordance with the first typical implementation of the image processing method according to an embodiment.
FIG. 14 is an explanatory diagram to be referred to in describing a process to detect an accurate motion vector in accordance with the first typical implementation of the image processing method according to an embodiment.

To put it in detail, in the case of the coordinate system shown in FIG. 12A, the coordinates Kx and Ky of the (Kx, Ky) coordinate system shown in FIG. 14 have the following values:

For x=−2, Kx=−1.5;
for x=−1, Kx=−0.5;
for x=0, Kx=0.5;
for x=1, Kx=1.5;
for y=−2, Ky=−1.5;
for y=−1, Ky=−0.5;
for y=0, Kx=0.5; and
for y=1, Kx=1.5.

Figure 12B:
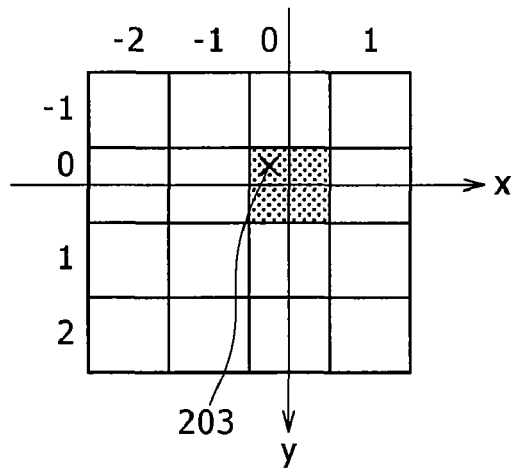

In the case of the coordinate system shown in FIG. 12B, the coordinates Kx and Ky of the (Kx, Ky) coordinate system shown in FIG. 14 have the following values:

For x=−2, Kx=−1.5;
for x=−1, Kx=−0.5;
for x=0, Kx=0.5;
for x=1, Kx=1.5;
for y=−1, Ky=−1.5;
for y=0, Ky=−0.5;
for y=1, Kx=0.5; and
for y=2, Kx=1.5.

Figure 12C:
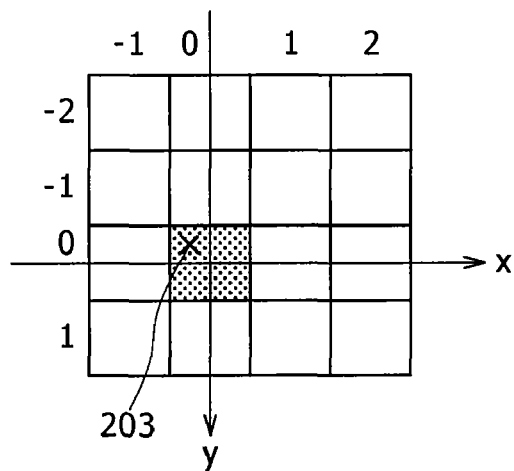

In the case of the coordinate system shown in FIG. 12C, the coordinates Kx and Ky of the (Kx, Ky) coordinate system shown in FIG. 14 have the following values:

For x=−1, Kx=−1.5;
for x=0, Kx=−0.5;
for x=1, Kx=0.5;
for x=2, Kx=1.5;
for y=−2, Ky=−1.5;
for y=−1, Ky=−0.5;
for y=0, Kx=0.5; and
for y=1, Kx=1.5.

Figure 12D:
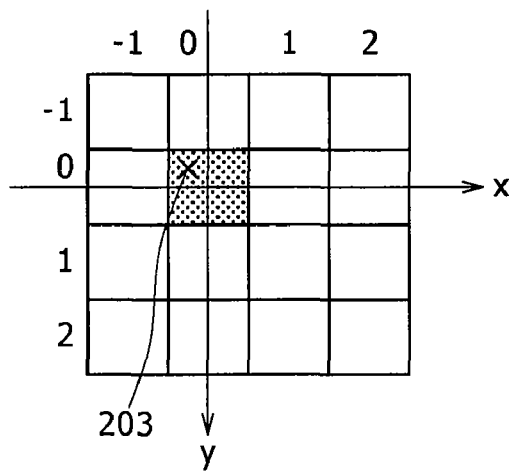

In the case of the coordinate system shown in FIG. 12D, the coordinates Kx and Ky of the (Kx, Ky) coordinate system shown in FIG. 14 have the following values:

For x=−1, Kx=−1.5;
for x=0, Kx=−0.5;
for x=1, Kx=0.5;
for x=2, Kx=1.5;
for y=−1, Ky=−1.5;
for y=0, Ky=−0.5;
for y=1, Kx=0.5; and
for y=2, Kx=1.5.

Notation Δx used in Eqs. (C) shown in FIG. 13 is a shift of the coordinate x of the position of a table element in the (x, y) coordinate system shown in FIG. 12A, 12B, 12C, or 12D for the coordinate Kx in the (Kx, Ky) coordinate system shown in FIG. 14. By the same token, notation Δy used in Eqs. (D) shown in FIG. 13 is a shift of the coordinate y of the position of a table element in the (x, y) coordinate system shown in FIG. 12A, 12B, 12C, or 12D for the coordinate Ky in the (Kx, Ky) coordinate system shown in FIG. 14. The shifts Δx and Δy have the following values:

In the case of FIG. 12A, Δx=−0.5 and Δy=−0.5;
in the case of FIG. 12B, Δx=−0.5 and Δy=0.5;
in the case of FIG. 12C, Δx=0.5 and Δy=−0.5; and
in the case of FIG. 12D, Δx=0.5 and Δy=0.5.

The coordinates (dx, dy) are the coordinates of a position observed in the (x, y) coordinate system at the precision of the fraction level with the minimum-value table element tm found at the origin position (0, 0) of the (x, y) coordinate system at the precision of the integer level. From the position (dx, dy) observed in the (x, y) coordinate system at the precision of the fraction level and the position of the minimum-value table element tm found at the origin position (0, 0) of the (x, y) coordinate system at the precision of the integer level, the position 203 can be detected as a position separated away from the center of the identified minimum-value table element tm.

[Second Typical Interpolation Process to Detect a Motion Vector with a Higher Degree of Accuracy]

A second typical interpolation process to detect a motion vector with a higher degree of accuracy adopts a following technique. A plurality of correlation values (which are each a final component SAD value in this embodiment) stored in elements arranged in the horizontal direction on a row including the minimum-value table element tm found at the precision of the integer level in the contracted correlation-value table are used to create a cubic curve laid on a plane oriented in the horizontal direction. A plurality of correlation values stored in elements arranged in the vertical direction on a column including the minimum-value table element tm in the contracted correlation-value table are used to create a cubic curve laid on a plane oriented in the vertical direction. Then, a position (vx, vy) of the minimum values of the cubic curves is detected and taken as a minimum-value address having the precision of the fraction level.

Figure 15B:
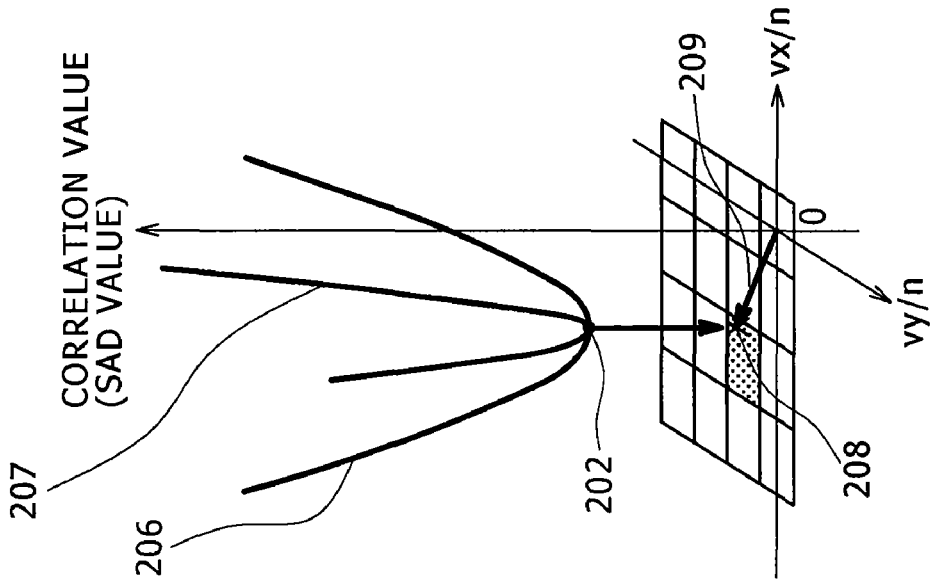
FIGS. 15A and 15B are each an explanatory diagram to be referred to in describing a process to detect an accurate motion vector in accordance with a second typical implementation of the image processing method according to an embodiment.
Figure 15A:
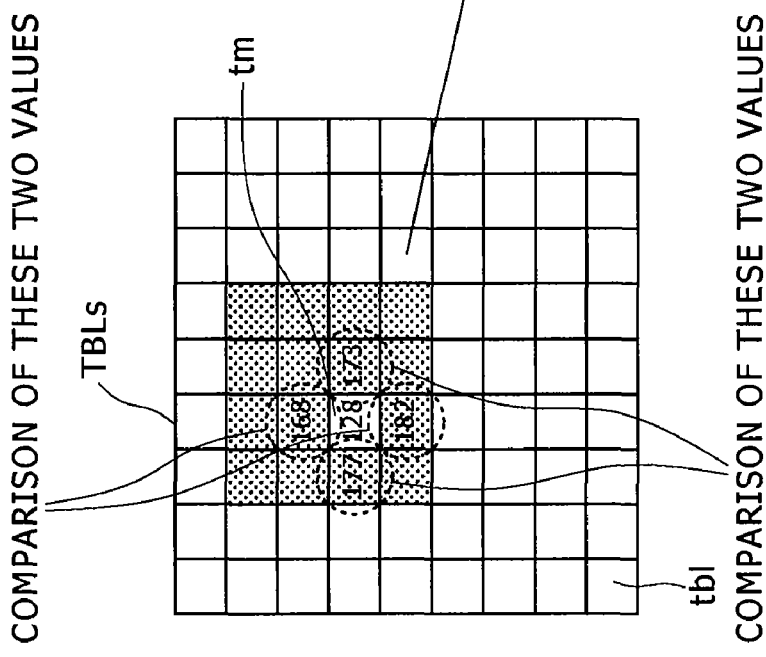

FIGS. 15A and 15B are explanatory diagrams referred to in the following description of the second typical interpolation process to detect a motion vector with a higher degree of accuracy. Much like the first typical interpolation process to detect a motion vector with a higher degree of accuracy, the second typical interpolation process is carried out to find a motion vector by using a rectangular table area centered at the minimum-value table element tm found at the precision of the integer level as an area including close table elements surrounding the minimum-value table element tm in the horizontal and vertical directions. In the example shown in FIGS. 15A and 15B, the number of close table elements is set at 16 (=4×4). In FIG. 15A, the table area is shown as a gray block.

Next, much like the first typical interpolation process to detect a motion vector with a higher degree of accuracy, as shown in FIG. 15B, a coordinate space is assumed in the range of contracted reference vectors (or the range of the contracted correlation-value table). The range of contracted reference vectors corresponds to the search range of the reference frame. The position of the target frame (or, strictly speaking, the position of the target-block projected image block 104 shown in FIG. 42) is taken as the origin position (0, 0) of the coordinate space. The vertical Z axis (or the correlation-value axis) is taken as an axis representing the correlation value, which decreases inversely proportional to the correlation between the reference and target blocks. In this embodiment, the correlation value is a final component SAD value. The horizontal x axis (or a vx/n axis) is taken as an axis representing the shift of the reference block from the target block in the x direction or an axis representing the value vx/n of the contracted reference vector. By the same token, the horizontal y axis (or a vy/n axis) is taken as an axis representing the shift of the reference block from the target block in the y direction perpendicular to the x direction or an axis representing the value vy/n of the contracted reference vector.

Then, four table elements on a horizontal-direction row including the minimum-value table element tm found at the precision of the integer level are selected among the 16 table elements close to the table minimum-value element tm. Subsequently, the correlation values (which are each a final component SAD value) of the four selected table elements are used to create a horizontal cubic curve 206 laid on a plane oriented in the horizontal direction in the coordinate system. Then, the horizontal-direction position vx/n of the minimum value on the horizontal cubic curve 206 is selected in the area of a table element at the precision of the fraction level.

By the same token, four table elements on a vertical-direction column including the minimum-value table element tm found at the precision of the integer level are selected among the 16 table elements close to the table minimum-value element tm. Subsequently, the correlation values (which are each a final component SAD value) of the four selected table elements are used to create a vertical cubic curve 207 laid on a plane oriented in the vertical direction in the coordinate system. Then, the vertical-direction position vy/n of the minimum value on the vertical cubic curve 207 is selected in the area of a table element at the precision of the fraction level.

From the horizontal-direction position vx/n selected at the precision of the fraction level and the vertical-direction position vy/n selected at the precision of the fraction level, a minimum-value table address 208 is then found at the precision of the fraction level. The fraction-precision minimum-value table address 208 is a table-element address corresponding to the minimum value on the horizontal cubic curve 206 and the vertical cubic curve 207. Finally, a minimum-value vector 209 pointing to the fraction-precision minimum-value table address 208 identified at the precision of the fraction level as a position in the table element is determined. The motion vector (or the minimum-value vector) with the original magnitude and the original direction is computed by multiplying the minimum-value vector 209 by the reciprocal value n of the contraction factor as shown in FIG. 6.

That is to say, the second typical interpolation process adopts a technique whereby four table elements are selected in each of a row oriented in the horizontal direction and a column oriented in the vertical direction by adoption of the same technique as the first typical interpolation process. Then, a cubic curve laid on a plane oriented in the horizontal direction is created on the basis of the four table elements selected on the row whereas a cubic curve laid on a plane oriented in the vertical direction is created on the basis of the four table elements selected on the column as shown in FIG. 15B.

Figures 16, 17:
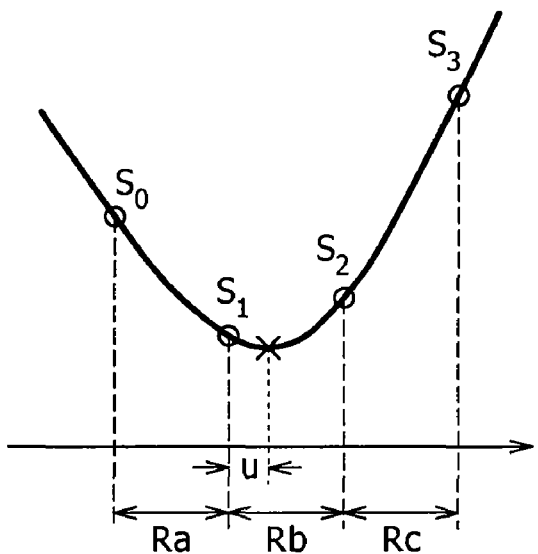
FIG. 16 is an explanatory diagram to be referred to in describing a process to detect an accurate motion vector in accordance with the second typical implementation of the image processing method according to an embodiment.
FIG. 17 is an explanatory diagram to be referred to in describing a process to detect an accurate motion vector in accordance with the second typical implementation of the image processing method according to an embodiment.

A process to find the fraction-precision minimum-value table address 208 corresponding to the minimum-value point 202 on the horizontal cubic curve 206 and the vertical cubic curve 207 is carried out by adoption of a method described as follows. Let us have notations $S_0$, $S_1$, $S_2$, and $S_3$ denote correlation values of the four table elements selected on a row oriented in the horizontal direction or a column oriented in the vertical direction. As described above, in this embodiment, a correlation value is a final component SAD value. The correlation values $S_0$, $S_1$, $S_2$, and $S_3$ correspond to four adjacent points laid out consecutively along the horizontal cubic curve 206 in the horizontal direction or the vertical cubic curve 207 in the vertical direction. As shown in FIG. 16, notations Ra, Rb, and Rc respectively denote a segment representing the axis-direction distance between the points $S_0$ and $S_1$, a segment representing the axis-direction distance between the points $S_1$ and $S_2$, and a segment representing the axis-direction distance between the points $S_2$ and $S_3$. A segment portion u is a fraction part included the coordinate value of the position of the minimum correlation value. The segment portion u is found in accordance with an equation dependent on which of the three segments Ra, Rb, and Rc shown in FIG. 16 includes the segment portion u serving as the fraction part included in the coordinate value of the position of the minimum correlation value.

As described above, the segment Ra is a segment between the position corresponding to the correlation value (or SAD value) $S_0$ and the position corresponding to the correlation value $S_1$. The segment Rb is a segment between the position corresponding to the correlation value $S_1$ and the position corresponding to the correlation value $S_2$. The segment Rc is a segment between the position corresponding to the correlation value $S_2$ and the position corresponding to the correlation value $S_3$. As described above, in this embodiment, a correlation value is a final component SAD value.

If the fraction-precision position of the minimum correlation value exists in the segment Ra shown in FIG. 16, the segment portion u representing the distance from the beginning of the segment Ra to the position is found as a fraction by using Eq. (E) shown in FIG. 17.

By the same token, if the fraction-precision position of the minimum correlation value exists in the segment Rb shown in FIG. 16, the segment portion u representing the distance from the beginning of the segment Rb to the position is found as a fraction by using Eq. (F) shown in FIG. 17.

In the same way, if the fraction-precision position of the minimum correlation value exists in the segment Rc shown in FIG. 16, the segment portion u representing the distance from the beginning of the segment Rc to the position is found as a fraction by using Eq. (G) shown in FIG. 17.

The following description explains a technique to determine which of the three segments Ra, Rb, and Rc shown in FIG. 16 includes the fraction part u.

FIGS. 18A to 18D are explanatory diagrams referred to in description of the technique to determine which of the three segments Ra, Rb, and Rc shown in FIG. 16 includes the fraction part u. First of all, notation Smin denotes the minimum correlation value at a position detected at the precision of the integer level. Notation Sn2 denotes a correlation value located at an integer-precision position as a correlation value having a smallest difference from the minimum correlation value Smin among the correlation values at the integer-precision positions of all the four table elements. The true minimum correlation value denoted by symbol x in FIGS. 18A, 18B, and 18C may exist at a position detected at the precision of the fraction level as a position between the position of the minimum correlation value Smin and the position of the correlation value Sn2. Then, by recognizing which of the correlation values $S_0$, $S_1$, $S_2$, and $S_3$ shown in FIG. 16 serve as the minimum correlation value Smin and the correlation value Sn2, it is possible to determine which of the three segments Ra, Rb, and Rc includes the fraction part u.

Figure 18A:
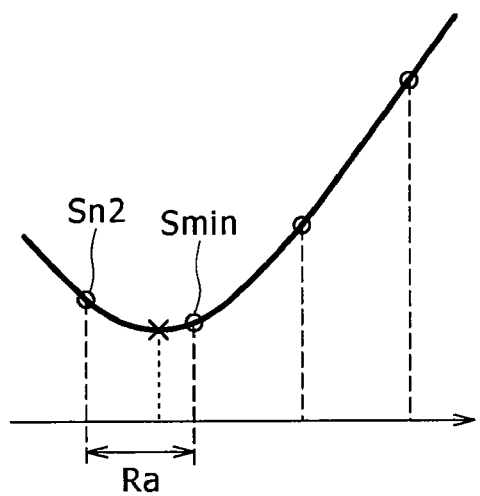
FIGS. 18A, 18B, 18C, and 18D are each an explanatory diagram to be referred to in describing a process to detect an accurate motion vector in accordance with the second typical implementation of the image processing method according to an embodiment.
Figure 18B:
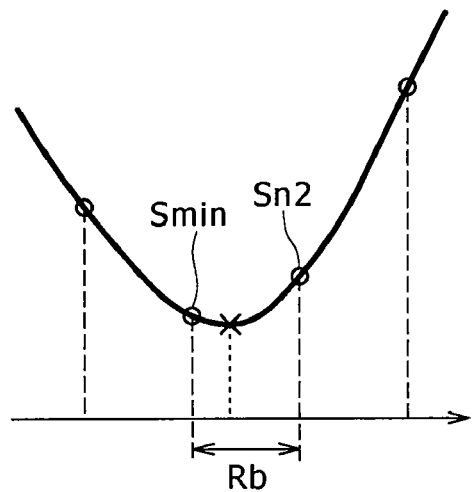
Figure 18C:
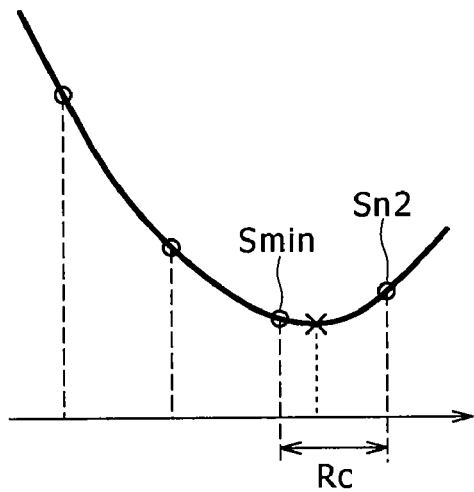
Figure 18D:
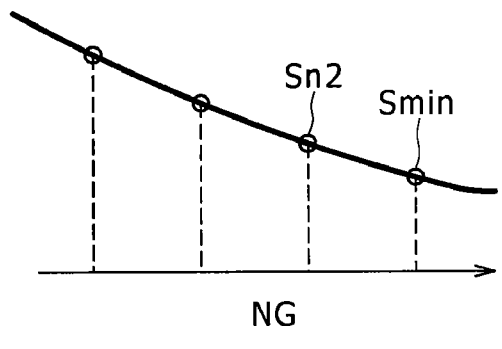

It is to be noted that there is also a case in which the integer-precision position of the minimum correlation value Smin is an edge of a range including the positions of the correlation values of the four table elements as shown in FIG. 18D. In this case, the position of the true minimum correlation value x is difficult to determined, and the embodiment does not find the position of the true minimum correlation value x, handling this case as an error. Nevertheless, the position of the true minimum correlation value x can also be found even in the case like the one shown in FIG. 18D.

As described above, in accordance with the embodiments described above, by using a contracted correlation-value table with a size scaled down by a down-sizing factor of $1/n^2$, the motion vector at the original image scale can be detected. FIG. 19 is a diagram showing the fact that all but the same vector detection results as the image-processing apparatus in related art can be obtained in spite of the use of a contracted correlation-value table with a size scaled down by a down-sizing factor of $1/n^2$.

The horizontal axis of FIG. 19 represents the one-dimensional contraction factor of 1/n used in contracting the correlation-value table in the horizontal or vertical direction. On the other hand, the vertical axis represents the vector error, which is an error of a detected motion vector. The value of the vector error shown in FIG. 19 is expressed in terms of pixels.

In FIG. 19, a curve 301 represents the average value of vector errors detected for different contraction factors. A curve 302 represents the three-time value (3σ [99.7%] value) of the variance σ of the vector errors detected for different contraction factors. A curve 303 is an approximation curve of the curve 302.

The curves shown in FIG. 19 represent the vector error detected at different one-dimensional contraction factors 1/n. Since the correlation-value table is a two-dimensional table, however, the size of the table (that is, the number of elements composing the correlation-value table) is reduced at a rate equal to the square of the one-dimensional contraction factor of 1/n used in FIG. 19. Nevertheless, the usefulness of the technique according to the embodiments is obvious from the curves indicating that the average of vector errors does not change and the variance of the vector errors increases linearly with changes in contraction factor.

In addition, even for n=64 (or a contraction factor of 1/64), the average of vector errors is small, proving that there is not a failure caused by detection of an incorrect motion vector. Thus, we can say that the size of the correlation-value table can be reduced by a down-sizing factor of 1/4096.

On the top of that, as described earlier, in a process to compensate a moving picture for effects of hand trembling, a real-time response and reduction of the time delay are strongly necessary. However, errors of the detected motion vector can be tolerated to a certain degree as long as the error is not a failure caused by detection of an incompletely incorrect motion vector. Thus, the size of the correlation-value table can be reduced substantially without causing a failure. As a result, the embodiments can be said to be very useful.

In the actual system for compensating an image for effects of hand trembling, a reference frame 102 is divided into a plurality of partial areas and, for each of the partial areas, a motion vector 205 is detected. This is because it is quite within the bounds of possibility that a moving object of image pickup is included in the reference frame 102. For example, in one reference frame 102, 16 motion vectors 205 are detected as shown in FIG. 20. Then, while considering transitions each indicated by one of the motion vectors 205 from a past image, a statistical process is carried out in order to determine a global vector for the reference frame 102, that is, a hand-trembling motion vector of the reference frame 102.

In this case, as shown in FIG. 20, 16 search ranges SR1, SR2, ..., and SR16 centered at the origin positions PO1, PO2, ..., and PO16 of respectively the 16 motion vectors 205 to be detected are set in advance and target-block projected image blocks IB1, IB2, ..., and IB16 are assumed to exist at the centers of the search ranges SR1, SR2, ..., and SR16 respectively.

Then, in each of the search ranges SR1, SR2, ..., and SR16, a reference block having the same size as each of the target-block projected image blocks IB1, IB2, ..., and IB16 is set as a block to be moved from position to position over the search range SR1, SR2, ..., or SR16 respectively. A contracted SAD table is then generated for finding the motion vector 205 in each of the search ranges SR1, SR2, ..., and SR16 in the same way as the technique provided in an embodiment as described earlier.

In comparison with the method in related art disclosed in patent reference 4 as a method for detecting a motion vector for an image with a reduced size, the image processing method according to the embodiments described above has the following big merits different from those of the method in related art.

In the first place, unlike the method in related art disclosed in patent reference 4, the image processing method according to the embodiments does not necessary a process to contract an image at all. This is because, in accordance with the image processing method provided by the embodiments, in a process to store a component correlation value computed for a reference block in a contracted correlation-value table as an element of the table, a process to translate the address of the element is carried out at the same time. As described above, the correlation value computed for a reference block is actually a final component SAD value computed for the reference block.

Thus, in comparison with the method in related art disclosed in patent reference 4, the image processing method according to the embodiments offers merits such as elimination of logic to contract an image, the time it takes to store a contracted image in a memory, the bandwidth of a process to store a contracted image in the memory, and the memory for storing a contracted image.

In the second place, the method in related art disclosed in patent reference 4 raises another serious problem that, as described earlier, the method needs a low-pass filter for getting rid of aliasing and low-illumination noises generated in the process to contract an image. That is to say, in the process to contract an image, image data may be supplied to a proper low-pass filter before being re-sampled. Otherwise, aliasing will occur and the precision of a motion vector detected by using a contracted image will deteriorate substantially.

A function exhibited by a low-pass filter used in the process to contract an image as a function resembling the sinc function has been proven theoretically to be an ideal characteristic of a low-pass filter. The sinc function itself is the function of an infinite-tap FIR (Finite Impulse Response) filter having a cut-off frequency f/2 expressed by $\sin(x\Pi)/(x\Pi)$. In the case of a low-pass filter having an ideal cut-off frequency of $f/(2n)$ for a contraction factor of $1/n$, the cut-off frequency is represented by $\sin(x\Pi/n)/(x\Pi/n)$, which can also be used as a form of the sinc function though.

Figure 23:
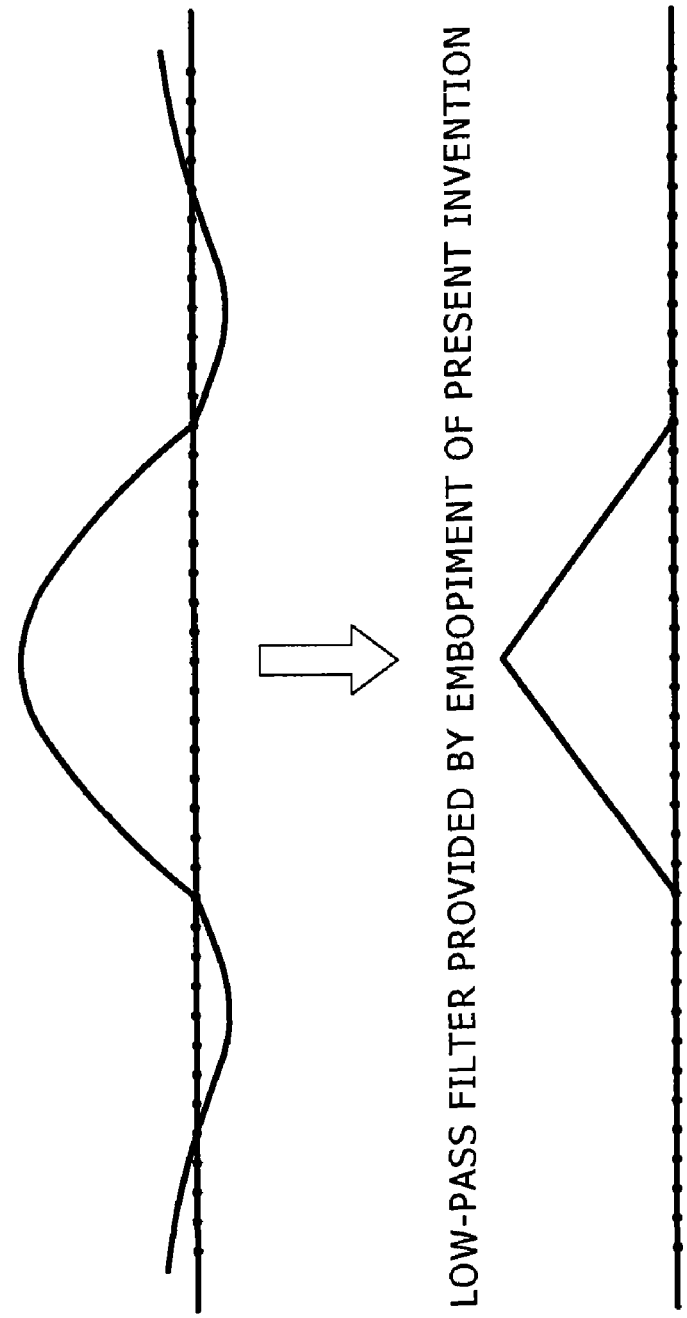
FIG. 23 is an explanatory diagram comparing the characteristic of the image processing method according to an embodiment with that of the method in related art.

Diagrams on the upper side of FIGS. 21, 22, and 23 show the shapes of the sinc function (or the ideal characteristic of a low-pass filter) for contraction factors of ½, ¼, and ⅛ respectively. It is evident from FIGS. 21 to 23 that, the larger the contraction factor, the larger the factor at which the function is expanded in the tap-axis direction. In other words, even for a case in which the infinite-tap sinc function is approximated by principal coefficients, we can say that the number of taps of the FIR filter may be increased.

In addition, it is known that, the lower the cut-off frequency in the frequency band, the more predominant the number of taps in the performance of the low-pass filter in comparison with the dominance of the filter shape.

Thus, a motion-vector identification method using a contracted image generated in accordance with the method in related art disclosed in patent reference 4 generally shows a contradiction that, in spite of the fact that, the larger the contraction factor of an image, the bigger the effect of reducing the size of the correlation-value table. We encounter the fact that the cost increases in proportion to the increase in contraction factor.

In general, in implementation of a high-order tap FIR filter, the cost of the processing logic increases in proportion to the square of the number of taps, raising a big problem. However, an even bigger problem is caused by an increased number of line memories used to realize a vertical filter. In digital still cameras manufactured in recent years, in order to reduce the size of the line memory to keep up with the increasing number of pixels, the so-called strap processing is carried out. However, even if the size per memory line is reduced for example, the number of line memories themselves increases, raising the total cost substantially if a physical layout area is translated into the cost.

As described above, the approach based on image contraction according to the method in related art disclosed in patent reference 4 is known to have a big barrier encountered particularly in implementation of a vertical low-pass filter. On the other hand, the image processing method according to the embodiments has solved this problem effectively in a completely different way.

Diagrams on the lower side of FIGS. 21 to 23 each show an image of the low-pass filters according to the image-processing method provided by the embodiment of the present invention. In accordance with the image-processing method provided by the embodiment of the present invention, the processing to contract an image is not carried out. However, the process to generate a contracted correlation-value table includes the processing of a low-pass filter, the image of which is shown in any of the figures.

As is obvious from the diagrams on the lower side of FIGS. 21 to 23, the characteristic of this low-pass filter is a simple filter characteristic in which the principal-coefficient portions of the sinc function can be approximated linearly, but the number of taps increases in a manner interlocked with the contraction factor. The simple filter characteristic and the increasing manner of the tap count are suitable for the fact that the lower the cut-off frequency, the more predominant the number of taps in the performance of the low-pass filter. That is to say, the process to find component correlation values (which are each a component SAD value) in accordance with the embodiment of the present invention is equivalent to implementation of a low-pass filter exhibiting high performance in a manner interlocked with the contraction factor as a simple circuit. As described earlier, the process to find component correlation values is processing carried out in accordance with the embodiments as a process based on the linear weighted distribution technique to find component correlation values.

The simple circuit implementing a low-pass filter offers another merit in comparison with the method in related art disclosed in patent reference 4. That is to say, in accordance with the method in related art disclosed in patent reference 4, an image is contracted in a sampling process after the image passes through a low-pass filter. In this contracting process, much image information is lost. To be more specific, in the processing carried out by the low-pass filter, the word length of the luminance value of the image information is rounded considerably before the image information is stored in a memory. Thus, most of low-order bits of the pixel information have no effect on the contracted image.

In accordance with the image processing technique according to the embodiments, on the other hand, the luminance values of all pixels in the target block are used equally in a process to compute a final component correlation value stored in a contracted correlation-value table as an element of the table. That is to say, the final component correlation is a cumulative sum of correlation values each found for one of the pixels in the target block. Thus, by merely increasing the word length of every element of the contracted correlation-value table, it is possible to carry out such a correlation-value computation process that even the eventually computed final correlation value does not include a rounding-process error at all. Since the size of the contracted correlation-value table is small in comparison with the size of the frame memory, the extension of the word length of every element composing the contracted correlation-value table does not raise a big problem. As a result, the contracted correlation-value table and the processing to determine a motion vector can be implemented with a high degree of precision.

By referring to diagrams, the following description explains embodiments each implementing an image pickup apparatus as an image processing apparatus adopting the image processing method according to an embodiment.

Figure 24:
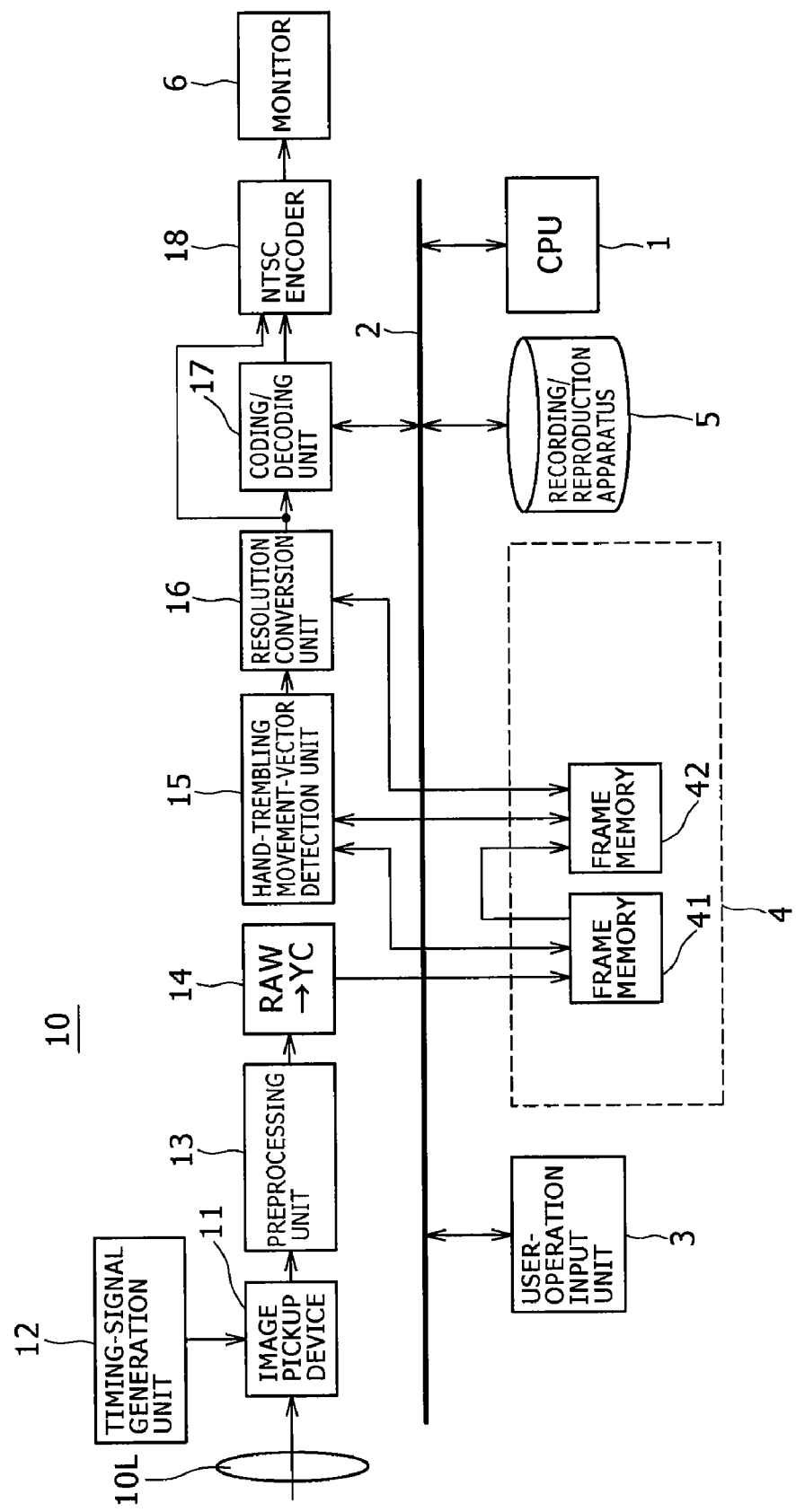
FIG. 24 is a block diagram showing a typical configuration of an image processing apparatus according to a first embodiment.

FIG. 24 is a block diagram showing a first embodiment implementing an image pickup apparatus as an image processing apparatus adopting the image processing method provided by the embodiment.

As shown in FIG. 24, the image pickup apparatus 10 according to the embodiment includes an image pickup signal processing system, a CPU (Central Processing Unit) 1, a user-operation input unit 3, an image memory unit 4, and a recording/reproduction apparatus 5, which are connected to each other by a system bus 2. The image pickup signal processing system includes an image pickup lens 10L, an image pickup device 11, a timing-signal generation unit 12, a preprocessing unit 13, a data conversion unit 14, a hand-trembling motion-vector detection unit 15, a resolution conversion unit 16, a coding/decoding unit 17, an NTSC encoder 18, and a monitoring display unit 6. It is to be noted that the CPU 1 described in this patent specification includes a ROM (Read Only Memory) for storing various kinds of software to be executed by the CPU 1 as processing programs and a RAM (Random Access Memory) used by the CPU 1 as a work area.

Receiving an operation command entered by the user via the user-operation input unit 3 as a command to start an image pickup and recording process, the image pickup apparatus 10 shown in FIG. 24 carries out a process to record image pickup data to be described later. Receiving an operation command entered by the user via the user-operation input unit 3 as a command to start a process to reproduce recorded image pickup data, the image pickup apparatus 10 shown in FIG. 24 carries out a process to reproduce the image pickup data recorded on a recording medium employed in the recording/reproduction apparatus 5.

As shown in FIG. 24, a light beam entering from an object of image pickup by way of a camera optical system employing the image pickup lens 10L is radiated to the image pickup device 11 for carrying out an image pickup process on the light beam. It is to be noted that the camera optical system itself is not shown in the figure. In this embodiment, the image pickup device 11 is configured as a CCD (Charge Coupled Device) imager. It is to be noted the image pickup device 11 can also be configured as a CMOS (Complementary Metal Oxide Semiconductor) imager.

In the image pickup apparatus according to this embodiment, when the user enters an operation command to the image pickup apparatus 10 via the user-operation input unit 3 as a command to start an image pickup and recording process, the image pickup device 11 outputs a raw signal of a bayer array including the three primary colors, i.e., the read (R), green (G) and blue (B) colors. The raw signal, which is an analog image pickup signal, is a signal obtained as a result a sampling process according to a timing signal generated by the timing-signal generation unit 12. The image pickup device 11 supplies the analog image pickup signal to the preprocessing unit 13 for carrying out preprocessing such as a defect compensation process and a γ compensation process. The data conversion unit 14 outputs a result of the preprocessing to the data conversion unit 14.

The data conversion unit 14 converts the analog image pickup signal supplied thereto into a digital image pickup signal (YC data) including a luminance signal component Y and chrominance signal component Cb/Cr, supplying the digital image pickup signal to the image memory unit 4 through the system bus 2.

In the embodiment shown in FIG. 24, the image memory unit 4 includes two frame memories 41 and 42. First of all, the digital image pickup signal received from the data conversion unit 14 is stored in the frame memory 41. Then, after the lapse of time corresponding to one frame, the digital image pickup signal stored in the frame memory 41 is transferred to the frame memory 42 and a new digital image pickup signal received from the data conversion unit 14 is stored in the frame memory 41. Thus, a frame represented by the digital image pickup signal stored in the frame memory 42 is an immediately preceding frame, which precedes a frame represented by the digital image pickup signal stored in the frame memory 41 by one frame.

Then, the hand-trembling motion-vector detection unit 15 makes accesses to the two frame memories 41 and 42 through the system bus 2 in order to read out the digital image pickup signals from the frame memories 41 and 42. The hand-trembling motion-vector detection unit 15 then carries out a process to detect a motion vector between the digital image pickup signals as described earlier. In this motion-vector detection process, a frame represented by the digital image pickup signal stored in the frame memory 41 is taken as the reference frame while a frame represented by the digital image pickup signal stored in the frame memory 42 is taken as the original frame serving as the target frame.

Then, the hand-trembling motion-vector detection unit 15 supplies the detected motion vector obtained as a result of the motion-vector detection process to the resolution conversion unit 16 as a control signal.

In accordance with the motion vector received from the hand-trembling motion-vector detection unit 15, the resolution conversion unit 16 carries out a process to cut out image data of the delayed frame represented by the digital image pickup signal stored in the frame memory 42 and convert the frame into a frame having a necessary resolution and a necessary size. By cutting out image data of the frame represented by the digital image pickup signal stored in the frame memory 42 in accordance with the motion vector received from the hand-trembling motion-vector detection unit 15, the image obtained as a result of the conversion process is an image free of effects of hand trembling.

The image data produced by the resolution conversion unit 16 as image data not including effects of hand trembling is supplied to the NTSC (National Television System Committee) encoder 18 for converting the image data into a standard color video signal conforming to an NTSC system. The NTSC encoder 18 then supplies the standard color video signal to the monitoring display unit 6 serving as an electronic view finder for displaying the taken image on a screen for the purpose of monitoring.

Concurrently with the process to display the taken image on the screen of the monitoring display unit 6 for the purpose of monitoring, the resolution conversion unit 16 also supplies the image data not including effects of hand trembling to the coding/decoding unit 17 for carrying out a coding process such as modulation recording. The coding/decoding unit 17 then supplies image data obtained as a result of the coding process to the recording/reproduction apparatus 5 for recording the image data onto a recording medium. Examples of the recording medium are an optical disc such as a DVD (Digital Versatile Disc) and a hard disc.

When the user enters an operation command to the image pickup apparatus 10 via the user-operation input unit 3 as a command to start a process to reproduce recorded image pickup data, the data is reproduced from the recording medium of the recording/reproduction apparatus 5 and supplied to the coding/decoding unit 17. This time, the coding/decoding unit 17 carries out a decoding/reproduction process on the image pickup data. The coding/decoding unit 17 then supplies image data obtained as a result of the decoding/reproduction process to the monitoring display unit 6 by way of the NTSC encoder 18 for displaying the reproduced image on a screen. It is to be noted that the NTSC encoder 18 is also capable of supplying a video signal output thereby to an external signal recipient by way of a video output terminal even though this feature is not shown in FIG. 24.

The hand-trembling motion-vector detection unit 15 can be implemented as hardware or a DSP (Digital Signal Processor). As an alternative, the hand-trembling motion-vector detection unit 15 can also implemented as software executed by the CPU 1.

The processing flow of a first typical implementation realizing operations of the hand-trembling motion-vector detection unit 15 is explained by referring to a flowchart shown in FIGS. 25 and 26 as follows.

Figure 42:
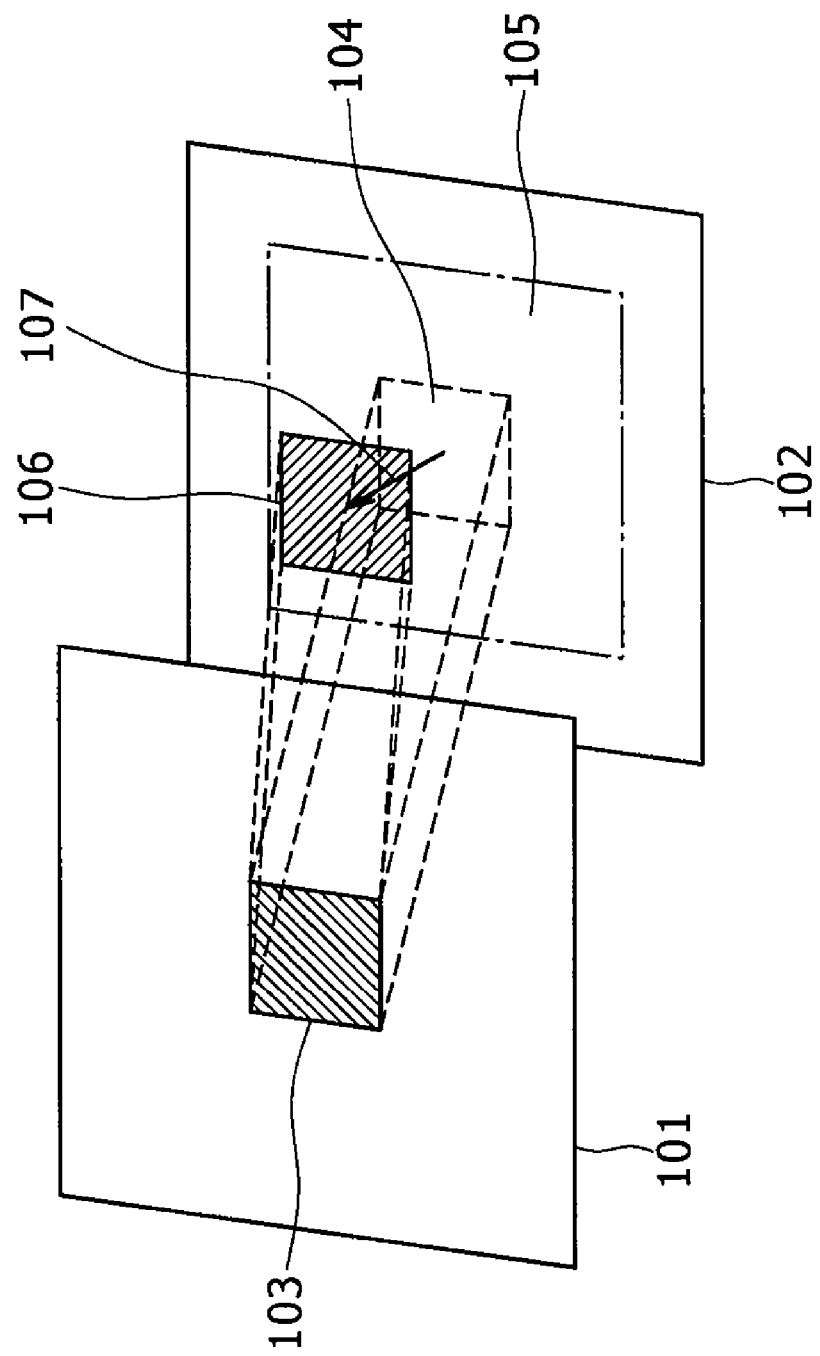
FIG. 42 is an explanatory diagram referred to in describing processing to detect a motion vector by adoption of the block matching technique in related art.

The flowchart begins with a step S101 at which a reference block Ii denoted by reference numeral 106 in FIG. 42 is specified at a position having coordinates of (vx, vy) in the search range 105. An operation to specify a reference block Ii in the search range 105 is also an operation to specify a reference vector (vx, vy) corresponding to the reference block Ii. As described earlier, the coordinates of (vx, vy) are the coordinates of the position pointed to by the specified reference vector 107 with coordinates of (0, 0) taken as the coordinates of an origin position. The coordinates of (0, 0) are the coordinates of the position of the target block 103 on the original frame 101 or the coordinates of the position of the target-block projected image block 104 on the reference frame 102. The coordinate vx represents the horizontal-direction shift of the position pointed to by the specified reference vector 107 from the origin position having the coordinates of (0, 0). The coordinate vy represents the vertical-direction shift of the position pointed to by the specified reference vector 107 from the origin position. Much like the method in related art described earlier, the shifts vx and vy are expressed in terms of pixels.

As described earlier, the center position of the search range 105 is taken as the center position of the target-block projected image block 104 or the origin position (0, 0). The reference block 106 is moved from position to position over the search range 105 in the horizontal directions by distances in the range ±Rx defining the horizontal limits of the search range 105 and the vertical directions by distances in the range ±Ry defining the vertical limits of the search range 105. In this case, the quantities (vx, vy) satisfy the following relation:

$$-Rx \leq vx \leq +Rx \text{ and } -Ry \leq vy \leq +Ry$$

At the next step S102, a point (or a pixel) with coordinates (x, y) is specified as a point in the target block Io denoted by reference numeral 103 in FIG. 42. Let us have notation Io (x, y) denote a pixel value at the specified point (x, y) and notation Ii (x+vx, y+vy) denotes a pixel value at a point (x+vx, y+vy) in the reference block Ii set at the block position (vx, vy) at the step S10. In the following description, the point (x+vx, y+vy) in the reference block Ii is said to be a point corresponding the point (x, y) in the target block Io. Then, at the next step S103, the absolute value α of the difference between the pixel value Io (x, y) and the pixel value Ii (x+vx, y+vy) is computed in accordance with Eq. (1) as follows:

$$\alpha = |Io(x,y) - Ii(x+vx, y+vy)| \quad (1)$$

The above difference absolute value α is to be computed for all points (x, y) in the target block Io and all their corresponding points (x+vx, y+vy) in the reference block Ii, and a SAD value representing the sum of the difference absolute values α computed for the target block Io and the reference block Ii is stored at a temporary memory location associated with the reference vector (vx, vy) pointing to the current location of the reference block Ii. In order to compute such a SAD value, at the next step S104, the difference absolute value α found at the step S103 is cumulatively added to a temporary SAD value already stored at the temporary memory location as a SAD value computed so far. The final SAD value SAD (vx, vy) is obtained as a result of a process to cumulatively sum up all difference absolute values α, which are computed for all points (x, y) in the target block Io and all their corresponding points (x+vx, y+vy) in the reference block Ii as described above. Thus, the final SAD value SAD (vx, vy) can be expressed by Eq. (2) as follows:

$$SAD(vx, vy) = \Sigma \alpha = \Sigma |Io(x,y) - Ii(x+vx, y+vy)| \quad (2)$$

Then, the flow of the processing according to the first typical implementation goes on to the next step S105 to produce a result of determination as to whether or not the processes of the steps S103 and S104 have been carried out for all pixels (x, y) in the target block Io and all their corresponding pixels (x+vx, y+vy) in the reference block Ii. If the result of the determination indicates that the processes of the steps S3 and S4 have not been carried out yet for all pixels (x, y) in the target block Io and all their corresponding pixels (x+vx, y+vy) in the reference block Ii, the flow of the processing according to the first typical implementation goes back to the step S102. Another pixel with coordinates (x, y) is specified as another pixel in the target block Io. Then, the processes of the steps S103 and S104 following the step S102 are repeated.

Figure 44:
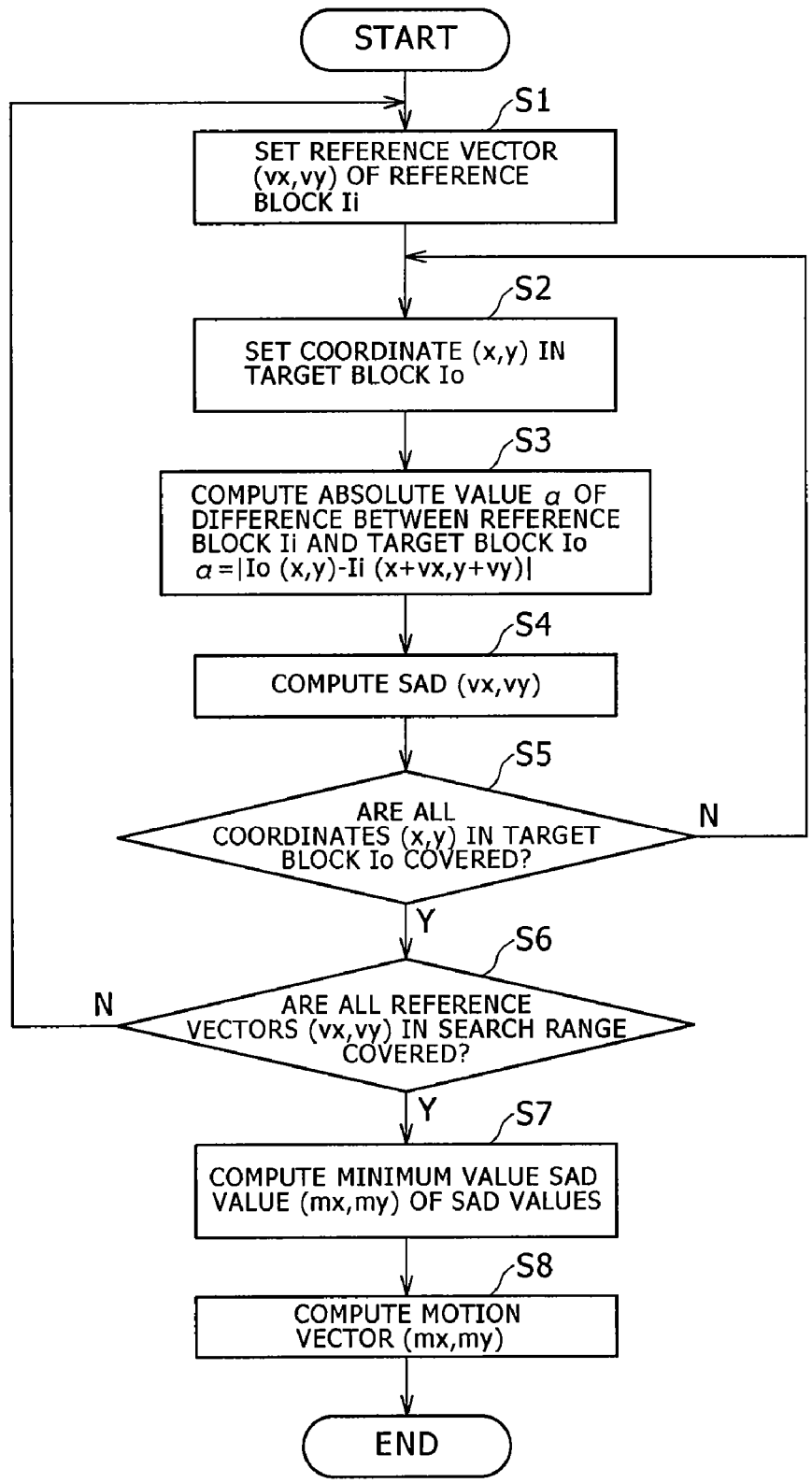
FIG. 44 is an explanatory diagram referred to in describing processing to detect a motion vector by adoption of the block matching technique in related art.

The processes of the steps S101 to S105 are exactly the same as respectively the processes of the steps S1 to S5 of the flowchart shown in FIG. 44 except that, in the case of the steps S103 and S104, the SAD value is stored at a temporary memory location.

If the determination result produced at the step S105 indicates that the processes of the steps S3 and S4 have been carried out for all pixels (x, y) in the target block Io and all their corresponding points (x+vx, y+vy) in the reference block Ii, that is, if the final SAD value SAD (vx, vy) for the current reference vector (vx, vy) has been found, on the other hand, the flow of the processing according to the first typical implementation goes on to a step S106. A contracted reference vector (vx/n, vy/n) is computed by contracting the reference vector (vx, vy). To put it concretely, the contracted reference vector (vx/n, vy/n) is computed by multiplying the reference vector (vx, vy) by a contraction factor of 1/n. In general, the x-direction and y-direction values (vx/n, vy/n) of the contracted reference vector (vx/n, vy/n) each have a fraction part.

Then, at the next step S107, a plurality of close reference vectors located close to the contracted reference vector (vx/n, vy/n) are identified. The close reference vectors are each a contracted reference vector having an integer vx/n value and an integer vy/n value. In this embodiment, the number of close reference vectors is set at four. Then, at the next step S108, the SAD value stored at the temporary location at the step S104 is split into four component SAD values by adoption of a linear weighted distribution technique based on relations between positions pointed to by the close reference vectors and a position pointed to by the contracted reference vector (vx/n, vy/n) as described earlier. Subsequently, at the next step S109, the four component values are distributed among four table elements included in the contracted correlation-value table as four table elements associated with the four close reference vectors respectively.

Figure 26:
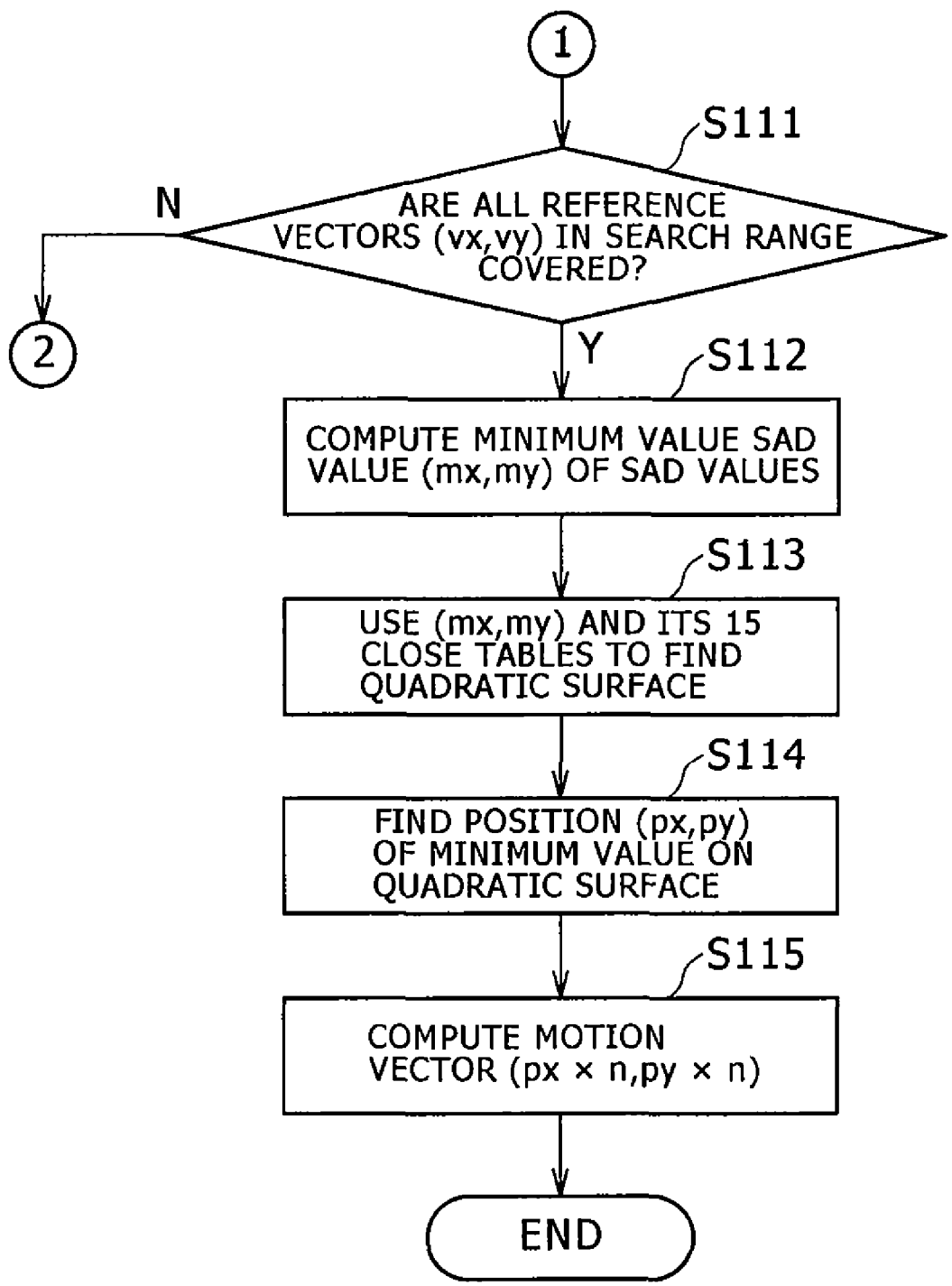
FIG. 26 shows the continuation of the flowchart representing the processing carried out to detect a motion vector in accordance with the first typical implementation in the image processing apparatus according to a first embodiment.

After the process of the step S109 is completed, the flow of the processing according to the first typical implementation goes on to a step S111 of the flowchart shown in FIG. 26 to produce a result of determination as to whether or not the processes of the steps S102 to S109 have been carried out for all reference-block locations in the search range 105, that is, for all reference vectors (vx, vy).

If the determination result produced at the step S111 indicates that the processes of the steps S102 to S109 have not been carried out yet for all reference blocks in the search range 105, that is, for all reference vectors (vx, vy), the flow of the processing according to the first typical implementation goes back to the step S101. Another reference block Ii pointed to by another reference vector (vx, vy) is set at another block position (vx, vy) in the search range 105. Then, the processes of the step S102 and the subsequent steps are repeated.

If the determination result produced at the step S111 indicates that the processes of the steps S102 to S109 have been carried out for all reference-block positions in the search range 105 or for all reference vectors (vx, vy), that is, if all elements of the contracted correlation-value table have each been filled with a final component SAD value, the flow of the processing according to the first typical implementation goes on to a step S112. The smallest value among all the component final SAD values stored in all the elements of the contracted correlation-value table is detected at a table-element address (mx, my).

Then, at the next step S113, a quadratic surface is created as a surface approximating the minimum correlation value detected at the table-element address (mx, my) and a plurality of correlation values stored in the contracted correlation-value table as table elements close to the table-element address (mx, my). As described above, the correlation values are each a SAD value. In the case of this embodiment, the number of correlation values stored in the contracted correlation-value table as table elements close to the table-element address (mx, my) is set at 15. Then, at the next step S114, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S115, a motion vector (px×n, py×n) with the original magnitude and the original direction is computed by multiplying the minimum-value vector (px, py) by the reciprocal value n of the contraction factor as shown in FIG. 6.

Figure 25:
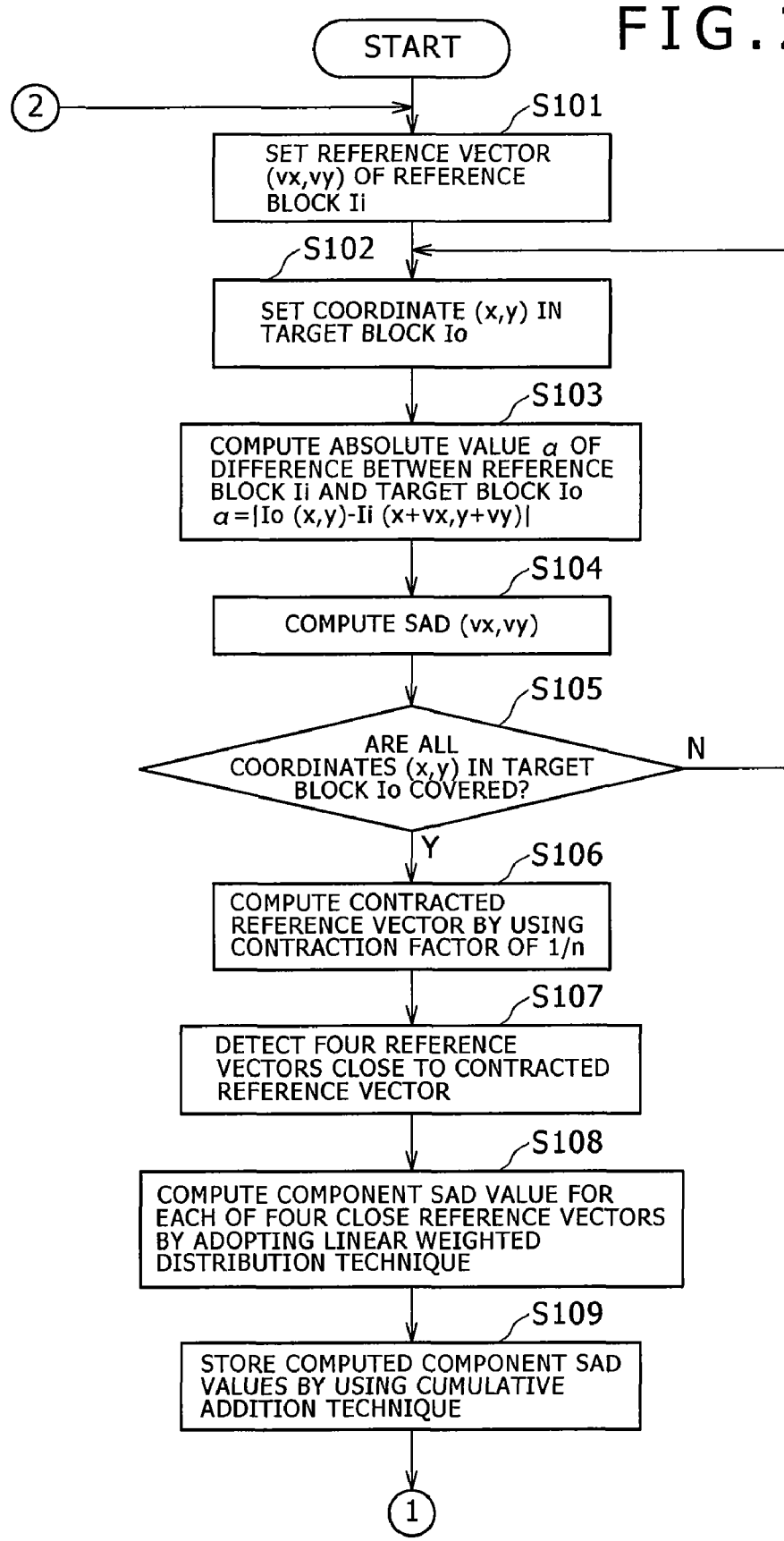
FIG. 25 shows a flowchart representing processing carried out to detect a motion vector in accordance with a first typical implementation in the image processing apparatus according to a first embodiment.

The flowchart shown in FIGS. 25 and 26 represents processing carried out in accordance with a block-matching technique according to the first typical implementation to detect a motion vector for one target block. For a segmented frame, a plurality of motion vectors need to be detected for frame segments as shown in FIG. 20. In this case, for each one of the motion vectors to be detected or each of the frame segments, a search range and a contraction factor of 1/n may be set anew in order to carry out the processing represented by the flowchart shown in FIGS. 25 and 26.

Please keep in mind that it is needless to say that, in place of the quadratic-surface method described above, the cubic-curve method can also be adopted as a technique to find the minimum-value vector (px, py) pointing to a position detected on the search range with the precision of the fraction level.

In the case of the first typical implementation described above, a SAD value is found for a reference block or a reference vector and, by adoption of the linear weighted distribution technique, the SAD value is then split into a plurality of component SAD values for a plurality of close reference vectors each located in close proximity to a contracted reference vector obtained as a result of contracting the reference vector. That is to say, a SAD value represents a value of correlation between the target block and a reference block. In the case of the first typical implementation described, a correlation value is found for a reference block associated with a reference vector and, by adoption of the linear weighted distribution technique, the correlation value is then split into a plurality of component correlation values for a plurality of close reference vectors each located in close proximity to a contracted reference vector obtained as a result of contracting the reference vector.

In the case of a second typical implementation, on the other hand, a correlation value is computed as a difference in pixel value between a pixel on the target block and a corresponding pixel on a reference block. The computed correlation value is thus not a SAD value. Then, by adoption of the linear weighted distribution technique, the computed correlation value is split into a plurality of component correlation values for a plurality of close reference vectors each located in close proximity to a contracted reference vector obtained as a result of contracting a reference vector pointing to the reference block. The process to compute a correlation value and the process to split the computed correlation value into a plurality of component correlation values are repeated for all pixels in the target block (or all corresponding pixels in the reference blocks) to find a plurality of final component correlation values by adoption of the cumulative addition technique. When the process to compute a correlation value and the process to split the computed correlation value into a plurality of component correlation values are completed for all pixels in the reference block, the state of a resulting contracted correlation-value table (or a resulting contracted SAD table) is the same as the contracted correlation-value table (or the contracted SAD table) generated by the first typical implementation.

The processing flow of the second typical implementation realizing operations of the hand-trembling motion-vector detection unit 15 is explained by referring to a flowchart shown in FIGS. 27 and 28 as follows.

Figure 27:
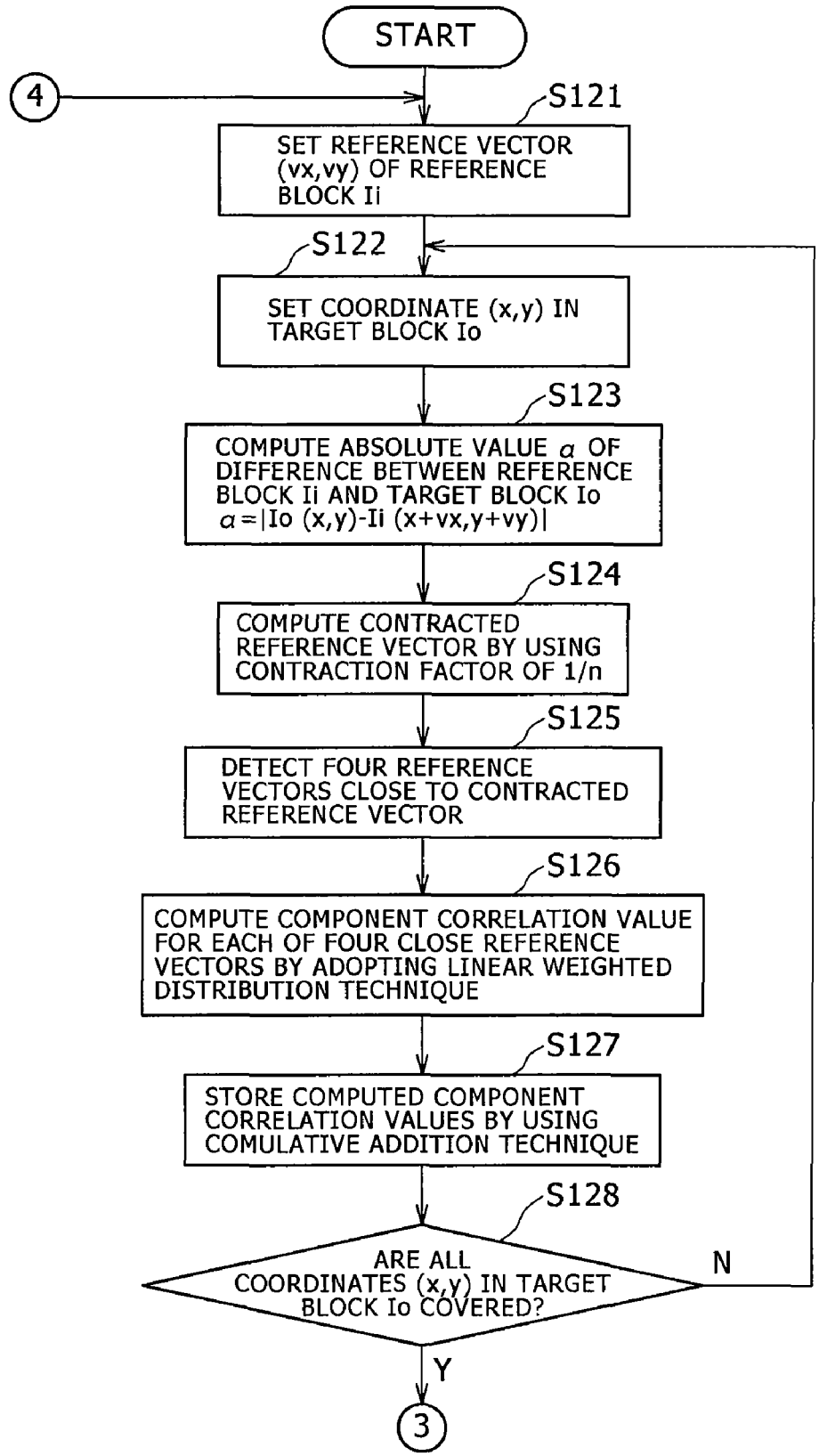
FIG. 27 shows a flowchart representing processing carried out to detect a motion vector in accordance with a second typical implementation in the image processing apparatus according to a first embodiment.

Since the processes of steps S121 to S123 of the flowchart shown in FIG. 27 are the same as respectively those of the steps S101 to S103 of the flowchart shown in FIG. 25, the processes of steps S121 to S123 are not explained in detail.

At the next step S123 of the flowchart for the second typical implementation, the absolute value α of the difference between the pixel value Io (x, y) of a pixel (x, y) on the target block Io and the pixel value Ii (x+vx, y+vy) of the corresponding pixel on the reference block Ii is computed in accordance with Eq. (1). Then, at the next step S124, a contracted reference vector (vx/n, vy/n) is computed by contracting the reference vector (vx, vy) pointing to the reference block Ii at a contraction factor of 1/n.

Subsequently, at the next step S125, a plurality of close reference vectors located at close to the contracted reference vector (vx/n, vy/n) are identified. The close reference vectors are each a contracted reference vector having an integer vx/n value and an integer vy/n value. In this embodiment, the number of close reference vectors is set at four. Then, at the next step S126, the absolute value α found at the step S123 as the absolute value of the difference in pixel value is split into four component differences by adoption of the linear weighted distribution technique based on relations between positions pointed to by the close reference vectors and a position pointed to by the contracted reference vector (vx/n, vy/n) as described earlier.

Subsequently, at the next step S127, the four component differences are distributed among four table elements included in the contracted correlation-value table as four table elements associated with the four close reference vectors respectively.

After the process of the step S127 is completed, the flow of the processing according to the second typical implementation goes on to the next step S128 to produce a result of determination as to whether or not the processes of the steps S123 to S127 have been carried out for all points (x, y) in the target block Io and all their corresponding points (x+vx, y+vy) in the reference block Ii. If the result of the determination indicates that the processes of the steps S123 to S127 have not been carried out yet for all pixels (x, y) in the target block Io and all their corresponding pixels (x+vx, y+vy) in the reference block Ii, the flow of the processing according to the second typical implementation goes back to the step S122. Another pixel with coordinates (x, y) is specified as another pixel in the target block Io. Then, the processes of the steps S123 to S127 following the step S122 are repeated.

Figure 28:
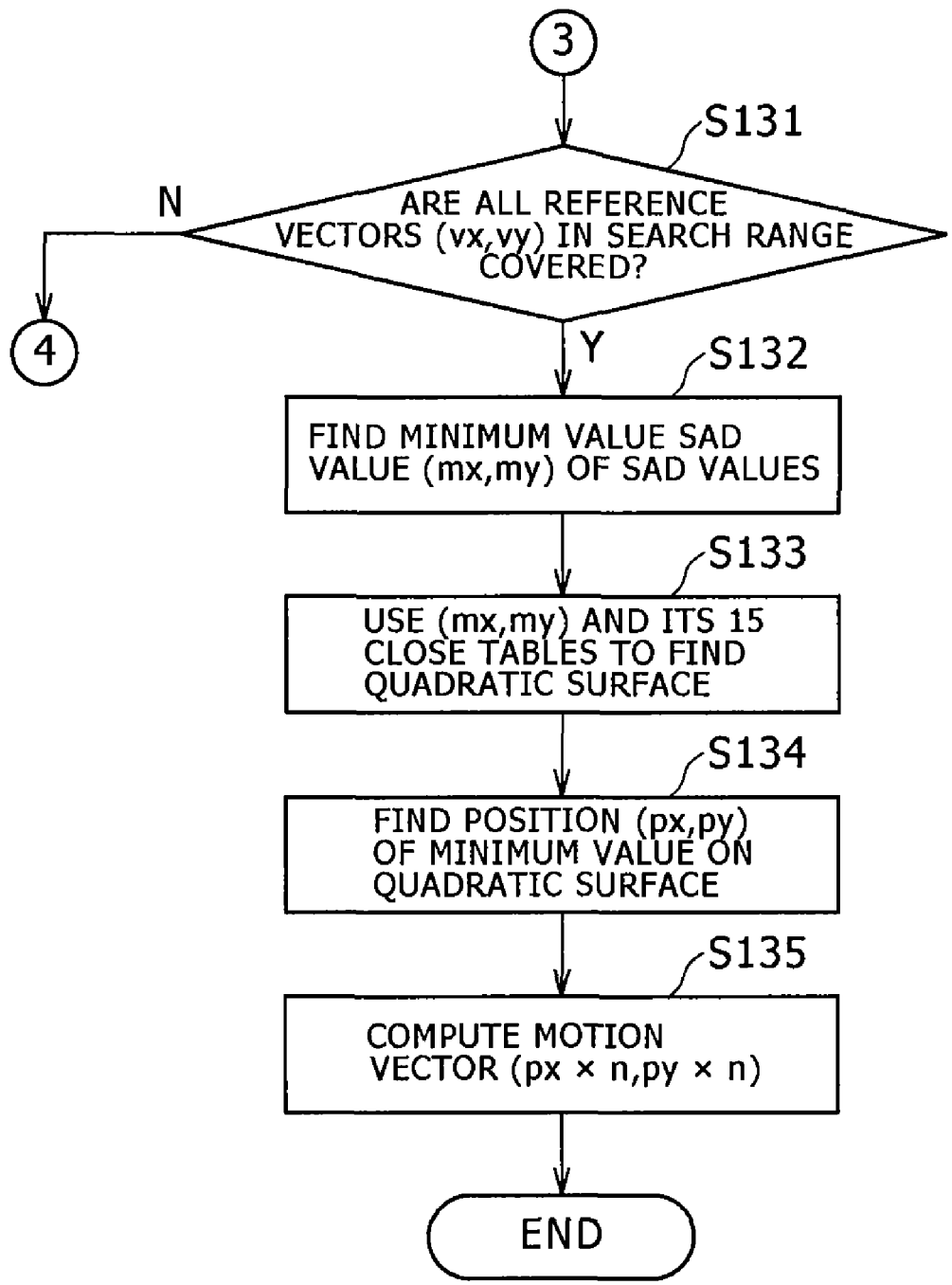
FIG. 28 shows the continuation of the flowchart representing the processing carried out to detect a motion vector in accordance with the second typical implementation in the image processing apparatus according to a first embodiment.

If the determination result produced at the step S128 indicates that the processes have been carried out for all pixels (x, y) in the target block Io, that is, if the final SAD value SAD (vx, vy) for the current reference vector (vx, vy) has been found, the flow of the processing goes on to a step S131 of the flowchart shown in FIG. 28 to produce a result of determination as to whether or not the processes of the steps S122 to S128 have been carried out for all reference vectors (vx, vy).

If the determination result produced at the step S131 indicates that the processes of the steps S122 to S128 have not been carried out yet for all reference blocks, that is, for all reference vectors (vx, vy), the flow of the processing goes back to the step S121. Another reference block Ii pointed to by another reference vector (vx, vy) is set at another block position (vx, vy) in the search range 105. Then, the processes of the step S122 and the subsequent steps are repeated.

If the determination result produced at the step S131 indicates that the processes have been carried out for all reference-block positions or for all reference vectors (vx, vy), that is, if all elements of the contracted correlation-value table have each been filled with a final component SAD value, the flow of the processing goes on to a step S132. The smallest value among all the component final SAD values stored in all the elements of the contracted correlation-value table or the contracted SAD table is detected at a table-element address (mx, my).

Then, at the next step S133, a quadratic surface is created as a surface approximating the minimum correlation value detected at the table-element address (mx, my) and a plurality of correlation values stored in the contracted correlation-value table as table elements close to the table-element address (mx, my). As described above, the correlation values are each a SAD value. In the case of this embodiment, the number of correlation values stored in the contracted correlation-value table as table elements close to the table-element address (mx, my) is set at 15. Then, at the next step S134, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S135, a motion vector (px×n, py×n) with the original magnitude and the original direction is computed by multiplying the minimum-value vector (px, py) by the reciprocal value n of the contraction factor as shown in FIG. 6.

The flowchart shown in FIGS. 27 and 28 represents processing carried out in accordance with a block-matching technique according to the second typical implementation to detect a motion vector for one target block. For a segmented frame, a plurality of motion vectors need to be detected for frame segments as shown in FIG. 20. In this case, for each one of the motion vectors to be detected or each of the frame segments, a search range and a contraction factor of 1/n may be set anew in order to carry out the processing represented by the flowchart shown in FIGS. 27 and 28.

Please keep in mind that it is needless to say that, even in the case of the second typical implementation, in place of the quadratic-surface method described above, the cubic-curve method based on two cubic curves laid on planes oriented the vertical and horizontal directions respectively can also be adopted as a technique to find the minimum-value vector (px, py) pointing to a position detected on the search range with the precision of the fraction level.

If any of the methods to determine a motion vector in accordance with the embodiment is adopted, the process to determine a motion vector does not end with a failure such as detection of a completely incorrect motion vector even for a one-dimensional contraction factor of 1/64 used for contracting reference vectors as is obvious from the effects exhibited by the method as shown in FIG. 19. Thus, in essence, the size of the SAD table used as a typical correlation-value table can be reduced at a two-dimensional contracting factor of 1/4096 (=1/64×1/64) successfully.

As a matter of fact, an attempt can be made to further reduce the size a contracted SAD table (used as a typical correlation-value table), which has been obtained as a result of a contraction process using the two-dimensional contracting factor of 1/4096 or the one-dimensional contraction factor of 1/64. That is to say, first of all, a contracted SAD table is obtained by carrying out a first process to detect a motion vector at the one-dimensional contraction factor of 1/64. Then, the size of the search range (which corresponds to the correlation-value table) is further reduced to result in a new search range with its center coinciding with the position pointed to by the detected motion vector before carrying out a second process to detect a motion vector at a one-dimensional contraction factor of typically ⅛. Thus, processes to detect a motion vector are carried out by reducing the one-dimensional contraction factor (that is, increasing the magnitude of 1/n) in order to reduce the resulting vector error to a value within a range of tolerance. By properly setting the one-dimensional contraction factor for the second process to detect a motion vector at a proper value, the motion vector can be detected with a very high degree of precision.

The processing flow of the third typical implementation implementing operations of the hand-trembling motion-vector detection unit 15 is explained by referring to a flowchart shown in FIGS. 29 and 32 as follows.

Figure 29:
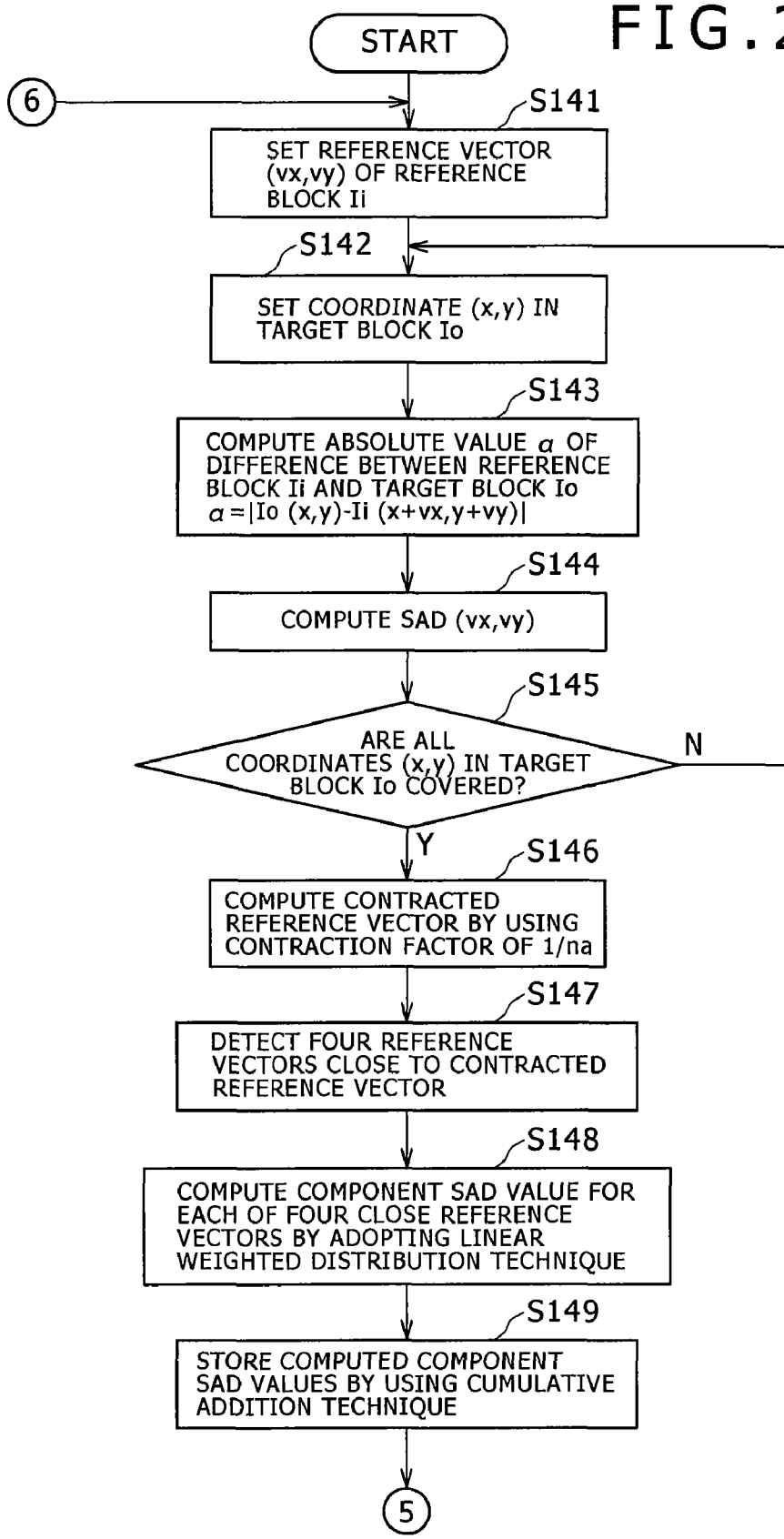
FIG. 29 shows a flowchart representing processing carried out to detect a motion vector in accordance with a third typical implementation in the image processing apparatus according to a first embodiment.
Figure 32:
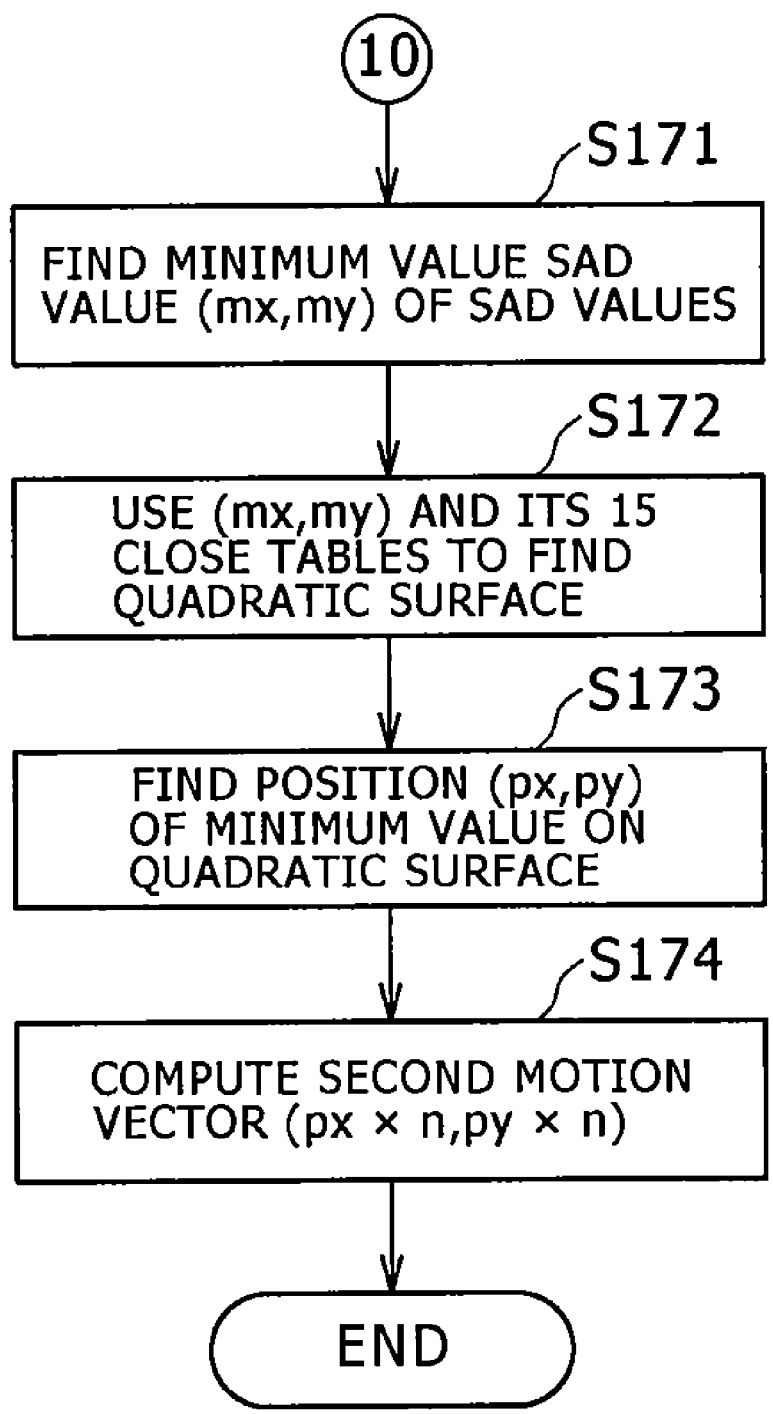
FIG. 32 shows a further continuation of the flowchart representing the processing carried out to detect a motion vector in accordance with the third typical implementation in the image processing apparatus according to a first embodiment.

The processing represented by the flowchart shown in FIGS. 29 and 32 as processing according to the third typical implementation is basically based on the processing to detect a motion vector in accordance with the first typical implementation. Thus, the processes of steps S141 to S149 of the flowchart shown in FIG. 29 are exactly the same as respectively the processes of the steps S101 to S109 of the flowchart shown in FIG. 25 whereas the processes of steps S151 to S155 of the flowchart shown in FIG. 30 are exactly the same as respectively the processes of the steps S111 to S115 of the flowchart shown in FIG. 26.

Figure 30:
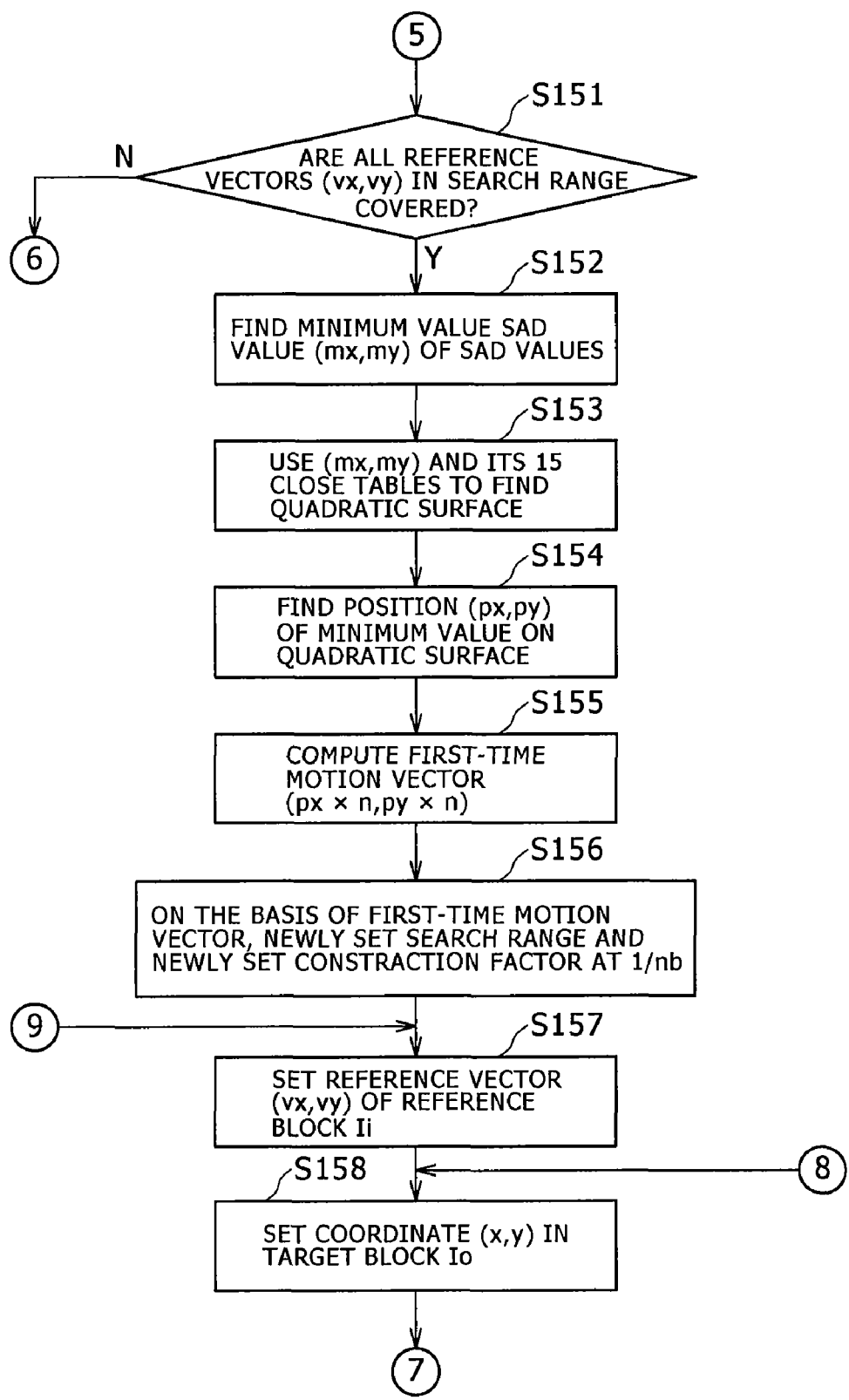
FIG. 30 shows a continuation of the flowchart representing the processing carried out to detect a motion vector in accordance with the third typical implementation in the image processing apparatus according to a first embodiment.

In the case of the third typical implementation, however, the processing to detect a motion vector is not ended at the step S155 of the flowchart shown in FIG. 30. Instead, the motion vector detected at the step S155 is used as a first motion vector. Then, at the next step S156, the size of the search range in the same reference frame is further reduced to result in a new search range by using the position pointed to by the detected motion vector as the center of the new search range with a reduced size and by reducing the one-dimensional contraction factor from 1/na used in the first processing to detect a motion vector to 1/nb used in the second processing where na>nb.

To put it in detail, a motion vector detected in the first motion-vector detection processing points to an approximate block range including a reference block having correlation with the target block to a certain degree. Then, it is possible to newly set a narrower search range centered at the approximate block range including the reference block having correlation with the target block to a certain degree as a new block range to be used in the second processing to detect another motion vector. By using a smaller contraction vector, it can be expected that a second motion vector with a smaller error can be detected.

Figure 31:
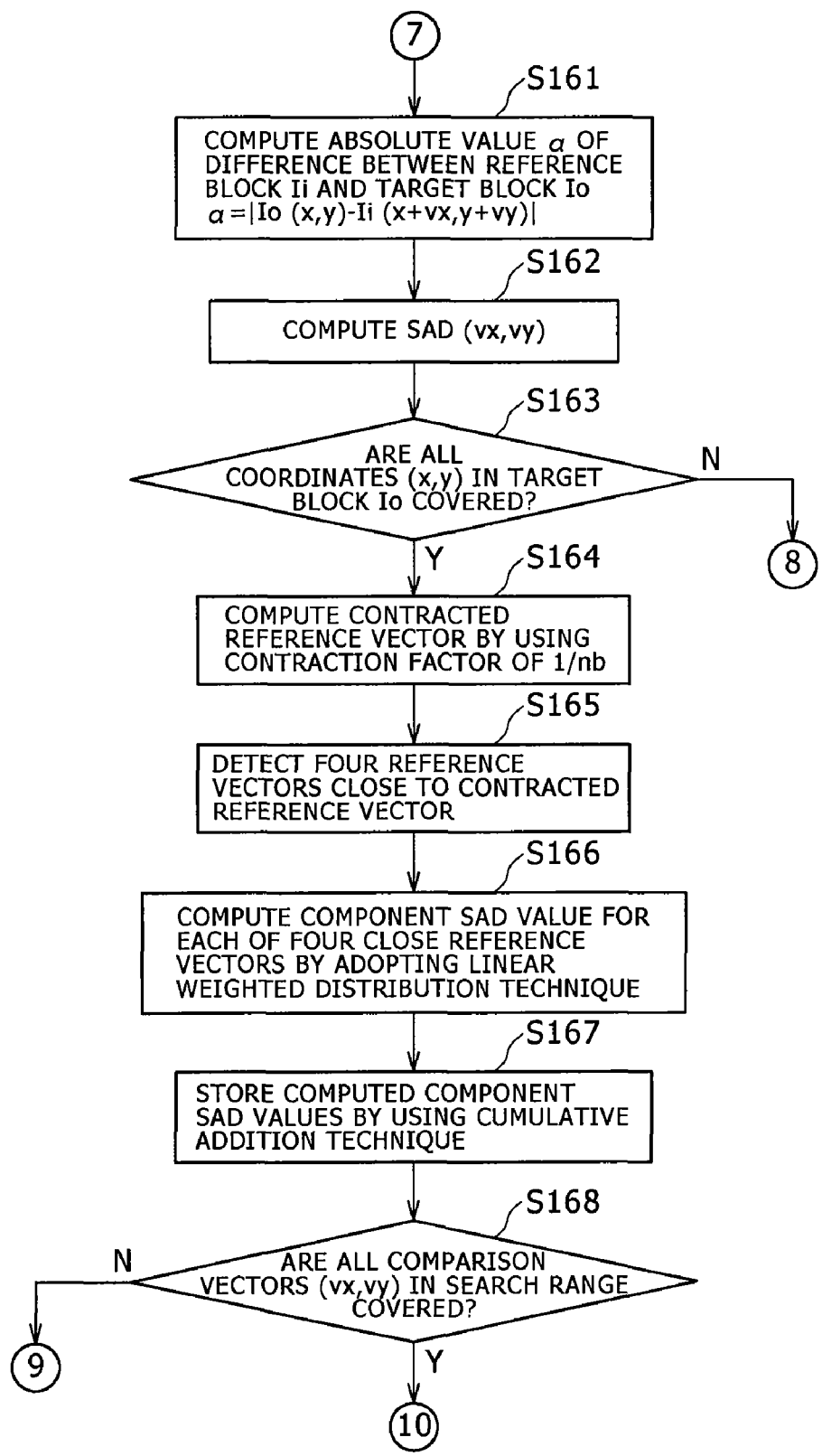
FIG. 31 shows another continuation of the flowchart representing the processing carried out to detect a motion vector in accordance with the third typical implementation in the image processing apparatus according to a first embodiment.

Thus, as described above, at the step S156, a narrower search range and a reduced one-dimensional contraction factor are used to carry out the second processing to detect another motion vector in entirely the same way as the first motion-vector detection processing at steps S157 and S158 of the flowchart shown in FIG. 30, steps S161 to S168 of the flowchart shown in FIG. 31, and steps S171 to S174 of the flowchart shown in FIG. 32. The processes of these steps are entirely the same way as the processes of the steps S101 to S109 of the flowchart shown in FIG. 25 and the processes of the steps S111 to S115 of the flowchart shown in FIG. 26.

By carrying out the second motion-vector detection processing as described above, eventually, a second motion vector is detected at the step S174 as the desired final motion vector.

The method to detect a motion vector in accordance with the third typical implementation is implemented by executing the method to detect a motion vector in accordance with the first typical implementation repeatedly two times. It is needless to say, however, that the method to detect a motion vector in accordance with the first typical implementation can be executed repeatedly more than two times with gradually decreased search ranges and, if necessary, gradually decreased contraction factors.

In addition, it is also needless to say that, in realization of the method to detect a motion vector (px, py) in accordance with the third typical implementation, the method to detect a motion vector in accordance with the second typical implementation can be executed in place of the method to detect a motion vector (px, py) in accordance with the first typical implementation. On the top of that, in place of the quadratic-surface method described above, the cubic-curve method based on two cubic curves laid on planes oriented the vertical and horizontal directions respectively can also be adopted as a method to detect a motion vector (px, py) pointing to a position with the precision of the fraction level as is the case the first and second typical implementations described earlier.

In the first embodiment implementing an image processing apparatus as an image pickup apparatus as shown in FIG. 24, as a prerequisite, the image memory unit 4 accessed by the hand-trembling motion-vector detection unit 15 includes two frame memories used for storing the images of both the original frame (serving as the target frame) and a reference frame respectively. Thus, a motion vector is detected with a timing delayed from the target frame by a period corresponding to one frame.

In a second embodiment, on the other hand, the image processing apparatus has a configuration in which current image data coming from the image pickup device 11 is taken as a reference frame so that, for stream data of a luster scanner, a SAD value can be computed in a real-time manner.

Figure 33:
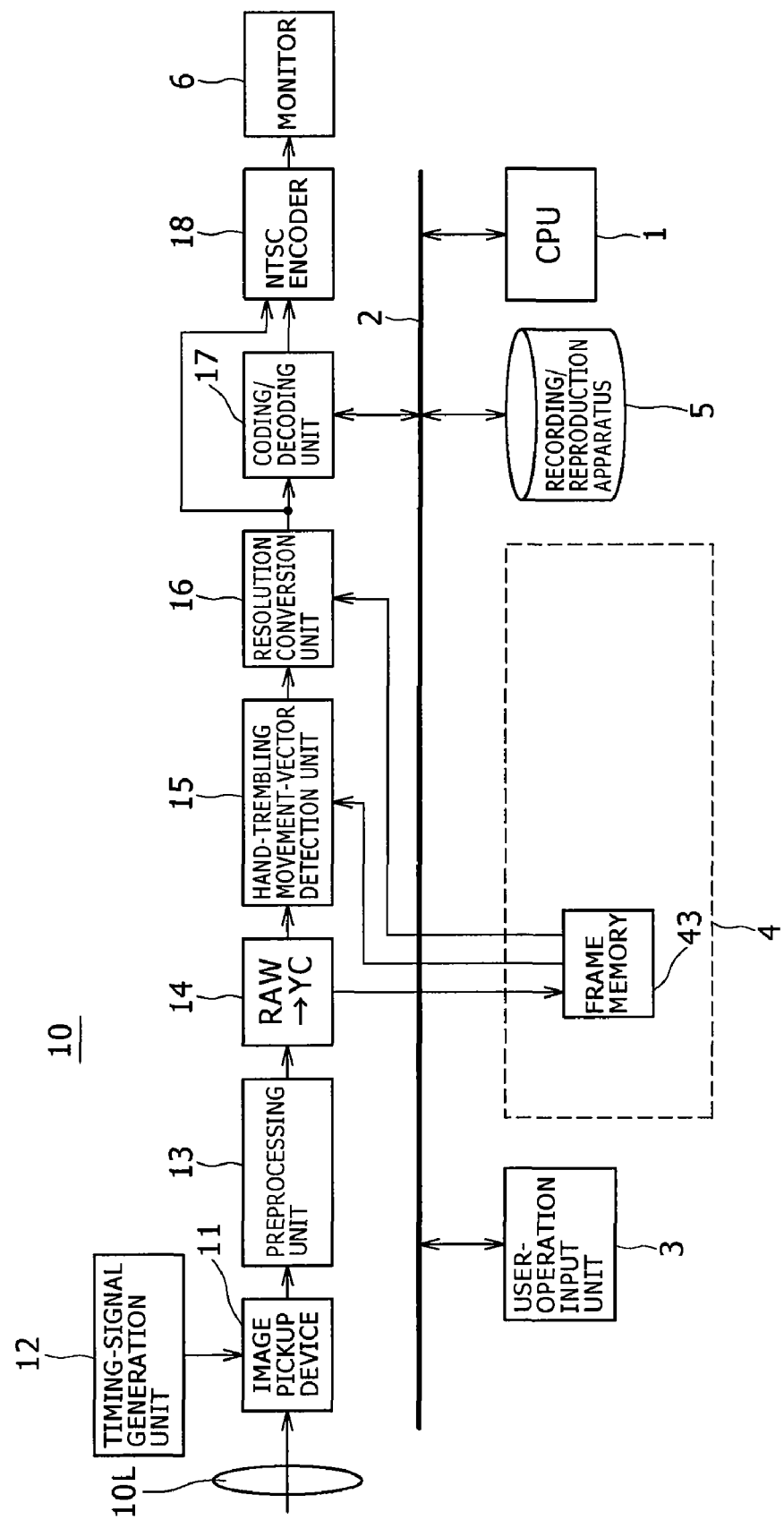
FIG. 33 is a block diagram showing a typical configuration of an image processing apparatus according to a second embodiment.

FIG. 33 is a block diagram showing a second embodiment implementing an image processing apparatus as an image pickup apparatus. As is obvious from FIG. 33, the configuration of the image pickup apparatus 10 is the same as the configuration of the image pickup apparatus 10 implemented by the first embodiment shown in FIG. 24 except that, in the case of this second embodiment, the image memory unit 4 includes one frame memory 43.

In the second embodiment, the original frame serving as the target frame is stored in a frame memory 43 and a frame output by the data conversion unit 14 as a stream is taken as a reference frame. The hand-trembling motion-vector detection unit 15 employed in the first embodiment explained before carries out a process to compute a SAD value as a typical correlation value representing correlation between the target block and a reference block on the basis of image data of two frames stored in the frame memories 41 and 42 respectively. In the case of this second embodiment shown in FIG. 33, on the other hand, image data stored in the frame memory 43 is taken as the image of an original frame serving as a target frame. Stream image data coming from the data conversion unit 14 is used as the image data of the reference frame, and the hand-trembling motion-vector detection unit 15 carries out a process to compute a SAD value as a typical correlation value representing correlation between the target block on the target frame and a reference block on the reference frame on the basis of image data of these two frames.

Then, the resolution conversion unit 16 cuts out image data from the frame memory 43 on the basis of a motion vector detected by the hand-trembling motion-vector detection unit 15. In this way, it is possible to output image data free of effects of hand trembling. The configuration of the rest and the other operations are the same as the first embodiment.

As described above, in the case of this second embodiment, stream image data coming from the data conversion unit 14 is used as the image data of a reference frame. In consequence, for a certain pixel on the coming reference frame, a plurality of reference blocks including a pixel serving as a copy of the certain pixel exist at the same time on the reference frame. The existence of such reference blocks is explained by referring to FIG. 34.

Figure 34:
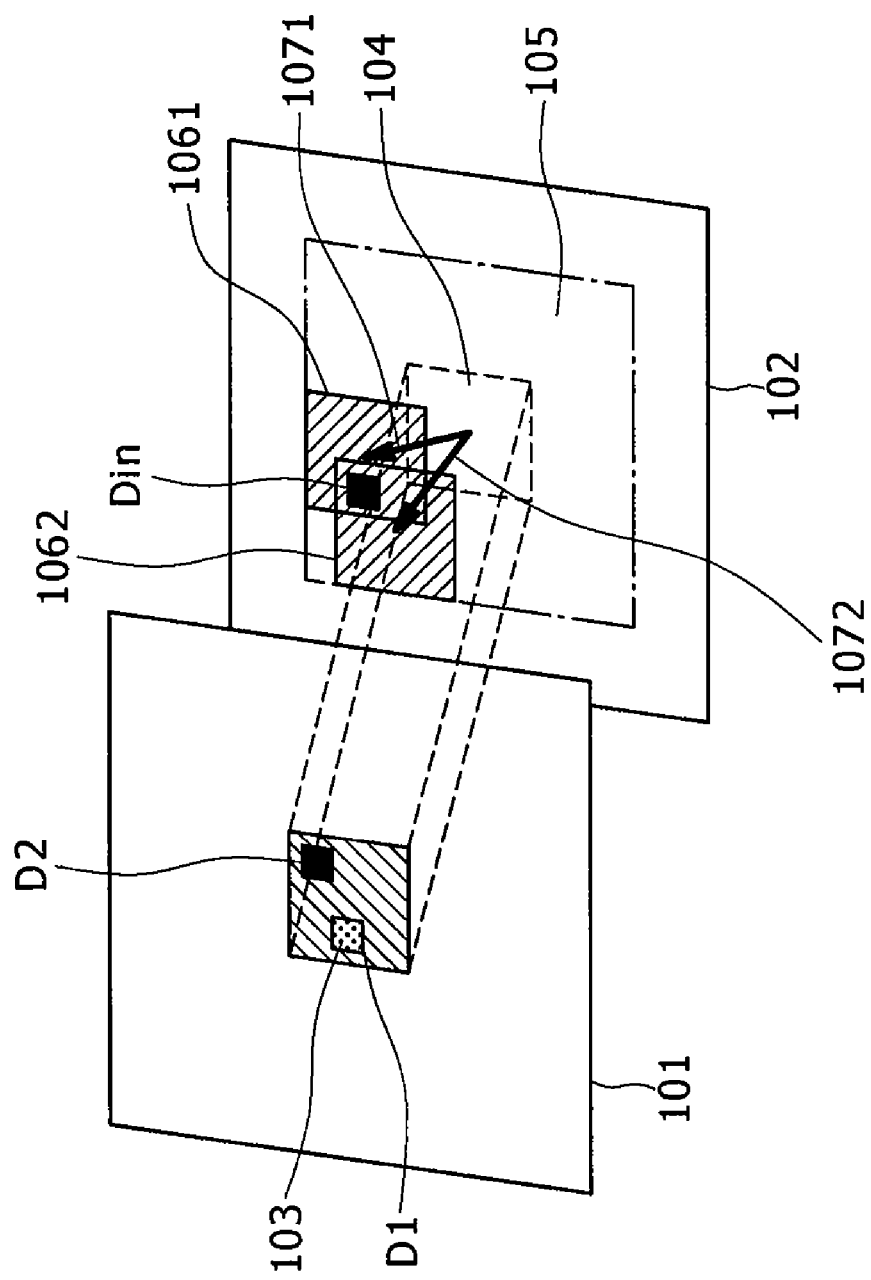
FIG. 34 is an explanatory diagram referred to in describing processing to detect a motion vector in the image processing apparatus according to a second embodiment.

As is obvious from FIG. 34, the search range 105 on the reference frame 102 includes an input pixel Din, which is a copy pixel of a pixel D2 on the target block 103 on the original frame 101. The input pixel Din is a pixel included on the left side of a reference block 1061 pointed to by a reference vector 1071 as well as a pixel included at the right upper corner of a reference block 1062 pointed to by a reference vector 1072.

Thus, in processing the reference block 1061 during a process to compute a difference in pixel value between pixels, the pixel value of the input pixel Din is compared with a pixel D1 on the target block 103. In processing the reference block 1062 during a process to compute a difference in pixel value between pixels, on the other hand, the pixel value of the input pixel Din is compared with a pixel D2 on the target block 103.

In order to make explanation easy to understand, FIG. 34 and FIG. 35 to be described later each show two reference frames. In actuality, however, a number of reference blocks including the input pixel Din exist.

In the process to compute a SAD value between the target block and a reference block in accordance with this second embodiment, a difference in pixel value is computed by finding the absolute value of the difference between the luminance value Y of the input pixel Din on the reference block 106 being processed and the luminance value Y of a pixel at a point existing on the target block 103 as a point corresponding to the point of the input pixel Din. Each time the absolute value of such a difference is computed, the absolute value of the difference is cumulatively added to a temporary sum stored previously in a table element, which is included in a SAD table 108 as a table element according to a reference vector 107 associated with the reference block 106, as a sum of the absolute values of such differences. The process to compute the absolute value of a difference in pixel value and the process to store the absolute value in a table element are carried out for every reference vector 107 associated with the reference frame 106 including the input pixel Din.

Let us assume for example that the reference block 1061 is a reference block currently being processed. In this case, a difference in pixel value is computed by finding the absolute value of the difference between the luminance value Y of the input pixel Din on the reference block 1061 and the luminance value Y of a pixel D1 at a point existing on the target block 103 as a point corresponding to the point of the input pixel Din. Then, the computed absolute value of the difference is cumulatively added to a temporary sum stored previously in a correlation-value table element (or a SAD table element) 1091, which is included in a correlation-value table (or a SAD table) 108 shown in FIG. 35 as a table element according to a reference vector 1071 associated with the reference block 1061, as a sum of the absolute values of such differences. The process to compute the absolute value of a difference in pixel value and the process to cumulatively add the computed absolute value to a temporary sum computed and stored previously in the SAD table element 1091 are carried out for every reference vector 107 associated with the reference frame 106 including the input pixel Din. For example, the reference vector 1072 is associated with the reference block 1062 also including the input pixel Din. In this case, the process to compute the absolute value of a difference in pixel value and the process to cumulatively add the computed absolute value to a temporary sum computed and stored previously in the SAD table element 1092, which is included in the correlation-value table (or the SAD table) 108 shown in FIG. 35 as a table element according to a reference vector 1072 associated with the reference block 1062, are carried out for the reference vector 1072 as follows.

When the reference block 1062 is processed, a difference in pixel value is computed by finding the absolute value of the difference between the luminance value Y of the input pixel Din on the reference block 1062 and the luminance value Y of a pixel D2 at a point existing on the target block 103 as a point corresponding to the point of the pixel Din. Then, the computed absolute value of the difference is cumulatively added to a temporary sum stored previously in a SAD table element 1092, which is included in the SAD table 108 shown in FIG. 35 as a table element according to the reference vector 1072 associated with the reference block 1062, as a sum of the absolute values of such differences.

The processing carried out on all reference blocks 106 (such as the reference blocks 1061 and 1062) each including the input pixel Din as described above is carried out on for all input pixels Din in the search range 105 and, as the processing is done for all the input pixels Din in the search range 105, each table element 109 of the SAD table 108 contains a final SAD value and the creation of the SAD table 108 is completed.

Figure 35:
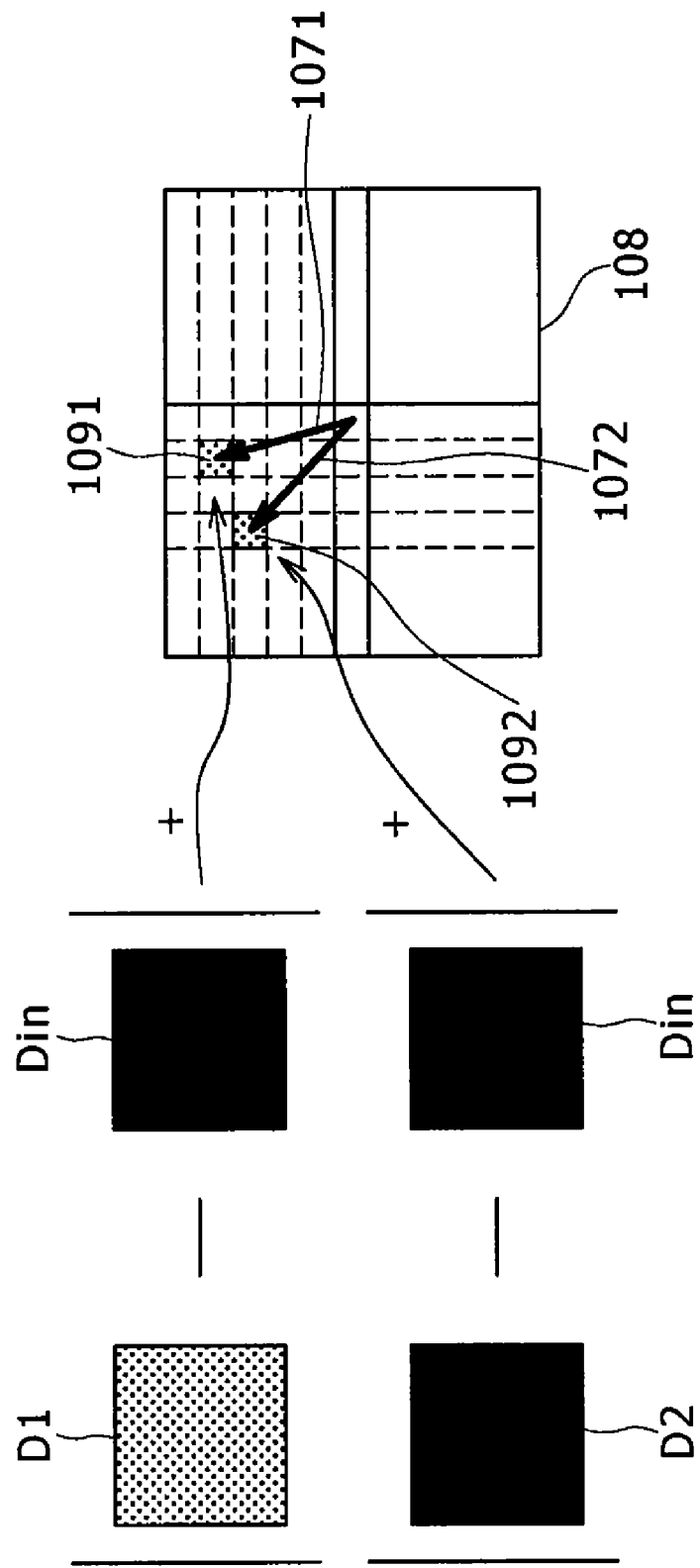
FIG. 35 is an explanatory diagram referred to in describing processing to detect a motion vector in the image processing apparatus according to a second embodiment of the present invention.

The explanation with reference to FIG. 35 holds true for a case of applying the technique in related art to a process to compute SAD values in a real-time manner. As described before by referring to FIG. 35, the SAD table elements 1091 and 1092 are each a typical SAD table element 109 included in the SAD table 108 as elements associated with the reference vectors 1071 and 1072 respectively. In the case of this second embodiment, on the other hand, each table element 109 of the correlation-value table (or the SAD table) 108 is not a final SAD value, which is a cumulative sum of the absolute values of differences in pixel value as described above. Instead, much like the first embodiment described before, the SAD table 108 is contracted into a contracted correlation-value table (or a contracted SAD table) and each table element of the contracted correlation-value table (or the contracted SAD table) is a value obtained by executions the steps of:

computing the absolute difference of a difference in pixel value between an input pixel in the search range on a reference frame 106 and the corresponding pixel on the target frame;

contracting a reference vector 107 pointing to a reference block 106 at a contraction factor of 1/n;

splitting the computed absolute difference into a plurality of component absolute differences by adoption of the linear weighted distribution technique; and cumulatively adding the component absolute differences to temporary sums previously computed and stored in a plurality of table elements associated with a plurality of respective close contracted reference vectors existing in close proximity to a contracted vector obtained as a result of contracting the reference vector 107.

The steps described above are executed for every reference vector 107 pointing to a reference block 106 including the input pixel to obtain the value stored in the table element. The steps executed for all reference vectors 107 pointing to reference blocks 106 sharing an input pixel are repeated for every input pixel. As the execution of the steps is done for every input pixel included in the search range, the contracted correlation-value table (or the contracted SAD table) is completed.

After the contracted SAD table is completed, a process to detect an accurate movable vector in accordance with the second embodiment can be carried out by adoption of entirely the same techniques as the first embodiment. As explained earlier, the typical techniques adopted by the first embodiment are the quadratic-surface technique and the technique based on cube curves laid on planes oriented in the vertical and horizontal directions.

Figure 36:
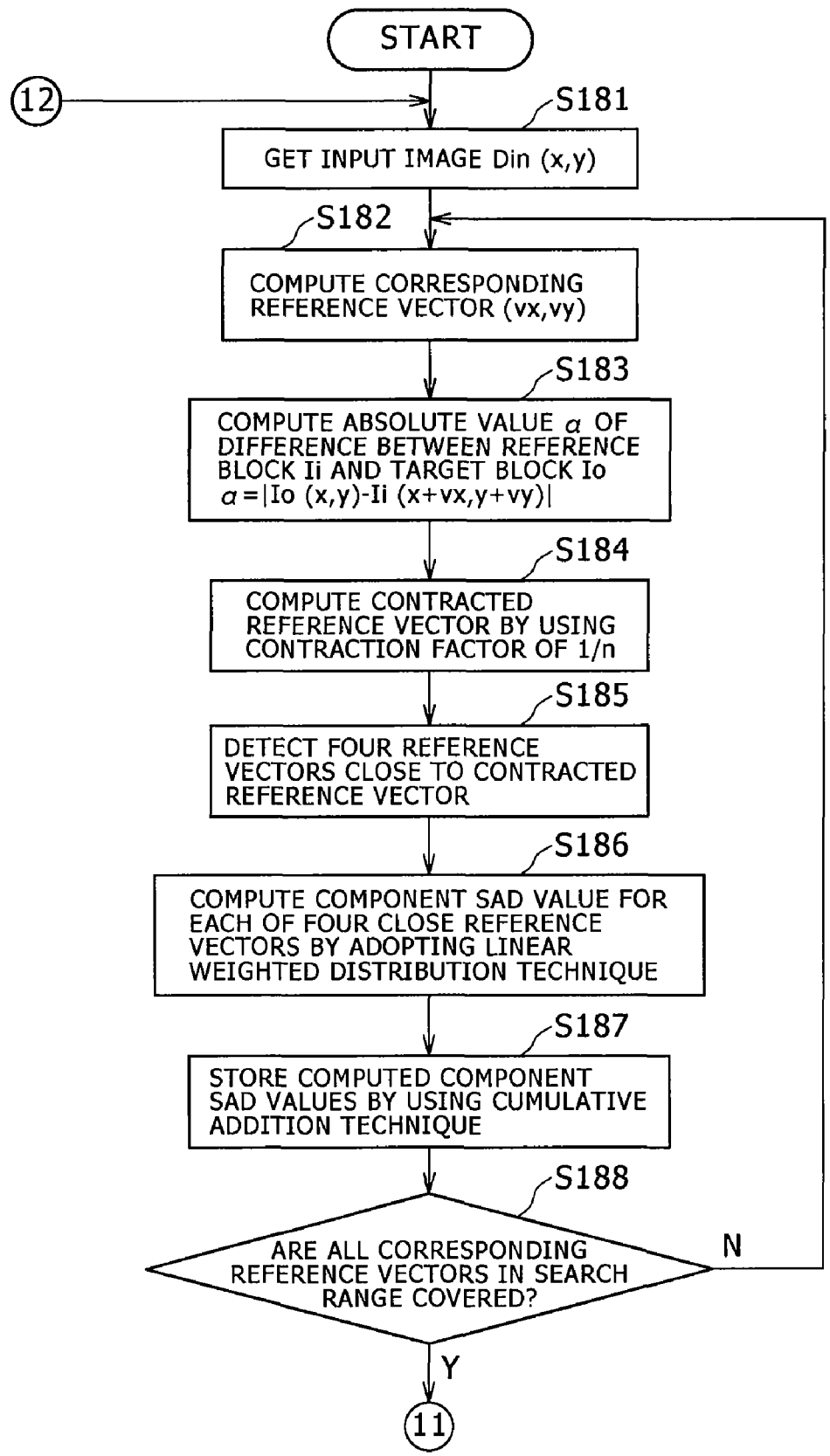
FIG. 36 shows a flowchart representing the processing carried out to detect a motion vector in the image processing apparatus according to a second embodiment.
Figure 37:
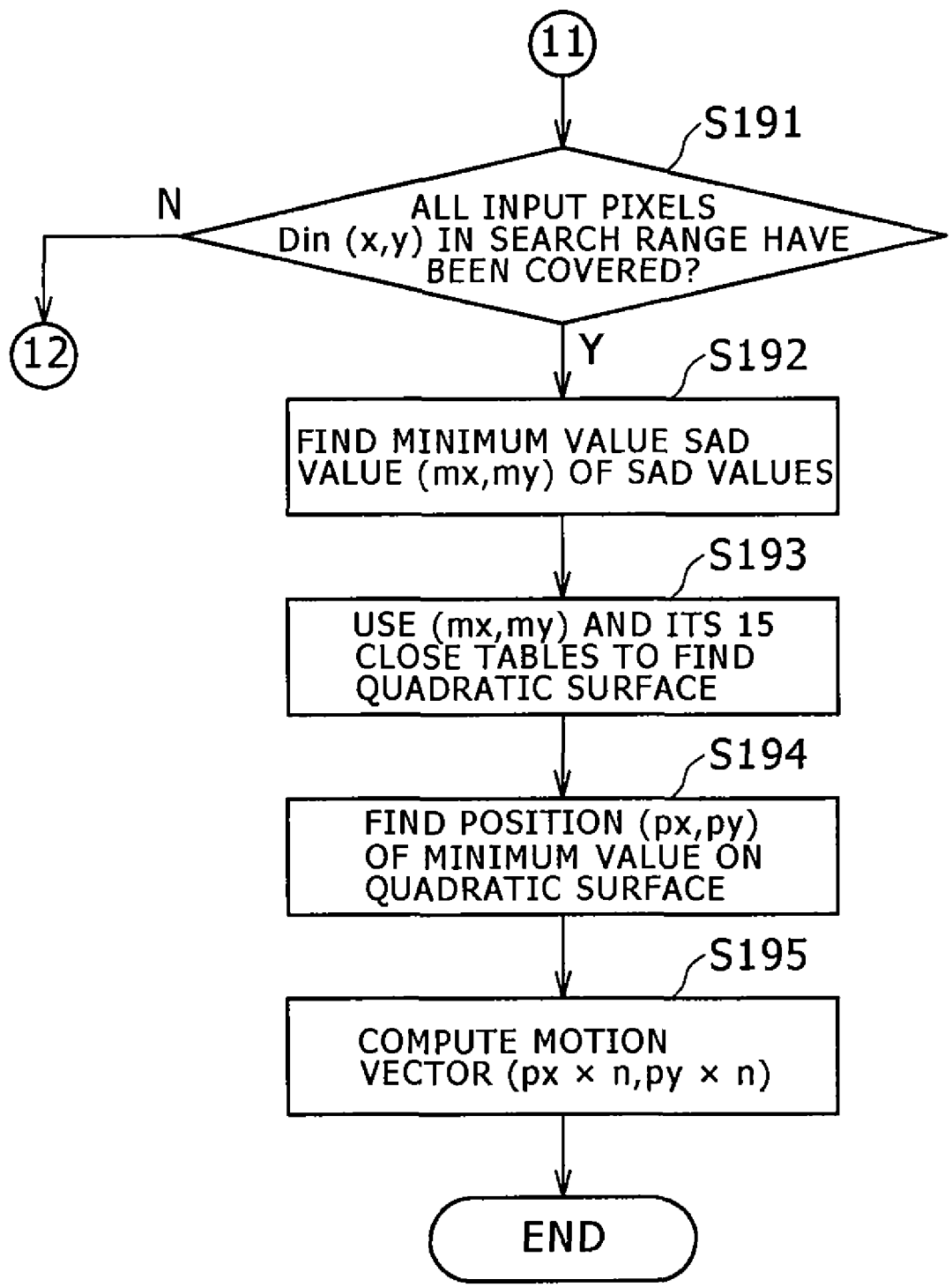
FIG. 37 shows the continuation of the flowchart representing the processing carried out to detect a motion vector in the image processing apparatus according to a second embodiment.

FIGS. 36 and 37 show a flowchart representing processing carried out by the hand-trembling motion-vector detection unit 15 employed in the image pickup apparatus 10 according to the second embodiment to detect a motion vector.

The flowchart begins with a step S181 at which the hand-trembling motion-vector detection unit 15 receives pixel data Din (x, y) of a pixel at any point (x, y) on a frame included in an input image as a reference frame. Then, at the next step S182, a reference vector (vx, vy) pointing to one of a plurality of reference blocks Ii each including the input pixel Din (x, y) at the position (x, y) is specified.

Let us have notation Ii (x, y) denote the pixel value of the pixel at the point (x, y) on the reference block Ii pointed to by the reference vector (vx, vy) and notation Io (x−vx, y−vy) denotes the pixel value of a pixel at a point (x−vx, y−vy) on the target block Io. In the following description, the point (x−vx, y−vy) in the target block Io is said to be a point corresponding the point (x, y) in the reference block Ii. Then, at the next step S1183, the absolute value α of the difference between the pixel value Ii (x, y) and the pixel value Io (x−vx, y−vy) is computed in accordance with Eq. (3) as follows:

$$\alpha = |Ii(x,y) - Io(x-vx, y-vy)| \qquad (3)$$

Then, at the next step S184, a contracted reference vector (vx/n, vy/n) is computed by contracting the reference vector (vx, vy) pointing to the reference block Ii at a contraction factor of 1/n. In general, the x-direction and y-direction values (vx/n, vy/n) of the resulting contracted reference vector each include a fraction part.

Subsequently, at the next step S185, a plurality of close reference vectors located at close to the contracted reference vector (vx/n, vy/n) are identified. As described earlier, the close reference vectors are each a contracted reference vector having an integer vx/n value and an integer vy/n value. In this embodiment, the number of close reference vectors is set at four. Then, at the next step S186, the absolute value α found at the step S183 as the difference in pixel value is split into four component differences by adoption of the linear weighted distribution technique based on relations between positions pointed to by the close reference vectors and a position pointed to by the contracted reference vector (vx/n, vy/n) as described earlier. Subsequently, at the next step S187, the four component differences are distributed among four table elements included in the contracted correlation-value table as four table elements associated with the four close reference vectors respectively.

After the process of the step S187 is completed, the flow of the processing according to the second embodiment goes on to the next step S188 to produce a result of determination as to whether or not the processes of the steps S183 to S187 have been carried out for all reference vectors (vx, vy) each pointing to a reference block Ii including the input pixel Din (x, y). If the result of the determination indicates that the processes of the steps S183 to S187 have not been carried out yet for all reference vectors (vx, vy) each pointing to a reference block Ii including the input pixel Din (x, y), the flow of the processing goes back to the step S182. Another reference vector (vx, vy) pointing to one of a plurality of reference blocks Ii each including the input pixel Din (x, y) is specified. Then, the processes of the steps S183 to S187 following the step S182 are repeated.

If the determination result produced at the step S188 indicates that the processes of the steps S183 to S187 have been carried out for all reference vectors (vx, vy) each pointing to a reference block Ii including the input pixel Din (x, y), on the other hand, the flow of the processing according to the second embodiment goes on to a step S191 of the flowchart shown in FIG. 37 to produce a result of determination as to whether or not the processes of the steps S182 to S188 have been carried out for all input pixels Din (x, y) in the search range 105. If the result of the determination indicates that the processes of the steps S182 to S188 have not been carried out yet for all input pixels Din (x, y) in the search range 105, the flow of the processing according to the second embodiment goes back to the step S181 at which pixel data Din (x, y) of another pixel at another point (x, y) on a frame is received. Then, the processes of the subsequent steps are carried out.

If the determination result produced at the step S191 indicates that the processes of the steps S182 to S188 have been carried out for all input pixels Din (x, y) in the search range 105, on the other hand, the flow of the processing according to the second embodiment goes on to a step S192. The smallest value among all the component final SAD values stored in all the elements of the contracted correlation-value table or the contracted SAD table is detected at a table-element address (mx, my).

Then, at the next step S193, a quadratic surface is created as a surface approximating the minimum correlation value detected at the table-element address (mx, my) and a plurality of correlation values stored in the contracted correlation-value table as table elements close to the table-element address (mx, my). As described above, the correlation values are each a SAD value. In the case of this second embodiment, the number of correlation values stored in the contracted correlation-value table as table elements close to the table-element address (mx, my) is set at 15. Then, at the next step S194, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S195, a motion vector (px×n, py×n) with the original magnitude and the original direction is computed by multiplying the minimum-value vector (px, py) by the reciprocal value n of the contraction factor as shown in FIG. 6.

It is to be noted that, also in the case of the second embodiment, in place of the quadratic-surface method described above, the cubic-curve method based on two cubic curves laid on planes oriented the vertical and horizontal directions respectively can also be adopted as a method to detect a motion vector (px, py) pointing to a position with the precision of the fraction level as is the case with the first to third typical implementations of the first embodiment described earlier.

In addition, it is needless to say that, also in the case of the second embodiment, the processing to detect a movement table by using a contracted SAD table can be carried out repeatedly at two or more stages while narrowing the search range and, if necessary, changing the contraction factor as is the case with the third typical implementation of the first embodiment described earlier.

The second embodiment offers merits that the size of the frame memory can be reduced by one frame in comparison with the first embodiment and, hence, the time it takes to store an input image in the frame memory can be shortened. It is needless to say that the effect of the memory-size reduction can be demonstrated. However, the short time it takes to store an input image in the frame memory is also regarded as an important feature in recent years. In a system for handling a moving picture, particularly, the short time it takes to store an input image in the frame memory by itself leads to reduction of the system delay. Thus, elimination of the sense of incompatibility caused by discrepancies between the actual object of image pickup and its image appearing on a display panel has a big effect on efforts to solicit the user for its interest in the product.

In the case of the first and second embodiments described above, a system for compensating a moving picture for effects of hand trembling is assumed and the descriptions of the embodiments are given so far by taking the assumption as a prerequisite. However, the block-matching technique provided by the embodiment of the present invention can also be extended with ease to applications of the technique to a system for compensating a still picture for effects of hand trembling. A third embodiment is an embodiment applying the present invention to a system for compensating a still picture for effects of hand trembling.

In the third embodiment, much like the second embodiment, with an input image frame taken as a reference frame to be processed, a motion vector is detected as a vector indicating a movement of the input image frame relative to a target image frame preceding the input image frame by a period corresponding to one frame. In the case of the third embodiment, however, the process of compensating a still picture for effects of hand trembling is carried out by superposing a plurality of images, which are taken consecutively in an image pickup operation at a typical rate of 3 fps, on each other while compensating the images for effects of hand trembling.

Since the process of compensating a still picture for effects of hand trembling in accordance with the third embodiment may be carried out by superposing a plurality of images, which are taken consecutively in a image pickup operation, on each other while compensating the images for effects of hand trembling, pixel precision not allowing an error greater than one pixel is necessary. That is to say, in the case of the third embodiment, as a hand-trembling motion vector, it is necessary to detect a rotational component in addition to components representing parallel movements in the horizontal and vertical directions.

Figure 38:
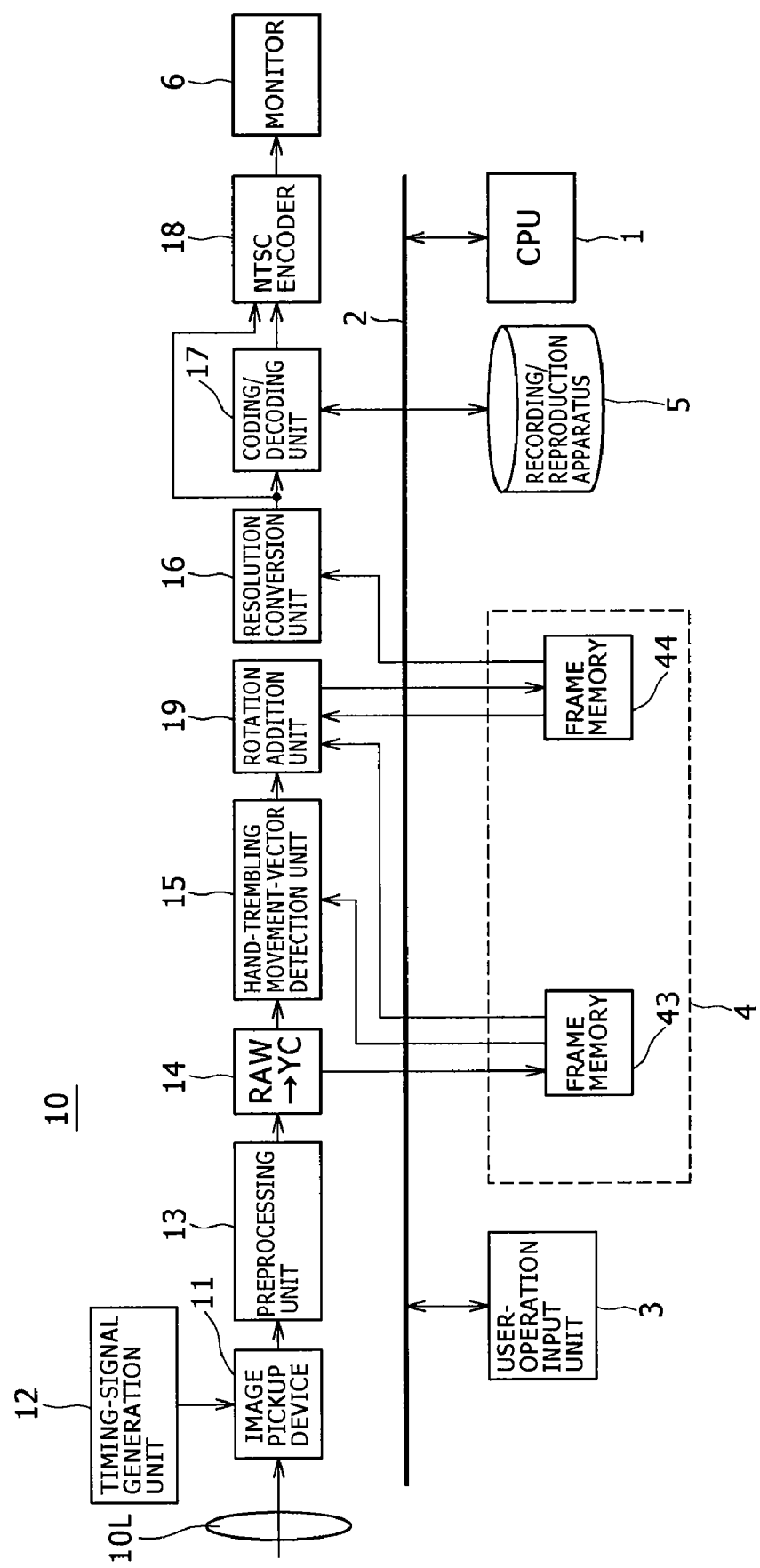
FIG. 38 is a block diagram showing a typical configuration of an image processing apparatus according to a third embodiment.

FIG. 38 is a block diagram showing a typical configuration of the image pickup apparatus according to the third embodiment. The typical configuration shown in FIG. 38 is obtained by adding a rotation addition unit 19 between the hand-trembling motion-vector detection unit 15 and the resolution conversion unit 16 to the configuration shown in FIG. 33 as the configuration of the second embodiment as well as adding a frame memory 44 to the image memory unit 4, which already includes the frame memory 43. The frame memory 44 is used as a memory for detection of the rotational component of a motion vector and superposition of frame images on each other. The rest is the same as the configuration shown in FIG. 33.

In the same way as the second embodiment described earlier as an embodiment for processing a moving picture, processing to detect a motion vector is carried out by taking input pixel data received from the data conversion unit 14 as image data of the reference frame and using image data stored in the frame memory 43 as image data of the original frame, which serves as the target frame. In the case of the third embodiment, for one frame, a plurality of motion vectors like those shown in FIG. 20 are detected.

In addition, in the case of the third embodiment, the hand-trembling motion-vector detection unit 15 supplies information on a plurality of motion vectors detected by the hand-trembling motion-vector detection unit 15 to the rotation addition unit 19. The rotation addition unit 19 comprehensively processes these motion vectors in order to detect a hand-trembling motion vector representing parallel movement components and a rotational angle.

Figure 39:
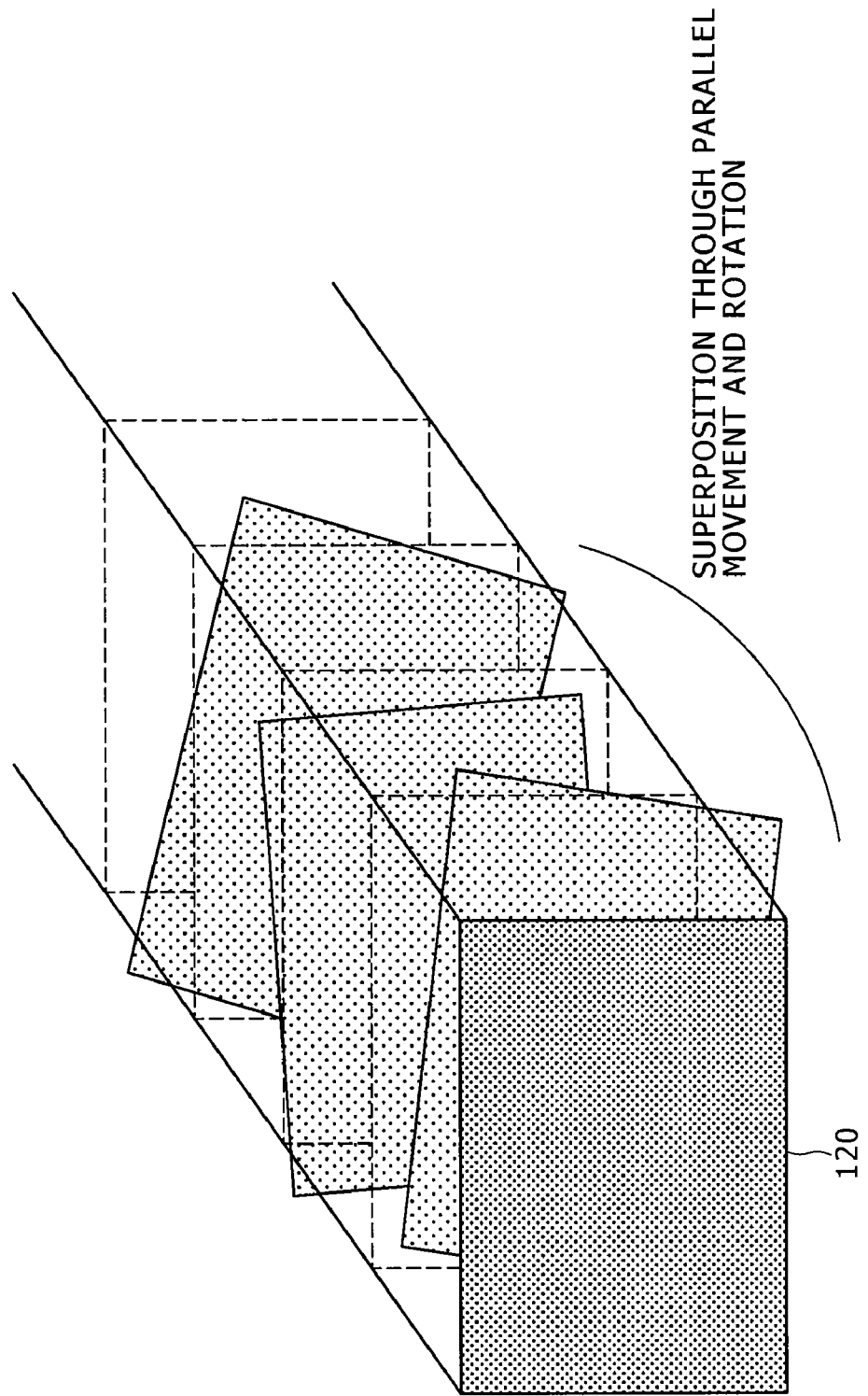
FIG. 39 is an explanatory diagram referred to in describing processing to compensate an image for effects of hand trembling in the image processing apparatus according to a third embodiment.

Then, after a one-frame delay, the rotation addition unit 19 cuts out the image frame stored in the frame memory 43 in accordance with the hand-trembling motion vector and the rotational angle and, at the same time, while rotating the cut-out frame, adds the cut-out frame to an image frame stored in the frame memory 44 or computes an average of the cut-out frame and the image frame stored in the frame memory 44. By carrying out these processes repeatedly, it is possible to store an image frame 120 in the frame memory 44 as a still image showing no effects of hand trembling and having a higher S/N ratio as well as a higher image resolution. The process to superpose frames on each other while rotating and moving the superposing image in parallel is shown in FIG. 39.

Then, the resolution conversion unit 16 cuts out an image portion with a predetermined image resolution and a predetermined image size from frame image stored in the frame memory 44, supplying the portion to the coding/decoding unit 17 as data of a taken image to be recorded as described before. The resolution conversion unit 16 also supplies the image portion to the NTSC encoder 18 as data of an image to be monitored.

Also in the case of the third embodiment, the processing to detect each movement table by using a contracted correlation-value table (or a contracted SAD table) can be carried out repeatedly at two or more stages while narrowing the search range and, if necessary, changing the contraction factor. In the process to detect a hand-trembling motion vector for a still picture and the process to compensate the still picture for effects of hand trembling in accordance with the third embodiment, there are few restrictions on the real-time characteristic of the processes. As the number of pixels increases, making it necessary to detect a motion vector with a high degree of precision, however, the processing to detect a layered motion vector at a plurality of stages becomes very effective for such necessity.

In the third embodiment described above, a motion vector is detected by adoption of the same method as the second embodiment. It is to be noted, however, that a motion vector can be detected in the third embodiment by adoption of the same method as the first embodiment.

Figure 40:
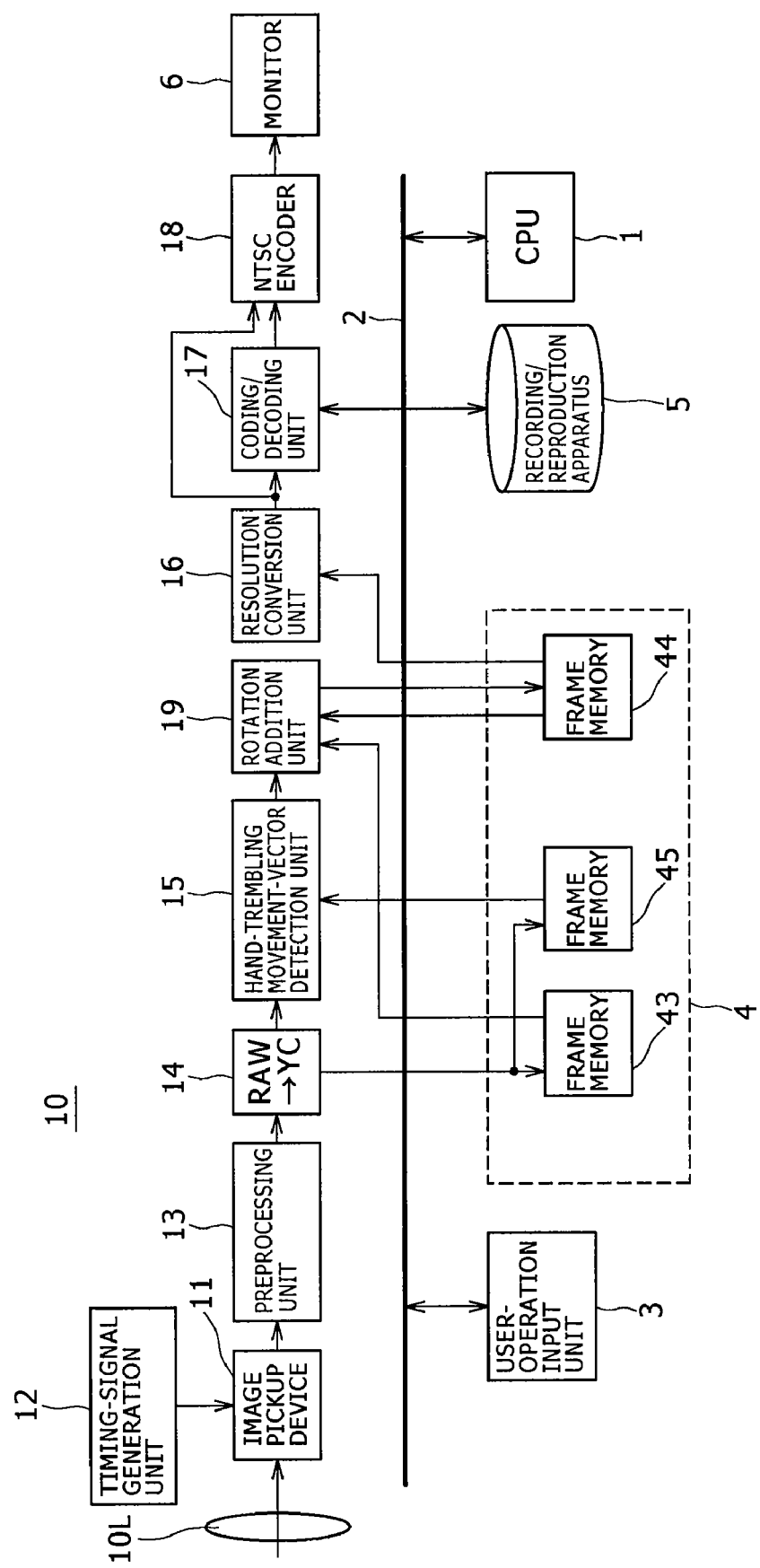
FIG. 40 is a block diagram showing a typical configuration of an image processing apparatus according to a fourth embodiment.

The third embodiment described above adopts a method to detect a hand-trembling motion vector and a rotational angle by comparing an input image with an image preceding the input image by one frame. In actuality, however, the first frame is taken as a base and the subsequent frames are superposed on the base as shown in FIG. 39. For this reason, the first image is rather taken deliberately as the base in the process to detect a motion vector in order to reduce errors. A fourth embodiment is an embodiment taking this point into consideration. FIG. 40 is a block diagram showing a typical configuration of the image pickup apparatus according to the fourth embodiment.

In the case of the fourth embodiment, the image memory unit 4 includes an additional frame memory 45 besides the frame memories 43 and 44. Image data output by the data conversion unit 14 is stored in the frame memories 43 and 45.

The fourth embodiment is a system having a configuration in which the frame memory 45 is used for storing a first frame to serve as a target frame, which is also referred to as an original frame, and a motion vector is detected as a vector representing a movement of an input image relative to the image of the base frame. In the configuration, a result of an image addition process is stored in the frame memory 44. The rest is the same as the third embodiment.

The fourth embodiment implements a system capable of carrying out an infinite addition process or an infinite averaging/addition process by taking the first frame of an input image as the base image. It is to be noted, however, that if the memory is available abundantly or an operation to temporarily save data in the recording/reproduction apparatus 5 is allowed, all images to be subjected to the infinite addition process or the infinite averaging/addition process can be held in the memory or the recording/reproduction apparatus 5 in advance and then the process is carried out on the images on a tournament basis.

By combining the sensorless methods to compensate an image for effects of hand trembling in accordance with the first to fourth embodiments with the techniques to compensate an image for effects of hand trembling on the basis of the contemporary technology, better effects can be obtained.

The beginning of the patent specification explains that a process to compensate an image for effects of hand trembling by using a gyro sensor results in only rough compensation whereas a rotary compensation technique is difficult to implement. On the other hand, a sensorless process to compensate an image for effects of hand trembling by adoption of the block-matching method provides a high degree of precision including rotational compensation. If the search range becomes wide, however, the cost of the SAD table rises abruptly or, even if the block-matching method according to the embodiments is adopted, execution of the process to detect a motion vector at a plurality of stages prolongs the time it takes to carry out the whole processing.

In order to solve the problems described above, it is necessary to provide a system for compensating an image for effects of hand trembling at a low cost, with a high degree of precision and at a high processing speed by execution of the steps of:

compensating the image for optical effects of hand trembling to result in rough compensation;

reducing the size of a search range used in detection of a motion vector used for compensating the image for effects of hand trembling at a sensor level;

detecting a motion vector in the search range; and compensating the image for effects of hand trembling in a sensorless way.

As described above, by adoption of the block-matching techniques according to the first to fifth embodiments, the problems raised by the system in related art for compensating an image for effects of hand trembling can be solved. The problems raised by the system in related art include the large size of the correlation-value table and the still-picture compensation believed to be all but difficult due to the very large size of the correlation-value table. According to the embodiments, however, it is not only possible to reduce the size of the correlation-value table substantially, but also possible to implement a method for compensating a still picture for effects of hand trembling with ease.

In addition, implementation of a sensorless hand-trembling compensation method based on the block-matching techniques according to the first to fifth embodiments offers merits including a low cost, a high degree of precision, a short processing time as well as good robustness in comparison with the sensorless technologies each proposed so far as a technology for compensating a still image for effects of hand trembling.

All apparatus each made available in the current market as an apparatus for compensating a still image for effects of hand trembling are each a system adopting combined optical compensation techniques including a gyro-sensor method and a lens-shift method. Nevertheless, such a system introduces a big error and an unsatisfactory picture quality. In accordance with the techniques provided by the embodiment of the present invention, on the other hand, the sensor and other mechanical components can be eliminated to allow a system to be implemented as an apparatus for compensating a still image for effects of hand trembling at a low cost and with a high degree of precision.

In the case of the embodiments described above, a reference vector is contracted in the vertical and horizontal directions at the same contraction factor. However, a reference vector can also be contracted in the vertical and horizontal directions at different contraction factors.

In addition, in the case of the embodiments described above, a SAD value is computed on the basis of the pixel values of all pixels in a reference block and the target block, being used as a correlation value representing correlation between the reference and target blocks. However, a SAD value can also be computed on the basis of the pixel values for every pixel in a reference block and every one of k pixels in the target block where k is an integer, being used as a correlation value representing correlation between the reference and target blocks.

On the top of that, a system, which is used for detecting a motion vector in a real-time manner, reduces the processing cost and the time it takes to carry out the processing. In such a system, it is thus often necessary to search the target block for representative points mentioned above and compute a correlation value such as a SAD value on the basis of pixel values at the representative points in the target block and pixel values at points included in a reference block.

Figure 41:
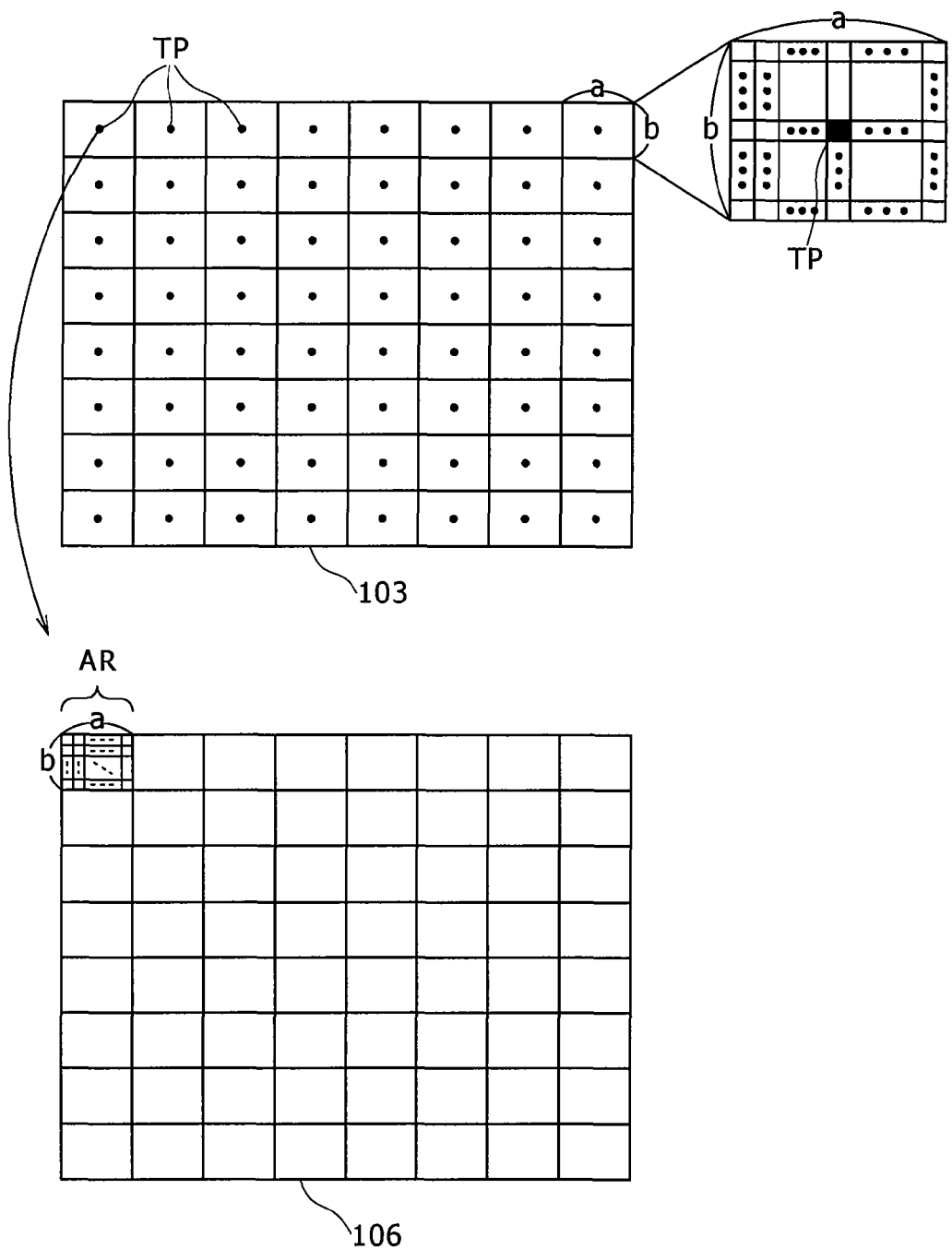
FIG. 41 is an explanatory diagram referred to in describing an image processing apparatus according to another embodiment.

To put it concretely, for example, the target block 103 is spit into a plurality of sub-blocks each including a×b pixels or each including "a" pixel columns and "b" pixel rows as shown in FIG. 41 where a and b are each an integer at least equal to one. One of a plurality of pixels in each sub-block is then taken as the representative point (or the target point) TP of the sub-block. Then, a correlation value such as a SAD value is computed on the basis of pixel values at the selected representative points TPs in the target block 103 and pixel values at points included in a reference block 106.

However, pixel values of all pixels in the reference block 106 are still used in the process to compute a correlation value such as a SAD value. To put it concretely, the reference block 106 is split into as many pixel ranges ARs each including a×b pixels as sub-blocks (or target points TPs) in the target block 103, and all the a×b pixels in the pixel range AR are used in the process to compute a correlation value such as a SAD value in conjunction with the pixel value at the target point TP in the sub-block corresponding to the pixel range AR.

To put it in more detail, the absolute value of a difference in pixel value between a target point TP in a sub-block on the target block 103 and each of the a×b pixels in the pixel range AR on the reference block 106 is computed and, then, a sub-block sum of such absolute values computed for the a×b pixels is found. Such a sub-block sum is found for every sub-block (or every target point TP) on the target block 103 and, then, a block sum of such sub-block sums found for all sub-blocks (or all target points TPs) on the target block 103 is computed. The computed block sum is the SAD value for the target block 103 and the reference block 106 and is stored in the correlation-value table (or the SAD table) 108 as an element of the table 108.

Then, a block sum (or the SAD value) for the target block 103 and a reference block 106 is found on the basis of the target points TPs in the target block 103 as described above for every reference block 106 in the search range 105 provided for the target block 103 and stored in the correlation-value table (or the SAD table) 108 as an element of the table 108 in order to fill up the table 108, that is, in order to complete creation of the table 108. In the case of this other embodiment, however, since each of a plurality of reference blocks 106 set in the search range 105 including a×b pixels, the centers of the reference blocks 106 are shifted from each other by a distance corresponding to a×b pixels or a multiple of the a×b pixels.

In the case of an apparatus where representative points in the target block are used for computing a SAD value serving as a value representing correlation between the target block and a reference block, the memory is accessed for a target point TP on the target block once every pixel range AR including a plurality of pixels in the reference block. Thus, the number of accesses to the memory can be reduced considerably since target points TPs on the target block need to be accessed.

In addition, in the case of an apparatus where representative points in the target block are used, image data of pixels at the target points TPs on the target block need to be stored in the memory. That is to say, it is not necessary to store image data of all pixels on the target block. Thus, the size of the frame memory used for storing the original frame serving as a target frame including target blocks can also be reduced as well.

On the top of that, in addition to the frame memory, a representative-point memory implemented as an SRAM can also be provided locally as a local memory for storing image data of target blocks on an original frame used a target frame. In this way, the bandwidth of accesses to the image memory unit 4 implemented as a DRAM can be reduced.

Figure 43:
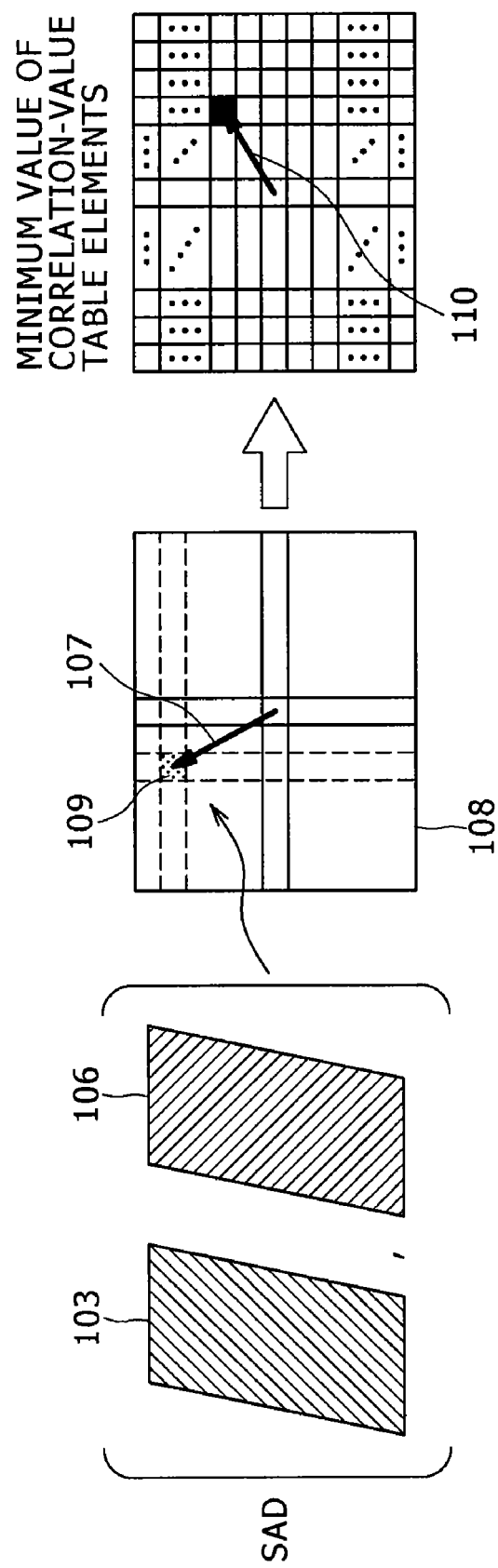
FIG. 43 is an explanatory diagram referred to in describing processing to detect a motion vector by adoption of the block matching technique in related art.

The process adopting the technique to use representative points of the target block is described above for the technique explained earlier by referring to FIGS. 42 to 44. It is needless to say, however, that the explanation of the process adopting technique to use representative points is also applicable to the method described before by referring to FIGS. 34 to 37 as a method according to the second embodiment.

The technique of using representative points of the target block is applied to the method according to the second embodiment by executing the steps of:

detecting all reference blocks sharing a pixel range AR including a pixel (referred to as an input pixel) of an input reference frame for every input pixel in the entire search range; and determining a plurality of representative points on the target block as points each corresponding to one of pixel ranges AR in each of all the detected reference blocks. It is to be noted that the position of the input pixel in the pixel range AR varies from AR to AR.

Then, for an input pixel in a pixel range AR, the pixel value of a pixel located at one of the representative points of the target block is read out from the memory for storing the image data of an original frame serving as the target frame and used in conjunction with the pixel value of the input pixel to compute the absolute value of a difference between the pixel value of the pixel located at the representative point and the pixel value of the input pixel. Then, component values of the absolute value are each cumulatively added to a previously computed component value stored in an element included in the SAD table, which serves as a correlation-value table, as an element corresponding to a reference vector pointing to a reference block.

In the processing described above, an access to the memory is made to read out the pixel values of pixels each located at one of the representative points. Thus, the number of accesses to the memory can be reduced substantially.

Let us keep in mind that it is needless to say that, in the case of the embodiments described so far, the processing based on representative points is applied to a case in which a contracted correlation-value table (or a contracted SAD table) is used.

In addition, in the embodiments described above, the absolute value of a difference in pixel value and a SAD value are each calculated as a correlation value by processing luminance values Y. In order to detect a motion vector, however, the processed pixel value is not limited to the luminance value Y. That is to say, the chrominance value Cb/Cr can also be taken as the processed pixel value as well. Moreover, raw data before being converted into a luminance value Y and a chrominance value Cb/Cr can also be taken as the processed pixel value in the processing to detect a motion vector.

On the top of that, as described before, the hand-trembling motion-vector detection unit 15 is not limited to a configuration in which the processing to detect a motion vector is carried out by hardware. That is to say, the processing to detect a motion vector can also be carried out by execution of software.

The processing to detect a motion vector according to any of the embodiments is carried out on a taken image. Let us keep in mind, however, that it is needless to say that the information to which the embodiment of the present invention is applied is not limited to a taken image.

Furthermore, as described at the beginning of this patent specification, the value representing correlation between the target block and a reference block is not limited to a SAD value.

In addition, the descriptions given so far explain examples of applying the embodiment of the present invention to cases of detecting a hand-trembling motion vector for an image taken by an image pickup apparatus. However, the scope of the present invention is not limited to detection of a hand-trembling motion vector for an image taken by an image pickup apparatus. That is to say, the present invention can also be applied to detection of a hand-trembling motion vector representing a movement from the position of any screen to another position of the screen. Let us call the screens at the position and the other position as the target and reference screens (or the target and reference frames) respectively. In this case, either the target or reference screen can be taken as the preceding screen on the time axis and the other screen taken as the succeeding screen. In the embodiments described above, the target screen is taken as the preceding screen because a hand-trembling motion vector is detected. However, a motion vector can also be detected for a temporarily recorded image for a case in which a reference screen is taken as the preceding screen.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus for identifying a motion vector by executing the steps of:
   setting a plurality of reference blocks in a search range set on a reference screen as reference blocks each having a size equal to a target block set at a predetermined position on a target screen as a target block having a predetermined size covering a plurality of pixels;
   searching a specific reference block having a strongest correlation among correlations between said plurality of reference blocks and said target block; and
   detecting said motion vector on the basis of a shift of said specific reference block from a position corresponding to said predetermined position of said target block on said target screen,
   said image processing apparatus comprising:
   correlation-value computation means configured to compute correlation values each representing a correlation between one of said reference blocks and said target block on the basis of pixel values of a plurality of pixels located at points on each of said reference blocks and pixel values of a plurality of pixels located at corresponding points on said target block;
   table generation means configured to generate a contracted correlation-value table by:
   storing a correlation value computed by said correlation-value computation means for a reference vector as it is in a table element included in said contracted correlation-value table as a table element associated with a contracted reference vector obtained as a result of contracting said reference vector, which represents a shift of a reference block over said reference screen from a position corresponding to said predetermined position of said target block on said target screen, at a predetermined contraction factor; or
   finding a plurality of component correlation values each associated with a specific one of a plurality of close contracted reference vectors located close to said contracted reference vector by splitting a correlation value computed by said correlation-value computation means for said reference vector contracted to produce said contracted reference vector and cumulatively storing each of said component correlation values in a table element included in said contracted correlation-value table as a table element associated with said specific close contracted reference vector; and
   motion-vector computation means configured to find a motion vector between said target screen and said reference screen on the basis of said component correlation values stored in said contracted correlation-value table.

2. The image processing apparatus according to claim 1 wherein said table generation means further comprising:
   component correlation value computation means configured to find a plurality of component correlation values each associated with a specific one of a plurality of close contracted reference vectors located close to a contracted reference vector by splitting a correlation value computed by said correlation-value computation means for said reference vector contracted to produce said contracted reference vector and store each of said component correlation values in a table element included in said contracted correlation-value table as a table element associated with said specific close contracted reference vector by adding said component correlation value to said table element if there are a plurality of said close contracted reference vectors; and
   final component correlation value computation means configured to find a final component correlation value representing a cumulative sum obtained by cumulatively adding a new component correlation value newly computed by said component correlation value computation means to a previous component correlation value already stored in a table element of said contracted correlation-value table as a component correlation value computed previously by said component correlation value computation means.

3. The image processing apparatus according to claim 1 wherein said correlation-value computation means computes a correlation value for each of said reference blocks by finding a sum of the absolute values of differences between pixel values of a plurality of pixels located at points on said reference block and pixel values of a plurality of pixels located at corresponding points on said target block.

4. An image processing apparatus for identifying a motion vector by executing the steps of:
   setting a plurality of reference blocks in a search range set on a reference screen as reference blocks each having a size equal to a target block set at a predetermined position on a target screen as a target block having a predetermined size covering a plurality of pixels;
   searching a specific reference block having a strongest correlation among correlations between said plurality of reference blocks and said target block; and
   detecting said motion vector on the basis of a shift of said specific reference block from a position corresponding to said predetermined position of said target block on said target screen,
   said image processing apparatus comprising:
   correlation-value computation means configured to compute a correlation value for the pixel value of each of a plurality of pixels located at points on each of said reference blocks and the pixel value of each of a plurality of pixels located at corresponding points on said target block;
   table generation means configured to generate a contracted correlation-value table by:
   storing a correlation value computed by said correlation-value computation means for the pixel value of a pixel on a reference block pointed to by a reference vector as it is in a table element included in said contracted correlation-value table as a table element associated with a contracted reference vector obtained as a result of contracting said reference vector, which represents a shift of a reference block over said reference screen from a position corresponding to said predetermined position of said target block on said target screen, at a predetermined contraction factor; or
   finding a plurality of component correlation values each associated with a specific one of a plurality of close contracted reference vectors located close to said contracted reference vector by splitting a correlation value computed by said correlation-value computation means for the pixel value of a pixel on a reference block pointed to by said reference vector contracted to produce said contracted reference vector and cumulatively storing each of said component correlation values in a table element included in said contracted correlation-value table as a table element associated with said specific close contracted reference vector; and
   motion-vector computation means configured to find a motion vector between said target screen and said reference screen on the basis of said component correlation values stored in said contracted correlation-value table.

5. The image processing apparatus according to claim 4 wherein said table generation means further has:
- component correlation value computation means configured to find a plurality of component correlation values each associated with a specific one of a plurality of close contracted reference vectors located close to said contracted reference vector by splitting a correlation value computed by said correlation-value computation means for the pixel value of a pixel on a reference block pointed to by said reference vector contracted to produce said contracted reference vector and store each of said component correlation values in a table element included in said contracted correlation-value table as a table element associated with said specific close contracted reference vector by adding said component correlation value to said table element if there are a plurality of said close contracted reference vectors; and
- final component correlation value computation means configured to find a final component correlation value representing a cumulative sum obtained by cumulatively adding a new component correlation value newly computed by said component correlation value computation means to a previous component correlation value already stored in a table element of said contracted correlation-value table as a component correlation value computed previously by said component correlation value computation means.

6. The image processing apparatus according to claim 4 wherein said correlation-value computation means computes a correlation value for the pixel value of each of a plurality of pixels located at points on each of said reference blocks and the pixel value of each of a plurality of pixels located at corresponding points on said target block by finding the absolute value of a difference between the pixel value of said pixel on said reference block and the pixel value of said pixel on said target block.

7. The image processing apparatus according to claim 1 wherein said target and reference screens are each a screen obtained as a result of an image pickup operation carried out by an image pickup apparatus and said target screen is a screen preceding said reference screen.

8. The image processing apparatus according to claim 4 wherein said target and reference screens are each a screen obtained as a result of an image pickup operation carried out by an image pickup apparatus and said target screen is a screen preceding said reference screen.

9. The image processing apparatus according to claim 1 wherein:
- on the basis of said motion vector found by said motion-vector computation means, said search range on said reference screen is narrowed and said predetermined contraction factor is reduced; and
- processes carried out by said correlation-value computation means, said table generation means, and said motion-vector computation means are repeated by using said narrowed search area and said reduced contraction factor.

10. The image processing apparatus according to claim 4 wherein:
- on the basis of a motion vector found by said motion-vector computation means, said search range on said reference screen is narrowed and said predetermined contraction factor is reduced; and
- processes carried out by said correlation-value computation means, said table generation means, and said motion-vector computation means are repeated by using said narrowed search area and said reduced contraction factor.

11. The image processing apparatus according to claim 2 wherein said component correlation value computation means finds said component correlation values each associated with one of a plurality of close contracted reference vectors located close to said contracted reference vector on the basis of distances between a position pointed to by said contracted reference vector and positions pointed to by said close contracted reference vectors.

12. The image processing apparatus according to claim 5 wherein said component correlation value computation means finds said component correlation values each associated with one of a plurality of close contracted reference vectors located close to said contracted reference vector on the basis of distances between a position pointed to by said contracted reference vector and positions pointed to by said close contracted reference vectors.

13. The image processing apparatus according to claim 1 wherein said predetermined contraction is a vertical-direction contraction factor and a horizontal-direction contraction factor, which can be set independently of each other.

14. The image processing apparatus according to claim 4 wherein said predetermined contraction is a vertical-direction contraction factor and a horizontal-direction contraction factor, which can be set independently of each other.

15. The image processing apparatus according to claim 1 wherein said correlation value decreases in inverse proportion to correlation represented by said correlation value and said motion-vector computation means comprises:
- surface generation means configured to create an approximation high-order surface on the basis of a smallest value among correlation values stored in said contracted correlation-value table and close correlation values stored in said correlation-value table as elements located close to an element used for storing said smallest value;
- minimum point detection means configured to detect a point corresponding to a minimum value of said approximation high-order surface; and
- vector detection means configured to detect a vector representing a positional shift from a position corresponding to said target block to a point detected by said minimum point detection means as said detected point corresponding to said minimum value and compute a motion vector from said detected vector.

16. The image processing apparatus according to claim 4 wherein said correlation value decreases in inverse proportion to correlation represented by said correlation value and said motion-vector computation means comprises:
- surface generation means configured to create an approximation high-order surface on the basis of a smallest value among correlation values stored in said contracted correlation-value table and close correlation values stored in said correlation-value table as elements located close to an element used for storing said smallest value;
- minimum point detection means configured to detect a point corresponding to a minimum value of said approximation high-order surface; and
- vector detection means configured to detect a vector representing a positional shift from a position corresponding to said target block to a point detected by said minimum point detection means as said detected point corresponding to said minimum value and compute a motion vector from said detected vector.

17. The image processing apparatus according to claim 15 wherein said approximation high-order surface is a quadratic surface created by said surface generation means on the basis of said smallest value and said close correlation values by adoption a method of least squares.

18. The image processing apparatus according to claim 16 wherein said approximation high-order surface is a quadratic surface created by said surface generation means on the basis of said smallest value and said close correlation values by adoption a method of least squares.

19. The image processing apparatus according to claim 17 wherein said close correlation values are eight correlation values stored respectively in eight elements centered at an element used for storing said smallest value.

20. The image processing apparatus according to claim 18 wherein said close correlation values are eight correlation values stored respectively in eight elements centered at an element used for storing said smallest value.

21. The image processing apparatus according to claim 19 wherein said close correlation values are 15 correlation values stored respectively in eight elements centered at an element used for storing said smallest value.

22. The image processing apparatus according to claim 20 wherein said close correlation values are 15 correlation values stored respectively in eight elements centered at an element used for storing said smallest value.

23. The image processing apparatus according to claim 1 wherein said correlation value decreases in inverse proportion to correlation represented by said correlation value and said motion-vector computation means comprises:
   horizontal-direction curve generation means configured to create a horizontal-direction approximation high-order curve on the basis of a smallest value among correlation values stored in said contracted correlation-value table and horizontal-direction close correlation values stored in said correlation-value table as elements included in the horizontal-direction close to an element used for storing said smallest value;
   horizontal-direction minimum point detection means configured to detect a point corresponding to a horizontal-direction minimum value of said horizontal-direction approximation high-order curve;
   vertical-direction curve generation means configured to create a vertical-direction approximation high-order curve on the basis of a smallest value among correlation values stored in said contracted correlation-value table and vertical-direction close correlation values stored in said correlation-value table as elements included in the vertical-direction close to an element used for storing said smallest value;
   vertical-direction minimum point detection means configured to detect a point corresponding to a vertical-direction minimum value of said vertical-direction approximation high-order curve; and
   motion-vector detection means configured to detect a vector representing a positional shift from a position corresponding to said target block to a point corresponding to a both-direction minimum value, which is regarded as a minimum value in the horizontal and vertical directions on the basis of a point detected by said horizontal-direction minimum point detection means as a point corresponding to said horizontal-direction minimum value and a point detected by said vertical-direction minimum point detection means as a point corresponding to said vertical-direction minimum value, and compute a motion vector from said detected vector.

24. The image processing apparatus according to claim 4 wherein said correlation value decreases in inverse proportion to correlation represented by said correlation value and said motion-vector computation means comprises:
   horizontal-direction curve generation means configured to create a horizontal-direction approximation high-order curve on the basis of a smallest value among correlation values stored in said contracted correlation-value table and horizontal-direction close correlation values stored in said correlation-value table as elements included in the horizontal-direction close to an element used for storing said smallest value;
   horizontal-direction minimum point detection means configured to detect a point corresponding to a horizontal-direction minimum value of said horizontal-direction approximation high-order curve;
   vertical-direction curve generation means configured to create a vertical-direction approximation high-order curve on the basis of a smallest value among correlation values stored in said contracted correlation-value table and vertical-direction close correlation values stored in said correlation-value table as elements included in the vertical-direction close to an element used for storing said smallest value;
   vertical-direction minimum point detection means configured to detect a point corresponding to a vertical-direction minimum value of said vertical-direction approximation high-order curve; and
   motion-vector detection means configured to detect a vector representing a positional shift from a position corresponding to said target block to a point corresponding to a both-direction minimum value, which is regarded as a minimum value in the horizontal and vertical directions on the basis of a point detected by said horizontal-direction minimum point detection means as a point corresponding to said horizontal-direction minimum value and a point detected by said vertical-direction minimum point detection means as a point corresponding to said vertical-direction minimum value, and compute a motion vector from said detected vector.

25. The image processing apparatus according to claim 23 wherein said horizontal-direction approximation high-order curve is a cubic curve created by said horizontal-direction curve generation means on the basis of said smallest value and three said horizontal-direction close correlation values whereas said vertical-direction approximation high-order curve is a cubic curve created by said vertical-direction curve generation means on the basis of said smallest value and three said vertical-direction close correlation values.

26. The image processing apparatus according to claim 24 wherein said horizontal-direction approximation high-order curve is a cubic curve created by said horizontal-direction curve generation means on the basis of said smallest value and three said horizontal-direction close correlation values whereas said vertical-direction approximation high-order curve is a cubic curve created by said vertical-direction curve generation means on the basis of said smallest value and three said vertical-direction close correlation values.

27. An image processing method for identifying a motion vector by executing the steps of:
   setting a plurality of reference blocks in a search range set on a reference screen as reference blocks each having a size equal to a target block set at a predetermined position on a target screen as a target block having a predetermined size covering a plurality of pixels;
   searching a specific reference block having a strongest correlation among correlations between said plurality of reference blocks and said target block; and detecting said motion vector on the basis of a shift of said specific reference block from a position corresponding to said predetermined position of said target block on said target screen, said image processing method further comprising the steps of:

computing correlation values each representing a correlation between one of said reference blocks and said target block on the basis of pixel values of a plurality of pixels located at points on each of said reference blocks and pixel values of a plurality of pixels located at corresponding points on said target block;

generating a contracted correlation-value table by:

storing a correlation value computed by said correlation-value computation means for a reference vector as it is in a table element included in said contracted correlation-value table as a table element associated with a contracted reference vector obtained as a result of contracting said reference vector, which represents a shift of a reference block over said reference screen from a position corresponding to said predetermined position of said target block on said target screen, at a predetermined contraction factor; or finding a plurality of component correlation values each associated with a specific one of a plurality of close contracted reference vectors located close to said contracted reference vector by splitting a correlation value computed by said correlation-value computation means for said reference vector contracted to produce said contracted reference vector and cumulatively storing each of said component correlation values in a table element included in said contracted correlation-value table as a table element associated with said specific close contracted reference vector; and finding a motion vector between said target screen and said reference screen on the basis of said component correlation values stored in said contracted correlation-value table.

28. The image processing method according to claim 27 wherein the step of said generating a contracted correlation-value table further comprising the steps of:

finding a plurality of component correlation values each associated with a specific one of a plurality of close contracted reference vectors located close to a contracted reference vector by splitting a correlation value computed by said correlation-value computation means for said reference vector contracted to produce said contracted reference vector and store each of said component correlation values in a table element included in said contracted correlation-value table as a table element associated with said specific close contracted reference vector by adding said component correlation value to said table element if there are a plurality of said close contracted reference vectors; and finding a final component correlation value representing a cumulative sum obtained by cumulatively adding a new component correlation value newly computed by said component correlation value computation means to a previous component correlation value already stored in a table element of said contracted correlation-value table as a component correlation value computed previously by said component correlation value computation means.

29. An image processing method for identifying a motion vector by executing the steps of:

setting a plurality of reference blocks in a search range set on a reference screen as reference blocks each having a size equal to a target block set at a predetermined position on a target screen as a target block having a predetermined size covering a plurality of pixels;

searching a specific reference block having a strongest correlation among correlations between said plurality of reference blocks and said target block; and detecting said motion vector on the basis of a shift of said specific reference block from a position corresponding to said predetermined position of said target block on said target screen, said image processing method further comprising the steps of:

computing a correlation value for the pixel value of each of a plurality of pixels located at points on each of said reference blocks and the pixel value of each of a plurality of pixels located at corresponding points on said target block;

generating a contracted correlation-value table by:

storing a correlation value computed by said correlation-value computation means for the pixel value of a pixel on a reference block pointed to by a reference vector as it is in a table element included in said contracted correlation-value table as a table element associated with a contracted reference vector obtained as a result of contracting said reference vector, which represents a shift of a reference block over said reference screen from a position corresponding to said predetermined position of said target block on said target screen, at a predetermined contraction factor; or finding a plurality of component correlation values each associated with a specific one of a plurality of close contracted reference vectors located close to said contracted reference vector by splitting a correlation value computed by said correlation-value computation means for the pixel value of a pixel on a reference block pointed to by said reference vector contracted to produce said contracted reference vector and cumulatively storing each of said component correlation values in a table element included in said contracted correlation-value table as a table element associated with said specific close contracted reference vector; and finding a motion vector between said target screen and said reference screen on the basis of said component correlation values stored in said contracted correlation-value table.

30. The image processing method according to claim 29 the step of wherein said generating a contracted correlation-value table further comprising the steps of:

finding a plurality of component correlation values each associated with a specific one of a plurality of close contracted reference vectors located close to said contracted reference vector by splitting a correlation value computed by said correlation-value computation means for the pixel value of a pixel on a reference block pointed to by said reference vector contracted to produce said contracted reference vector and store each of said component correlation values in a table element included in said contracted correlation-value table as a table element associated with said specific close contracted reference vector by adding said component correlation value to said table element if there are a plurality of said close contracted reference vectors; and finding a final component correlation value representing a cumulative sum obtained by cumulatively adding a new component correlation value newly computed by said component correlation value computation means to a previous component correlation value already stored in a table element of said contracted correlation-value table as a component correlation value computed previously by said component correlation value computation means.

31. The image processing method according to claim 27 wherein:
on the basis of a motion vector found in the step of said motion-vector computation, said search range on said reference screen is narrowed and said predetermined contraction factor is reduced; and
the steps of said correlation-value computation, said table generation, and said motion-vector computation are repeated by using said narrowed search area and said reduced contraction factor.

32. The image processing method according to claim 29 wherein:
on the basis of a motion vector found in the step of said motion-vector computation, said search range on said reference screen is narrowed and said predetermined contraction factor is reduced; and
the steps of said correlation-value computation, said table generation, and said motion-vector computation are repeated by using said narrowed search area and said reduced contraction factor.

33. An image processing apparatus for identifying a motion vector by executing the steps of:
setting a plurality of reference blocks in a search range set on a reference screen as reference blocks each having a size equal to a target block set at a predetermined position on a target screen as a target block having a predetermined size covering a plurality of pixels;
searching a specific reference block having a strongest correlation among correlations between said plurality of reference blocks and said target block; and
detecting said motion vector on the basis of a shift of said specific reference block from a position corresponding to said predetermined position of said target block on said target screen,
said image processing apparatus comprising:
a correlation-value computation section configured to compute correlation values each representing a correlation between one of said reference blocks and said target block on the basis of pixel values of a plurality of pixels located at points on each of said reference blocks and pixel values of a plurality of pixels located at corresponding points on said target block;
a table generation section configured to generate a contracted correlation-value table by:
storing a correlation value computed by said correlation-value computation section for a reference vector as it is in a table element included in said contracted correlation-value table as a table element associated with a contracted reference vector obtained as a result of contracting said reference vector, which represents a shift of a reference block over said reference screen from a position corresponding to said predetermined position of said target block on said target screen, at a predetermined contraction factor; or
finding a plurality of component correlation values each associated with a specific one of a plurality of close contracted reference vectors located close to said contracted reference vector by splitting a correlation value computed by said correlation-value computation section for said reference vector contracted to produce said contracted reference vector and cumulatively storing each of said component correlation values in a table element included in said contracted correlation-value table as a table element associated with said specific close contracted reference vector; and
a motion-vector computation section configured to find a motion vector between said target screen and said reference screen on the basis of said component correlation values stored in said contracted correlation-value table.

34. An image processing apparatus for identifying a motion vector by executing the steps of:
setting a plurality of reference blocks in a search range set on a reference screen as reference blocks each having a size equal to a target block set at a predetermined position on a target screen as a target block having a predetermined size covering a plurality of pixels;
searching a specific reference block having a strongest correlation among correlations between said plurality of reference blocks and said target block; and
detecting said motion vector on the basis of a shift of said specific reference block from a position corresponding to said predetermined position of said target block on said target screen,
said image processing apparatus comprising:
a correlation-value computation section configured to compute a correlation value for the pixel value of each of a plurality of pixels located at points on each of said reference blocks and the pixel value of each of a plurality of pixels located at corresponding points on said target block;
a table generation section configured to generate a contracted correlation-value table by:
storing a correlation value computed by said correlation-value computation section for the pixel value of a pixel on a reference block pointed to by a reference vector as it is in a table element included in said contracted correlation-value table as a table element associated with a contracted reference vector obtained as a result of contracting said reference vector, which represents a shift of a reference block over said reference screen from a position corresponding to said predetermined position of said target block on said target screen, at a predetermined contraction factor; or
finding a plurality of component correlation values each associated with a specific one of a plurality of close contracted reference vectors located close to said contracted reference vector by splitting a correlation value computed by said correlation-value computation section for the pixel value of a pixel on a reference block pointed to by said reference vector contracted to produce said contracted reference vector and cumulatively storing each of said component correlation values in a table element included in said contracted correlation-value table as a table element associated with said specific close contracted reference vector; and
a motion-vector computation section configured to find a motion vector between said target screen and said reference screen on the basis of said component correlation values stored in said contracted correlation-value table.

* * * * *